United States Patent
Ishikawa et al.

(10) Patent No.: US 6,930,824 B1
(45) Date of Patent: *Aug. 16, 2005

(54) OPTICAL AMPLIFIER WHICH COMPENSATES FOR DISPERSION OF A WDM OPTICAL SIGNAL

(75) Inventors: George Ishikawa, Yokohama (JP); Hideyuki Miyata, Kawasaki (JP); Hiroshi Onaka, Kawasaki (JP); Motoyoshi Sekiya, Chigasaki (JP); Kazue Otsuka, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/080,909

(22) Filed: May 19, 1998

Related U.S. Application Data

(62) Division of application No. 08/917,292, filed on Aug. 25, 1997, which is a continuation of application No. 08/781,137, filed on Jan. 9, 1997, now Pat. No. 5,696,614, which is a continuation of application No. 08/233,830, filed on Apr. 26, 1994.

(30) Foreign Application Priority Data

Aug. 10, 1993 (JP) ............................................. 5-198674
Sep. 29, 1993 (JP) ............................................. 5-242564

(51) Int. Cl.[7] ............................ H04B 10/17; H01S 3/30

(52) U.S. Cl. .................. 359/341.32; 359/160; 359/173; 385/122

(58) Field of Search ............................... 359/134, 160, 359/161, 173, 341.32, 154, 174, 179, 337, 341, 337.5; 385/122

(56) References Cited

U.S. PATENT DOCUMENTS

| 3,863,063 | A | * | 1/1975 | Indig et al. ................. 359/161 |
| 4,372,647 | A | * | 2/1983 | Okamoto et al. .......... 359/96.3 |
| 4,969,710 | A | * | 11/1990 | Tick et al. ................... 385/123 |
| 5,042,906 | A | | 8/1991 | Chesler et al. .............. 385/123 |

(Continued)

FOREIGN PATENT DOCUMENTS

| EP | 0 668 675 A2 | 8/1995 | |
| JP | 4-248504 | 9/1992 | ............ G02B/6/00 |
| JP | 404335619 A | * 11/1992 | |

OTHER PUBLICATIONS

Desuwire, E.; Scientific American, 1/92, pp 114–121.*
Weik, M. H.; Fiber Optics Standard Dictionary, p. 602, Von Nostrard Reinhold, Pub.*

(Continued)

*Primary Examiner*—Thomas H. Tarcza
*Assistant Examiner*—Deandra M. Hughes
(74) *Attorney, Agent, or Firm*—Staas & Halsey LLP

(57) ABSTRACT

The invention provides an optical wavelength multiplex transmission method wherein a band in the proximity of a zero dispersion wavelength of an optical fiber is used and optical signals are disposed at efficient channel spacings taking an influence of the band, the wavelength dispersion and the four wave mixing into consideration to realize an optical communication system of an increased capacity which is not influenced by crosstalk by FWM. When optical signals of a plurality of channels having different wavelengths are to be multiplexed and transmitted using an optical fiber, a four wave mixing suppressing guard band of a predetermined bandwidth including the zero-dispersion wavelength $\lambda_0$ of the optical fiber is set, and signal light waves of the plurality of channels to be multiplexed are arranged on one of the shorter wavelength side and the longer wavelength side outside the guard band.

18 Claims, 35 Drawing Sheets

U.S. PATENT DOCUMENTS

| | | | |
|---|---|---|---|
| 5,063,559 A | 11/1991 | Marcuse ...................... 398/91 | |
| 5,218,662 A | * 6/1993 | Dugan ........................ 385/123 | |
| 5,224,183 A | * 6/1993 | Dugan ......................... 385/24 | |
| 5,225,922 A | 7/1993 | Chraplyvy et al. | |
| 5,243,610 A | * 9/1993 | Murata ........................ 372/21 | |
| 5,274,733 A | * 12/1993 | Prigent et al. .............. 385/123 | |
| 5,276,543 A | 1/1994 | Olshansky | |
| 5,327,516 A | 7/1994 | Chraplyvy et al. ......... 359/124 | |
| 5,343,322 A | 8/1994 | Pirio et al. .................. 359/173 | |
| 5,361,319 A | * 11/1994 | Antos et al. ................ 359/337 | |
| 5,373,382 A | 12/1994 | Pirio et al. .................. 359/161 | |
| 5,386,314 A | 1/1995 | Jopson ....................... 359/326 | |
| 5,392,377 A | 2/1995 | Auracher .................... 385/24 | |
| 5,410,624 A | 4/1995 | Morkel ........................ 385/24 | |
| 5,546,210 A | 8/1996 | Chraplyvy et al. ......... 359/124 | |
| 5,587,830 A | * 12/1996 | Chraplyvy et al. ......... 359/341 | |
| 5,589,969 A | 12/1996 | Taga et al. | |
| 5,602,666 A | * 2/1997 | Ishikawa et al. ............ 359/161 | |
| 5,636,046 A | * 6/1997 | Ishikawa et al. ............ 359/161 | |

OTHER PUBLICATIONS

Kanamori, H.; Fourth Optoletronics Conf. (Dec. '92) Tech. Digest. pp 287–290, Jul. 1992.*

B Jarklev, A.; "Optical Fiber Amplifiers", 2 pages Jan. 1993.*

Kikushima, K.; Journal of Lightwave Tech., vol. 10, # 10, p. 1443–8, 10/92.*

Ivan P. Kaminow et al., Optical Fiber Telecommunications IIIB, published by Academic Press in 1997, pp. 33–37 and 62–69 in Chapter 2, Erbium–Doped Fiber Amplifiers; and pp. 268–271 and 310–318 in Chapter 7, Optical Fiber Components and Devices.

C. D. Chen, et al., "A Field Demonstration of 10Gb/s –360km Transmission Through Embedded Standard (non–DSF) Fiber Cables", OFC '94 (Feb. 20–25, 1994), PD27–1 through PD27–4, Ivan P. Kaminow et al., Optical Fiber Telecommunications IIIA, published by Academic Press in 1997, pp. 171–195 in Chapter 7, Dispersion Compensation for Optical Fiber Systems.

J–M.P. Delavaux et al., "COBRA: Compensating Optical Balanced Reflective Amplifier", ECOC '94 (Sep. 25–29, 1994), pp. 5–9, Proceedings vol. 4, Post–deadline Papers.

Ivan P. Kaminow, et al., Optical Fiber Telecommunications IVB Systems and Impairments, published by Academic Press in 2002, pp. 651–653, 656–659 and 714–724 in Chapter 14, Fixed and Tunable Management.

H. Onaka, et al., "10 Gb/s, 4–Wave 200 km and 16–Wave 150 km Repeaterless Transmission Experiments over Standard Single–Mode Fiber," ECOC '94 (Sep. 25–29, 1994), Proceedings vol. 4, Post–deadline Papers, pp. 49–52.

H. Izadpanah, et al., "Dispersion Compensation in 1310nm–Optimised SMFs Using Optical Equaliser Fibre, EDFAs and 1310/1550nm WDM", Electronics Letters, Jul. 16, 1992, vol. 28, No. 15, pp. 1469–1471.

H. Izadpanah, et al., "Multiwavelength Dispersion–Compensation for 1550 nm Transmission at 2.5 and 10 Gb/s Over 1310 nm–Optimized Single–Mode Fiber," ECOC'92, (Sep. 27–Oct. 1, 1992), Proceedings vol. 1, Regular Papers, TuA5.1, pp. 145–148.

H. Izadpanah, et al., "System Applications of Dispersion-Compensation Techniques in Upgrading Interoffice 1310 nm–Optimized Fiber Networks," IEEE in Houston, GLOBECOM '93, IEEE Global Telecommunications Conference, Nov. 29–Dec. 2, 1993, vol. 3 of 4, pp. 1882–1885.

Augé, J.C., et al., "Relevant parameters for designing amplified ultralong links," 1993 Technical Digest Series, vol. 4, Conference Edition, OFC/IOOC '93, Feb. 21–26, 1993, San Jose, California, pp. 249–251.

"Functional Characteristics of Interoffice and Long–Haul Line Systems Using Optical Amplifiers, Including Optical Multiplexers", ITU Telecommunication Standardization Sector, Com. 15–276–E, Study Group 15—Contribution 276; Mar. 1996.

U.S. patent application Ser. No. 08/801,917, Hideyuki Miyata, et al., filed Feb. 14, 1997, Fujitsu Limited.

A.R. Chraplyvy et al. "Equalization in Amplified WDM Lightwave Transmission Systems", IEEE Photonics Technology Letters, vol. 4, No. 8, Aug. 1992.

Fabrizio Forghieri et al., "Reduction of Four–Wave Mixing Crosstalk in WDM Systems Using Unequally Spaced Channels", IEEE Photonics Technology Letters, vol. 6, No. 6, Jun. 1994.

Hiromu Toba et al., "A 100–Channel Optical FDM SixStage In–Line Amplifier System Employing Tunable Gain Equalizers", IEEE Photonics Technology Letters, vol. 5, No. 2, Feb. 1993.

S.F. Su et al., "Gain Equalization in Multiwavelength Lightwave Systems Using Acoustooptic Tunable Filters", IEEE Photonics Technology Letters, vol. 4, No. 3, Mar. 1992.

Jonathan A. Nagel et al., "Optical Amplifier System Design and Field Trial", OAA'92, THA1, 1992.

Kiyoshi Nosu et al., "Performance Consideration on High Capacity Optical FDM Networks", IEEE Global Telecommunications Conference & Exhibition, Nov. 28–Dec. 1, 1998.

M. Suyama et al., "2.5 Gb/s, 4 Channel WDM Transmission Over 1060 km Using EDFAs With Suppressed Gain Bandwidth Narrowing", OAA'93, pp. 126–129.

Vengsarkar et al., "Dispersion Compensating Single–Mode Fibers: Efficient Designs For First–and Second Order compensation", Optics Letters, vol. 18, No. 11, Jun. 1, 1993.

Antos et al., "Dispersion Compensating Fiber For Upgrading Existing 1310–nm–Optimized Systems to 1550–nm Operation", OFC/IOOC '93 Technical Digest, Feb. 1993, pp. 204–205.

Cimini et al., "Optical Equalization For High–Bit–Rate Fiber–Optic Communications", IEEE Photonics Technology Letters, vol. 2, No. 3, Mar. 1990, pp. 200–202.

European Search Report, EP 0668 675 A3; Feb. 7, 1997.

Inoue et al., "Wavelength Conversion Experiment Using Fiber Four–Wave Mixing", IEEE Photonics Technology Letters, vol. 4, No. 1, Jan. 1992, pp. 69–72.

Hill et al., "CW Three–Wave Mixing in Single–Mode Optical Fibers", J. Appl. Phys. vol. 49, No. 10, Oct. 1978, pp. 5098–5106.

Shibata et al., "Phase–Mismatch Dependence of Efficiency of Wave Mixing in A Single–Mode Optical Fiberrr", IEEE Journal of Quantum Electronics, vol. QE–23, No. 7, Jul. 1987, pp. 1205–1209.

Hamaide et al., "Limitations in Long Haul IM/DD Optical Fiber Systems Caused by Chromatic Dispersion and Non-Linear Kerr Effect", Electronics Letters, vol. 26, No. 18, Aug. 30, 1990,pp. 1451–1453.

Maeda et al., The Effect of Four–Wave Mixing in Fibers on Optical Frequency–Division Multiplexed Systems, IEEE Journal of Lightwave Technology, vol. 8, No. 9, Sep. 1990, pp.1402–1408.

Schadt et al., Numerical Investigation of Signal Degradation Due to Four–Wave Mixing in a 21–Channel 2.5 Gb/s Coherent Heterodyne DPSK System, IEEE Jnl of Lightwave Tech. vol. 9, No. 9, Sep. 1991.

Inoue, Four–Wave Mixing in an Optical Fiber in the Zero-Dispersion Wavelength Region, IEEE Journal of Lightwave Technology, vol. 10, No. 11, Nov. 1992, pp. 1553–1561.

Inoue, "Phase–Mismatching Characteristic of Four–Wave Mixing in Fiber Lines with Multistage Optical Amplifiers", Optics Letters, vol. 17, No. 11, Jun. 1, 1992, pp. 801–803.

Forghieri et al., "Reduction of Four–Wave–Mixing Cross Talk in WDM Systems Using Unequally Spaced Channels", OFC/IOOC '93 Technical Digest, Feb. 1992, p. 252.

Aoyama et al., Design and Operation of Transmission Lines Containing ER–Doped Fiber Amplifier Repeaters, IEEE Globecom '92, 1992, pp. 1875–1879.

A. Chraplyvy, "Limitations in Long–Haul Trnasmission Systems", OFC/IOOC '93 Technical Digest, Feb. 1993, p. 249.

Kurtzke et al., "Impact of Fiber Four–photon Mixing on the Design of n–channel Megameter Optical Communication Systems", OFC/IOOC '93 Technical Digest, Feb. 1993, p. 251.

"Frequency Allocation for Terrestrial Line Systems Using WDM and OFA's", ITU Telecommunication Standardization Sector, Com. 15–235–D, May 1994.

"Draft Recommendation G.mes: Optical Interfaces For Multichannel Systems with Optical Amplifiers", ITU Telecommunication Standardization Sector, Com. 15–282–E, Study Group 15 –Contribution 282; Mar. 1996.

"Report Of Study Group 15 –Recommendations to be Submitted to the Rules of Resolution 1 (Section 8) at the Next Meeting of Study Group 15", ITU Telecommunications Standardization Sector, Com. 15–R 3–E, May 1997.

M. Aiki, "Limitation in long–haul optical–amplifier transmission systems", OFC/IOOC '93 Technical Digest, Feb. 1993, p. 250.

* cited by examiner

OPTICAL AMPLIFIER WHICH COMPENSATES FOR DISPERSION OF A WDM OPTICAL SIGNAL

This application is divisional of application Ser. No. 08/917,292, filed Aug. 25, 1997, now pending, which is a continuation of application Ser. No. 08/781,137, filed Jan. 9, 1997, issued as U.S. Pat. No. 5,696,614, and which is a continuation of application Ser. No. 08/233,830, filed Apr. 26, 1994.

BACKGROUND OF THE INVENTION

1. Field of the Invention

This invention relates to an optical wavelength multiplex transmission method which uses a band around a zero dispersion wavelength of an optical fiber and an optical dispersion compensation method for compensating for waveform degradation by a synergetic effect (hereinafter referred to as SPM-GVD effect) of self phase modulation (SPM) and chromatic dispersion (group velocity dispersion: GVD) which is one of several restrictive factors to the transmission distance and the transmission rate in a long-haul, very high-speed optical communication system which employs, for example, an erbium-doped optical fiber amplifier (Erbium-Doped Fiber Amplifier, hereinafter referred to as EDFA).

2. Description of the Related Art

In response to a remarkable increase in the amount of information in recent years, a communication system of a large capacity has become required, and investigations for construction of large capacity communication systems are frequently performed. For realization of a large capacity communication system, realization by an optical communication system is considered most promising. At present, an optical amplifier multi-repeater system which employs EDFAs is being put into practical use together with, for-example, a 2.4 Gb/s optical communication system. In the future, it is forecast that the amount of information will increase progressively as the information-oriented trend advances. It is therefore demanded to build up an optical communication system of an increased capacity corresponding to such increase of the amount of information.

Various methods are available to increase the capacity of an optical communication system, including a TDM (time-division multiplexing) method which involves multiplexing on the time base in order to increase the transmission rate, and a WDM (wavelength-division multiplexing: wherein the wavelength spacing is comparatively great and is called WDM, and wavelength-division multiplexing which involves high concentration multiplexing and is called FDM (frequency-division multiplexing)) method which involves multiplexing on the optical wavelength base.

Of the available methods, a multiplexing method like the TDM method requires an increase of speed of operation of electronic circuits in a transmitter and a receiver in order to increase the transmission rate. At present, several tens Gb/s is considered to be the limit to the speed of operation.

In contrast, with the WDM (FDM) method which makes use of the wide band property of an optical fiber, an increase of capacity to several tens to several hundreds Gb/s is possible by simultaneous exploitation of an increase of the transmission rate, and also the burden to electronic circuits is reduced since multiplexing and demultiplexing are performed simply in an optical region by means of an optical multiplexing apparatus and an optical demultiplexing apparatus (MUX/DEMUX) which employ optical couplers, optical filters and like elements.

In the WDM (FDM) method which involves wavelength multiplexing on the optical frequency base, however, an available band is restricted by gain band dependency of an optical amplifier or wavelength dependency of an optical part. Accordingly, in order to achieve an increase in capacity by multiplexing, the channel spacing must necessarily be decreased to decrease the bandwidth indicated by all channels. Further, in optical transmission of multi-Gigabits, the wavelength of an optical signal must necessarily be set in the proximity of a zero dispersion wavelength of an optical fiber since, otherwise, waveform degradation is caused by chromatic dispersion of the optical fiber.

In an optical communication system to which the WDM (FDM) method is applied in order to achieve such an increase in capacity as described above, however, if the channel spacing is decreased (taking the bandwidth into consideration) and optical signals are set in the proximity of a zero dispersion wavelength of the optical fiber (taking the chromatic dispersion into consideration), an influence of a non-linear effect of the optical fiber, particularly of four wave mixing (hereinafter referred to as FWM), becomes significant, and there is a subject to be solved in that the transmission may be disabled by crosstalk from another channel by such FWM. A similar subject resides in another case wherein wavelength multiplex transmission must be performed in a band in the proximity of the zero dispersion wavelength in order to achieve, for example, upgrading of an existing transmission line.

Meanwhile, as a factor of degradation of the transmission characteristic in the optical amplifier multi-repeater WDM method which particularly makes use of a band in the proximity of a zero dispersion wavelength of an optical fiber, crosstalk by FWM mentioned above is pointed out. The occurrence efficiency of such FWM depends upon the relationship between the zero dispersion wavelength of the optical fiber transmission line and the arrangement of channels.

Three characteristics including: 1. a zero dispersion wavelength, 2. a deviation in zero dispersion wavelength and 3. a dispersion slope (second-order dispersion) are listed as required characteristics for an optical fiber in the WDM method. Those characteristics are closely related to five factors including: a. wavelength multiplexing signal bandwidth, b. gain bandwidth of the EDFA among various optical amplifiers, c. guard band for suppressing FWM (to which the present invention is directed), d. limitation bandwidth by an SPM-GVD effect, and e. presence or absence of an inserted optical dispersion compensator.

By the way, as factors which restrict an increase in distance and an increase in speed of an optical communication system, there are limitations of the loss by an optical fiber and bandwidth limitation by chromatic dispersion. The loss limitation has been almost solved by realization of EDFAs, and it is possible to build up a very long-haul optical communication system for several thousand km or more.

However, the repeater span in a multi-repeater optical amplification system is restricted principally by two factors including: 1. optical SNR (signal to noise ratio) degradation caused by accumulation of ASE (spontaneous emission) from optical amplifier-repeaters, and 2. waveform degradation by an SPM-GVD effect caused by a Kerr effect.

It is already known that, of the two factors, the waveform degradation by an SPD-GVD effect can be compensated for using an optical dispersion compensator having a dispersion value of the opposite positive or negative sign to that of the optical fiber transmission line, and the waveform degradation by an SPM-GVD effect and a dispersion compensation effect can be simulated readily by solving a non-linear Schroedinger equation using the split-step Fourier method.

An optical dispersion compensator used for the object described above is required to cope with a dispersion amount of an optical fiber of a corresponding repeater section and to allow reduction of the number of steps and of the time necessary to realize an optimum dispersion compensation amount and reduction of the cost. Further, the optical dispersion compensation technique is important not only for a 1.55 μm dispersion shifted fiber (hereinafter referred to as DSF) transmission line network being laid at present but also for a long-haul, very high-speed optical communication system and an optical communication system of the WDM (FDM) method which make use of an existing 1.3 μm zero dispersion single mode fiber (hereinafter referred to as SMF) transmission line network.

In a very long-haul optical communication system for several thousand km or more, it is considered desirable to use the zero dispersion wavelength $\lambda_0$ of the optical fiber transmission line in order to prevent the dispersion penalty and to use the ordinary dispersion region (dispersion value D<0) of the optical fiber in order to minimize the non-linear effect. In order to satisfy the two contradictory requirements, a countermeasure has been proposed which makes use of the ordinary dispersion region for the transmission line and employs an optical dispersion compensator to reduce the apparent dispersion value equal to zero. The optical dispersion compensation technique is effective not only for DSF transmission but also for SMF transmission having a high dispersion value of approximately 18 ps/nm/km.

Various types of optical dispersion compensators have been proposed including dispersion compensating fiber type optical dispersion compensators, transversal filter type optical dispersion compensators and optical resonator type optical dispersion compensators. At present, a dispersion compensating fiber is considered promising from its advantage in that the dispersion compensation amount can be adjusted readily by varying the length of the fiber, and dispersion values higher(than −100 ps/(nm·km) have been obtained by contriving the profile of the core.

The zero dispersion wavelength of an actual optical fiber transmission line presents a deviation in a longitudinal direction. Further, in an optical communication system on land, since it is difficult to set the repeater span to a fixed value (as in a submarine optical communication system), the dispersion amount is not always fixed among different repeater sections. Therefore, ideally an optical dispersion compensator having an optimum dispersion compensation amount is inserted into each repeater section after an actual dispersion amount is measured for the repeater section. However, there is a subject in that such operation requires a great number of steps of operation, long time and a high cost to realize optimum optical dispersion compensators including measurement of dispersion amounts.

SUMMARY OF THE INVENTION

It is an object of the present invention to provide an optical wavelength multiplex transmission method wherein, where a band in the proximity of a zero dispersion wavelength of an optical fiber is used, optical signals are disposed at efficient channel spacings taking an influence of the band, the chromatic dispersion, and the FWM into consideration, to realize an optical communication system of an increased capacity which is not influenced by crosstalk by FWM.

It is another object of the present invention to provide an optical wavelength multiplex transmission method wherein the relationship between characteristics required for an optical fiber, particularly, the zero-dispersion wavelength and the deviation in zero-dispersion wavelength, and five specific factors related to the characteristics is made clear to allow establishment of channel arrangement of and transmission line designing for signal light by an optical amplifier multi-repeater WDM method.

It is a further object of the present invention to provide an optical dispersion compensation method by which waveform degradation by an SPM-GVD effect can be compensated for readily without designing or producing optical dispersion compensators suitable for individual transmission lines and dispersion compensation can be performed effectively even when the optical power is not so high that SPM (self phase modulation) does not take place very much, but only waveform degradation is caused by chromatic dispersion (GVD), thereby to reduce the number of steps and the time required to build up an optical communication system and to achieve reduction of the cost.

In order to attain the objects described above, according to an aspect of the present invention, there is provided an optical wavelength multiplex transmission method for multiplexing signal light waves of a plurality of channels having different wavelengths and transmitting the multiplexed signal light using an optical fiber, wherein a four wave mixing suppressing guard band of a predetermined bandwidth including a zero-dispersion wavelength of the optical fiber is set, and the signal light waves of the plurality of channels to be multiplexed are arranged on one of a shorter wavelength side and a longer wavelength side outside the guard band.

In the optical wavelength multiplex transmission method, when signal light waves of a plurality of channels having different wavelengths are multiplexed and transmitted using an optical fiber, since the signal light waves of the plurality of channels to be multiplexed are arranged on one of the shorter wavelength side and the longer wavelength side outside the four wave mixing suppressing guard band of the predetermined bandwidth including the zero-dispersion wavelength of the optical fiber, possible four wave mixing is suppressed. Consequently, an influence from another channel by crosstalk is suppressed.

According to another aspect of the present invention, there is provided an optical wavelength multiplex transmission method for multiplexing signal light waves of a plurality of channels having different wavelengths and transmitting the multiplexed signal light using an optical fiber, wherein a four wave mixing suppressing guard band of a predetermined bandwidth including a zero-dispersion wavelength of the optical fiber is set, and the signal light waves of the plurality of channels to be multiplexed are arranged on the opposite sides of a shorter wavelength side and a longer wavelength side outside the guard band.

In the optical wavelength multiplex transmission method, since signal light waves of a plurality of channels to be multiplexed are arranged on the opposite sides of the shorter wavelength side and the longer wavelength side outside the four wave mixing suppressing guard band, possible four wave mixing is suppressed. Consequently, an influence from another channel by crosstalk is suppressed and efficient utilization of the band can be achieved simultaneously.

The bandwidths of the guard bands may be set in an asymmetrical relationship on the shorter wavelength side and the longer wavelength side with respect to the zero-dispersion wavelength of the optical fiber. In this instance, the channel spacings between adjacent ones of the signal light waves of the plurality of channels may be set different on the shorter wavelength side and the longer wavelength side outside the guard band. Due to the channel spacings thus set, four wave mixing light produced between a signal light wave on the shorter wavelength side and another signal light wave on the longer wavelength side is prevented from coinciding with any of the wavelengths of the signal light waves.

Alternatively, the channel spacings between adjacent ones of the signal light waves of the plurality of channels on each of the shorter wavelength side and the longer wavelength side outside the guard band may be set to an integral number times a constant. Due to the channel spacings thus set, in addition to the advantage that an influence from another channel by crosstalk is suppressed, the channels on the shorter wavelength side and the longer wavelength side outside the guard band can be controlled using Fabry-Perot interferometers of a same characteristic. In this instance, preferably the channel spacings between the channels of the signal light waves of the plurality of channels on the opposite sides of the guard band are set to the integral number times the constant. Due to the channel spacings thus set, the channels on the opposite sides of the shorter wavelength side and the longer wavelength side outside the guard band can be controlled simultaneously using a single Fabry-Perot interferometer of a same characteristic. Or else, the signal light waves of the channels may be arranged such that the signal light waves of no pair or only one pair of ones of the channels have dispersion values which have an equal is absolute value. The arrangement further suppresses four wave mixing so that an influence from another channel by crosstalk can be further suppressed.

With the optical wavelength multiplex transmission methods described above, the following effects or advantages can be anticipated.

First, an influence of four wave mixing can be suppressed and the band can be utilized efficiently by arranging signal light waves efficiently. An optical communication system of a large capacity can be realized while maintaining high transmission quality. Second, even when a zero-dispersion wavelength is positioned within a band of an optical amplifier or within a band of an optical part, signal light waves can be arranged efficiently and compactly while suppressing an effect of four wave mixing within the limited band.

Third, since the channel spacings on the transmission side can be controlled by way of a single or a pair of Fabry-Perot interferometers and an interferometer of the same characteristic to that of the interferometers on the transmission side can be used also on the reception side, control on the transmission side can be simplified and selective reception is facilitated.

According to a further aspect of the present invention, there is provided an optical wavelength multiplex transmission method for multiplexing signal light waves of a plurality of channels having different wavelengths and transmitting the multiplexed signal light using an optical fiber, wherein, taking a zero-dispersion wavelength $\lambda_0$ of the optical fiber and a zero-dispersion wavelength deviation range $\pm\lambda_0$ of the optical fiber in its longitudinal direction into consideration, the signal light waves of the plurality of channels to be multiplexed are arranged on a shorter wavelength side than a shorter wavelength end $\lambda_0-\Delta\lambda_0$ of the zero-dispersion wavelength deviation range of the optical fiber.

In the optical wavelength multiplex transmission method, when signal light waves of a plurality of channels having different wavelengths are multiplexed and transmitted using an optical fiber, since the signal light waves of the plurality of channels to be multiplexed are arranged on the shorter wavelength side than the shorter wavelength end $\lambda_0-\Delta\lambda_0$ of the zero-dispersion wavelength deviation range of the optical fiber, the zero-dispersion wavelength deviation in the longitudinal direction of the optical fiber is taken into consideration and controlled on the shorter wavelength side of the zero-dispersion wavelength.

A four wave mixing suppressing guard band $\Delta\lambda_g$ may be provided on the shorter wavelength side than the shorter wavelength end $\lambda_0-\Delta\lambda_0$ of the zero-dispersion wavelength deviation range of the optical fiber, and the signal light waves of the plurality of channels may be arranged on a shorter wavelength side than a wavelength $\lambda_0-\Delta\lambda_0-\Delta\lambda_g$. In this instance, since the signal light wave of the plurality of channels are arranged on the shorter wavelength side than the wavelength $\lambda_0-\Delta\lambda_0-\Delta\lambda_g$, taking the four wave mixing suppressing guard band $\Delta\lambda_g$ into consideration, the zero-dispersion wavelength deviation in the longitudinal direction of the optical fiber is taken into consideration and controlled on the shorter wavelength side of the zero-dispersion wavelength. Thus simultaneously, an influence from another channel by crosstalk is suppressed.

According to a still further aspect of the present invention, there is provided an optical wavelength multiplex transmission method for multiplexing signal light waves of a plurality of channels having different wavelengths and transmitting the multiplexed signal light using an optical fiber, wherein, taking a zero-dispersion wavelength $\lambda_0$ of the optical fiber and a zero-dispersion wavelength deviation range $\pm\Delta\lambda_0$ of the optical fiber in its longitudinal direction into consideration, the signal light waves of the plurality of channels to be multiplexed are arranged on a longer wavelength side than a longer wavelength end $\Delta\lambda_0+\Delta\lambda_0$ of the zero-dispersion wavelength deviation range of the optical fiber.

In the optical wavelength multiplex transmission method, when signal light waves of a plurality of channels having different wavelengths are multiplexed and transmitted using an optical fiber, since the signal light waves of the plurality of channels to be multiplexed are arranged on the longer wavelength side than the longer wavelength end $\lambda_0+\Delta\lambda_0$ of the zero-dispersion wavelength deviation range of the optical fiber, the zero-dispersion wavelength deviation in the longitudinal direction of the optical fiber is taken into consideration and controlled on the longer wavelength side of the zero-dispersion wavelength. A four wave mixing suppressing guard band $\Delta\lambda_g$ may be provided on the longer wavelength side than the longer wavelength end $\lambda_0+\Delta\lambda_0$ of the zero-dispersion wavelength deviation range of the optical fiber, and the signal light waves of the plurality of channels may be arranged on a longer wavelength side than a wavelength $\lambda_0+\Delta\lambda_0+\Delta\lambda_g$. Due to the provision of the four wave mixing suppressing guard band $\Delta\lambda_g$ and the arrangement of the signal light waves, the zero-dispersion wavelength deviation in the longitudinal direction of the optical fiber is taken into consideration and controlled on the longer wavelength side of the zero-dispersion wavelength, and simultaneously, an influence of another channel by crosstalk is suppressed.

The signal light waves of the plurality of channels may be arranged within a transmissible band defined by an allowable dispersion value determined from a synergetic effect of self phase modulation and group velocity dispersion in the optical fiber. Where the signal light waves are arranged in this manner, they can be arranged taking wavelength degradation by an SPM-GVD effect into consideration. Further, although SPM does not take place very much and only waveform degradation by chromatic dispersion (GVD) occurs when the optical power is not very high, the signal light arrangement can be performed also taking such waveform degradation into consideration.

The signal light waves of the plurality of channels may be arranged outside the transmissible band defined by the allowable dispersion value determined from the synergetic effect of self phase modulation and group velocity dispersion in the optical fiber, and the zero dispersion wavelength $\lambda_0$ of the optical fiber may be apparently shifted using an optical dispersion compensator to apparently arrange the signal light waves of the plurality of channels into the transmissible band. Due to the arrangement of the signal light waves and the shift of the zero dispersion wavelength $\lambda_0$, the signal light waves can be arranged taking waveform degradation by an SPM-GVD effect into consideration.

The optical wavelength multiplex transmission method may be constructed such that, taking a dispersion compensation amount deviation range $\pm\delta\lambda_{DC}$ of the optical dispersion compensator into consideration, a band $\Delta\lambda_{WDM}$ within which the signal light waves of the plurality of channels are to be arranged is set expanding the same by the dispersion compensation amount deviation range $\delta\lambda_{DC}$ on the opposite sides of the longer wavelength side and the shorter wavelength side. Due to the band $\Delta\lambda_{WDM}$ thus set, the signal light waves can be arranged taking the dispersion compensation amount deviation of the optical dispersion compensator into consideration.

The signal light waves of the plurality of channels may be arranged in a gain band of an optical amplifier connected to the optical fiber. Due to the arrangement of the signal light waves, the powers of the signal light waves can be made equal to each other and also the receive characteristics of the signal light waves can be made equal to each other.

A band $\Delta\lambda_{WDM}$ within which the signal light waves of the plurality of channels are to be arranged may be set expanding the same in accordance with optical wavelength variations of the signal light waves of the plurality of channels. Due to the band $\Delta\lambda_{WDM}$ thus set, the productivity of light sources of the signal light waves and the variation of each signal light wave by the wavelength control accuracy are taken into consideration.

With the optical wavelength multiplex transmission methods described above, the following effects or advantages can be anticipated.

First, in a wavelength division multiplexing method which makes use of a band in the proximity of the zero-dispersion wavelength $\lambda_o$ of the optical fiber, the signal light waves of the individual channels can be arranged without being influenced by four wave mixing, and simultaneously, required characteristics regarding the zero-dispersion wavelength $\lambda_0$ for an optical fiber transmission line to be laid can be made clear. Consequently, channel arrangement of and transmission line designing for signal light by an optical amplifier multi-repeater WDM method can be established.

Second, the zero-dispersion wavelength deviation in the longitudinal direction of the optical fiber is taken into consideration and controlled, and simultaneously, an influence of four wave mixing is suppressed so that an influence from another channel by crosstalk is suppressed. Consequently, a high degree of transmission accuracy can be maintained.

Third, signal light waves can be arranged taking waveform degradation by an SPM-GVD effect into consideration, and where the signal light waves of different channels are arranged in the gain bandwidth $\Delta\lambda_{EDFA}$ of the EDFA, the powers of the signal light waves can be made equal to each other and the receive characteristics of the signal light waves can be made equal to each other.

Fourth, where a signal light band is set expanding the same in accordance with optical wavelength variations of the signal light waves of the channels, the variations of the signal light waves arising from the productivity and/or the wavelength control accuracy of light sources of the signal light waves such as semiconductor lasers are taken into consideration, and where an optical dispersion compensator is employed, by setting the signal light band expanding the same by a dispersion compensation amount deviation range on the opposite sides of the shorter wavelength side and the longer wavelength side, also the dispersion compensation amount deviation of the optical dispersion compensator is taken into consideration. Consequently, optical transmission of higher reliability can be achieved.

According to a yet further aspect of the present invention, there is provided an optical dispersion compensation method for compensating for a dispersion amount of an optical transmission system which includes a transmitter, a repeater and a receiver and transmits signal light from the transmitter to the receiver by way of the repeater, comprising the steps of preparing in advance two kinds of optical dispersion compensator units having dispersion amounts having different positive and negative signs, inserting the two kinds of optical dispersion compensator units separately into the optical transmission system, and selecting one of the two kinds of optical dispersion compensator units which provides a better transmission characteristic to the optical transmission system and incorporating the selected optical dispersion compensator unit into the optical transmission system.

In the optical dispersion compensation method, since two kinds of optical dispersion compensator units having dispersion amounts having different positive and negative signs are prepared in advance and inserted separately into an optical transmission system to select one of the two kinds of optical dispersion compensator units which provides a better transmission characteristic to the optical transmission system, the dispersion amount of the optical transmission system can be compensated for simply when an accurate dispersion amount cannot be measured but the zero-dispersion wavelength deviation can be grasped to some degree.

According to a yet further aspect of the present invention, there is provided an optical dispersion compensation method for compensating for a dispersion amount of an optical transmission system which includes a transmitter, a repeater and a receiver and transmits signal light from the transmitter to the receiver by way of the repeater, comprising the steps of preparing in advance two kinds of optical dispersion compensator units having dispersion amounts having different positive and negative signs, measuring a dispersion amount of the optical transmission system, and selecting one of the two kinds of optical dispersion compensator units which has a dispersion amount whose sign is opposite to that of a measured dispersion amount and incorporating the selected optical dispersion compensator unit into the optical transmission system.

In the optical dispersion compensation method, since two kinds of optical-dispersion compensator units having dispersion amounts having different positive and negative signs are prepared in advance and, when the dispersion amount of an optical transmission system can be measured, the dispersion amount is measured and then one of the two kinds of optical dispersion compensator units which has a dispersion value whose sign is opposite to that of a thus measured dispersion value is selected, the dispersion amount of the optical transmission system can be compensated for further reliably.

According to a yet further aspect of the present invention, there is provided an optical dispersion compensation method for compensating for a dispersion amount of an optical transmission system which includes a transmitter, a repeater and a receiver and transmits signal light from the transmitter to the receiver by way of the repeater, comprising the steps of preparing in advance a plurality of kinds of optical dispersion compensator units having different dispersion amounts having different positive and negative signs, selectively inserting the plurality of kinds of optical dispersion compensator units into the optical transmission system changing the installation number and the combination of the optical dispersion compensator units, and selecting an installation number and a combination of the optical dispersion compensator units from within the plurality of kinds of optical dispersion compensator units which provide a good transmission characteristic to the optical transmission system and incorporating the optical dispersion compensator units of the selected installation number and combination into the optical transmission system.

In the optical dispersion compensation method, since a plurality of kinds of optical dispersion compensator units having different dispersion amounts having different positive and negative signs are prepared in advance and selectively inserted into an optical transmission system changing the installation number and the combination of the optical dispersion compensator units and then an installation number and a combination of the optical dispersion compensator units which provide a good transmission characteristic to the optical transmission system are selected from within the plurality of kinds of optical dispersion compensator units, the dispersion amount of the optical transmission system can be compensated for simply and optimally when the zero-dispersion wavelength deviation is unknown or the zero-dispersion wavelength and the wavelengths of the signal light waves are displaced by great amounts from each other.

According to a yet further aspect of the present invention, there is provided an optical dispersion compensation method for compensating for a dispersion amount of an optical transmission system which includes a transmitter, a repeater and a receiver and transmits signal light from the transmitter to the receiver by way of the repeater, comprising the steps of preparing in advance a plurality of kinds of optical dispersion compensator units having different dispersion amounts having different positive and negative signs, measuring a dispersion amount of the optical transmission system, and selecting an installation number and a combination of the optical dispersion compensator units from within the plurality of kinds of optical dispersion compensator units, with which dispersion values of the signal light waves fall within a transmissible dispersion value range, in accordance with a measured dispersion value and incorporating the optical dispersion compensator units of the selected installation number and combination into the optical transmission system.

In the optical dispersion compensation method, since a plurality of kinds of optical dispersion compensator units having different dispersion amounts having different positive and negative signs are prepared in advance and, when the dispersion amount of an optical transmission system can be measured, the dispersion amount is measured and then an optimum installation number and an optimum combination of such optical dispersion compensator units are selected in accordance with a thus measured dispersion amount, the dispersion amount of the optical transmission system can be compensated for so that it may fall within an allowable dispersion value range with certainty.

The optical dispersion compensator units may be additionally incorporated into at least one of the transmitter, the repeater and the receiver of the optical transmission system to incorporate the optical dispersion compensator units into the optical transmission system.

When the optical transmission system performs optical wavelength multiplex transmission to multiplex and transmit signal light waves of a plurality of channels having different wavelengths, the signal light waves may be demultiplexed for each one wave by wavelength demultiplexing and the optical dispersion compensator units may be provided for the individual channels of the signal light waves of the wavelengths in the optical transmission system, or the signal light waves may be demultiplexed for each plurality of waves and the optical dispersion compensator units may be provided for the individual channel groups each including a plurality of signal light waves in the optical transmission system, or else the optical dispersion compensator units may be provided for all of the signal light waves of the plurality of channels in the optical transmission system.

Each of the optical dispersion compensator units may be additionally provided with an optical amplifier for compensating for an optical loss of the optical dispersion compensator unit. Due to the additional provision of the optical amplifier, the optical loss of each optical dispersion compensator unit can be compensated for. In this instance, a pair of optical amplifiers may be additionally provided at a preceding stage and a next stage to each of the optical dispersion compensator units. Due to the additional provision of the optical amplifiers, the noise figure (hereinafter referred to as simply NF) of the optical amplifier at the preceding stage can be set low.

The optical dispersion compensator units may be constructed as a package wherein they are mounted on a circuit board so that the optical dispersion compensator units may be replaced or incorporated in units of a package. Due to the construction of the optical dispersion compensator units, the dispersion compensation amount can be varied readily.

According to a yet further aspect of the present invention, there is provided an optical dispersion compensation method for compensating for a dispersion amount of an optical transmission system which includes a transmitter, a repeater and a receiver and transmits signal light from the transmitter to the receiver by way of the repeater, comprising the steps of incorporating, in advance into at least one of the transmitter, the repeater and the receiver of the optical transmission system, a plurality of kinds of optical dispersion compensator units having different dispersion amounts having different positive and negative signs in such a connected condition as to allow switching of a selective combination of the optical dispersion compensator units by means of switching means, and operating the switching means to select a suitable combination of the optical dispersion compensator units from within the plurality of types of optical dispersion compensator units and incorporating the optical dispersion compensator units of the selected combination into the optical transmission system.

In the optical dispersion compensation method, since a plurality of kinds of optical dispersion compensator units having different dispersion amounts having different positive and negative signs are incorporated in advance in at least one of a transmitter, a repeater and a receiver of an optical transmission system in such a connected condition as to allow switching of a selective combination of the optical dispersion compensator units by means of switching means, a suitable combination of the optical dispersion compensator units can be selected from within the plurality of types of optical dispersion compensator units.

The switching means may be operated in response to a control signal from the outside. In this instance, the optical dispersion compensation method may be constructed such that the switching means is operated in response to a control signal from the receiver to switch the combination of the optical dispersion compensator units while a transmission characteristic of the optical transmission system is measured simultaneously by the receiver to determine a combination of the optical dispersion compensator units which provides an optimum transmission characteristic to the optical transmission system; and the switching means is operated in response to another control signal from the receiver to switch the combination of the optical dispersion compensator units to the determined combination which provides the optimum transmission characteristic to the optical transmission system. The switching means may include a mechanical switch or an optical switch.

With the optical dispersion compensation methods described above, the following effect or advantage can be achieved. In particular, waveform deterioration by an SPM-GVD effect and/or the dispersion amount of a guard band can be compensated for readily without designing or producing optical dispersion compensators suitable for individual transmission lines, and reduction of the number of steps and the time required to build up an optical communication system can be realized.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS

A. First Embodiment

FIGS. 1 to 4 illustrate an optical wavelength multiplex transmission method according to a first preferred embodiment of the present invention.

Figure 2:
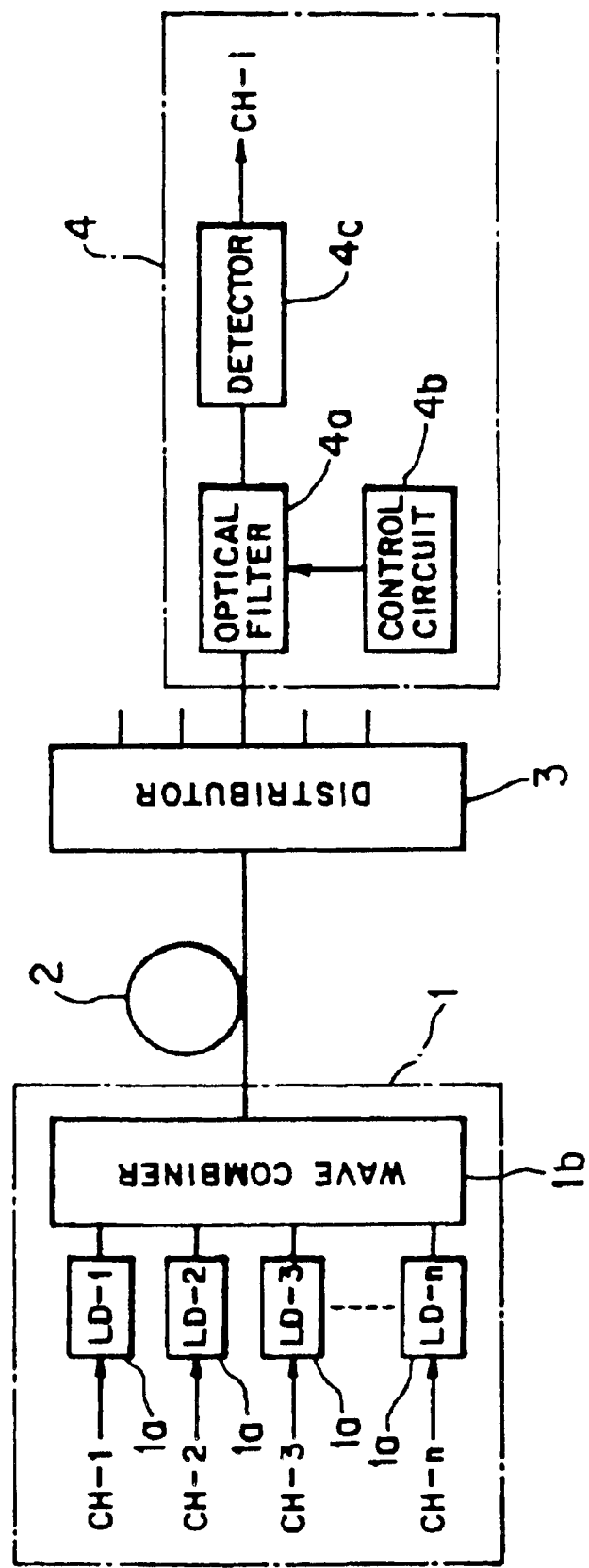
FIG. 2 is a block diagram showing the construction of an optical WDM distribution transmission system to which the optical wavelength multiplex transmission method of the first embodiment of the present invention is applied.

First, an optical WDM distribution transmission system to which the optical wavelength multiplex transmission method of the present embodiment is applied will be described. Referring to FIG. 2, the optical WDM distribution transmission system shown includes a transmission circuit 1 which multiplexes signals from a plurality of channels into signal light waves having different frequencies or wavelengths in a high density.

The transmission circuit 1 includes a laser diode (LD-1 to LD-n) 1a provided for each of the channels CH-1 to CH-n, and a wave combiner 1b for receiving signal light waves from the laser diodes 1a of the channels and multiplexing the received signal light waves.

The optical WDM distribution transmission system further includes an optical fiber 2 for transmitting multiplexed signal light waves from the transmission circuit 1, a distributor 3 for distributing a signal from the optical fiber 2 among different channels, and a reception circuit 4 provided for each of the channels CH-i (i=1 to n) for receiving signal light of a frequency or wavelength allocated to the channel. Each of the reception circuits 4 includes an optical filter 4a for extracting and outputting a corresponding signal from multiplexed signal light, a control circuit 4b for controlling the optical filter 4a, and a detector 4c for detecting signal light from the optical filter 4a.

By the way, FWM as a non-linear effect of the optical fiber 2 is a phenomenon which is produced by optical frequency mixing between different signal light waves having different frequencies or wavelengths from each other when the signal light waves are multiplexed and inputted to the optical fiber 2 using a band in the proximity of the zero-dispersion wavelength of the optical fiber 2, and makes a factor of crosstalk from another channel and degrades the signal transmission characteristic. The FWM which is a non-linear effect of the optical fiber 2 has a most significant influence upon optical WDM (FDM) transmission which employs a band in the proximity of the zero-dispersion wavelength of the optical fiber 2. In order to give a more detailed description of the FWM, a system design which must be performed taking an influence of the FWM into consideration, particularly, the channel spacing, the channel arrangement and the input power, will be described below.

For example, when signal light waves of frequencies $f_1$ to $f_n$ (wavelengths $\lambda_1$ to $\lambda_n$) are inputted, a fourth light wave of a frequency flak (wavelength $\lambda_{ijk}$; i≠k, j≠k) is generated from arbitrary three waves $f_1$, $f_j$ and $f_k$ (wavelengths $\lambda_1$, $\lambda_j$ and $\lambda_k$) of the signal light waves in accordance with the third-order non-linear susceptibility $\lambda_{1111}$ of the optical fiber 2, and makes an FWM wave. The FWM wave of the frequency $f_{ijk}$ (frequency $\lambda_{ijk}$) appears at the position of an optical frequency which satisfies the following equation (1). When the number of channels is great with an equal frequency spacing, several FWM waves appear at the positions of the frequencies $f_{ijk}$ (wavelengths $\lambda_{ijk}$) according to combinations of i, j and k and are superimposed on signal light waves. Consequently, the crosstalk is further degraded.

$$f_{ijk}=f_i+f_j-f_k(\lambda_{ijk}=\lambda_i+\lambda_j-\lambda_k) \quad (1)$$

Meanwhile, the frequency $f_{ijk}$ (wavelength $\lambda_{ijk}$) exhibits a high occurrence efficiency in the proximity of the zero-dispersion wavelength, and the efficiency is varied by the phase relationship among the frequencies $f_i$, $f_j$, $f_k$ and fink (wavelengths $\lambda_i$, $\lambda_j$ and $\lambda_{ijk}$), or the efficiency becomes higher as the phase inconsistency amount αβ, which will be hereinafter described, increases.

Generally, where polarization conditions of three signal channels coincide with each other, the optical power $P_{ijk}$ of an FWM wave is given by the following equation (2):

$$P_{ijk}=\eta_{ijk} \cdot \{(1,0247\pi^6 \cdot \chi_{1111}{}^2 \cdot d^2)/n^4 \cdot \lambda^2 \cdot c^2\} \cdot (L_{\mathit{eff}}/A_{\mathit{eff}})^2 \cdot P_i \cdot P_j \cdot P_k \cdot \exp(-\alpha L) \quad (2)$$

where $\eta_{ijk}$ is the occurrence efficiency of the frequency $f_{ijk}$ (wavelength $\lambda_{ijk}$), $\chi_{1111}$ is the third-order non-linear susceptibility, d is the degeneracy coefficient (d=6 when i≠j≠k, and d=3 when i=j≠k), n is the refraction index of the core, λ is the signal wavelength, c is the velocity of light, $L_{\mathit{eff}}$ is the effective optical fiber length given by the equation (3) given below, $A_{\mathit{eff}}$ is the effective core area (=$\pi W^2$, W is the mode field diameter), α is the attenuation coefficient of the optical fiber, and $P_i$, $P_j$ and $P_k$ are the input powers of signal light waves of the frequencies $f_i$, $f_j$, and $f_k$ (wavelengths $\lambda_i$, $\lambda_j$ and $\lambda_k$), respectively.

$$L_{eff} = \{1 - \exp(-\alpha L)\}/\alpha \quad (3)$$

where the occurrence efficiency $\eta_{ijk}$ (=7) is given by the following equation (4):

$$\eta = \alpha^2 \cdot [1 + 4\exp(-\alpha L) \cdot \sin^2(\Delta\beta L/2)/\{1-\exp(-\alpha L)\}^2]/(\alpha^2 + \Delta\beta^2) \quad (4)$$

where L is the optical fiber length, and $\Delta\beta$ is the phase inconsistency amount. Further, if it is assumed that the dispersion slope $dD/d\lambda$ of the optical fiber 2 is fixed with respect to the wavelength, the phase inconsistency amount $\Delta\beta$ is given by the equation (5) or (6) below:

a. In the case of $f_i \neq f_j \neq f_k$ ($\lambda_i \neq \lambda_j \neq \lambda_k$);

$$\Delta\beta = (\pi\lambda^4/3c^2) \cdot (dD/d\lambda) \cdot \{(f_i + f_j - f_k - f_0)^3 - (f_i - f_0)^3 - (f_j - f_0)^3 + (f_k - f_0)^3\} \quad (5)$$

b. In the case of $f_i = f_j \neq f_k$ ($\lambda_i = \lambda_j \neq \lambda_k$);

$$\Delta\beta = (\zeta\lambda^4/c^2) \cdot (dD/d\lambda) \cdot 2 \cdot (f_i - f_0) \cdot (f_i - f_k)^2 \quad (6)$$

where D is the chromatic dispersion of the optical fiber, $dD/d\lambda$ is the chromatic dispersion of the second order of the optical fiber, and $f_0$ is the zero-dispersion optical frequency. It is to be noted that the equations (5) and (6) stand also where the frequencies $f_i$, $f_j$, $f_k$ and $f_0$ are replaced by the wavelengths $\lambda_i$, $\lambda_j$, $\lambda_k$ and $\lambda_0$ respectively.

Where a plurality of channels are involved, combinations of i, j and k of FWM waves which appear at the positions of the frequency $f_{ijk}$ (wavelength $\lambda_{ijk}$) are calculated, and optical powers $P_{ijk}$ are individually calculated for them. Then, the sum total of the optical powers $P_{ijk}$ makes an optical power of the FWM wave produced at the position of the frequency $f_{ijk}$ (wavelength $\lambda_{ijk}$). Using the sum total of the optical powers, a crosstalk amount CR is calculated in accordance with the following equation (7);

$$CR = 10 \cdot \log\{(\text{sum total of all FWM optical powers appearing at positions of } f_{ijk})/(\text{signal optical power at positions of } f_{ijk})\} \quad (7)$$

The influence of FWM can be estimated using the equations (2) and (4) to (7), which allows designing of values of parameters of the system such as a channel spacing, a channel arrangement and an input power. In the description of action and effects of the first to sixth embodiments of the invention given below, an estimated influence of FWM (refer to FIGS. 3, 4, 7, 11 or 12) obtained in accordance with the equations given hereinabove will be used suitably.

As described hereinabove, in order to prevent waveform deterioration by dispersion of the optical fiber 2, it is necessary to make use of a band in the proximity of the zero-dispersion wavelength of the optical fiber and also to assure a channel spacing and a signal channel arrangement taking an influence of FWM, which appears significantly when the band is used for multiplexing, into consideration. To this end, in the optical wavelength multiplex transmission method according to the first embodiment of the present invention, signal light waves of different channels are arranged, for example, as illustrated in FIG. 1.

Figure 1:
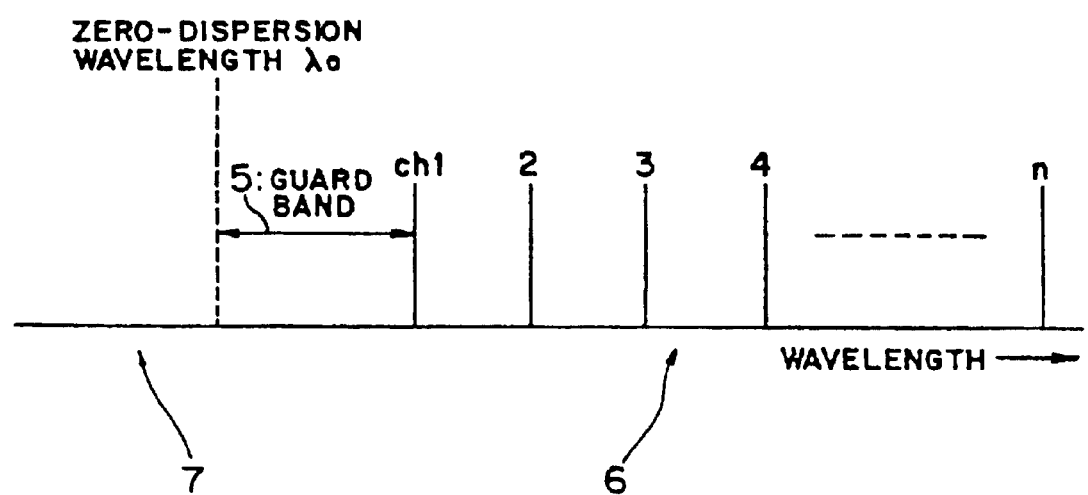
FIG. 1 is a diagrammatic view illustrating the arrangement of signal light waves of a plurality of channels according to an optical wavelength multiplex transmission method of a first preferred embodiment of the present invention.

According to such a channel arrangement as illustrated in FIG. 1, an FWM suppressing guard band 5 of a fixed width ranging from a zero-dispersion wavelength $\lambda_0$ is provided, and signal light waves are disposed on the longer wavelength side 6 than the zero-dispersion wavelength $\lambda_0$ outside the guard band 5.

Due to the construction described above, in the optical wavelength multiplex transmission system to which the optical wavelength multiplex transmission method according to the first embodiment of the present invention is applied, signals from the different channels are multiplexed in a high density as signal light waves of different frequencies or wavelengths from one another by the transmission circuit 1 and transmitted by way of the optical fiber 2.

The signal light waves transmitted by way of the optical fiber 2 are demultiplexed by the distributor 3 and inputted to the reception circuits 4 of the corresponding channels and detected as signal light waves of the frequencies or wavelengths corresponding to the input channels.

Figure 3:
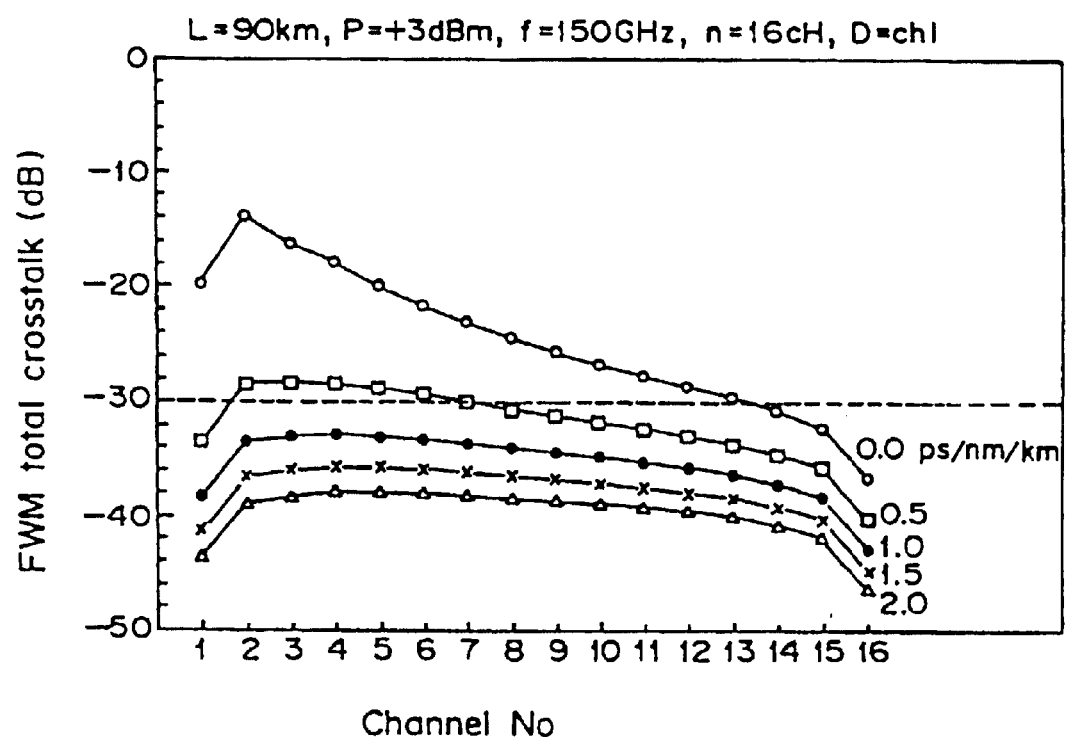
FIGS. 3 and 4 are diagrams illustrating operation of the first embodiment of the present invention.

In this instance, where the system is constructed, for example, such that the number of channels of the transmission circuit 1 is 16 (n=16); the channel spacing is 150 GHz; the length L of the optical fiber 2 is 90 km; and the optical input power P of each channel is +3 dBm, the results of calculation of crosstalk amounts of the channels are such as illustrated in FIG. 3. The parameters used for the calculation are $\chi_{1111} = 5.0 \times 10^{-15}$ cm$^3$/erg(esu), $A_{eff} = 4.6 \times 10^{-11}$ m$^2$, $\alpha = 5.2958 \times 10^{-5}$ m$^{-1}$ (0.23 dB/km), and $dD/d\lambda = 0.065$ ps/(km·nm$^2$).

In FIG. 3, such a representation as "0.0 ps/nm/km" indicates a value of dispersion at the channel 1 CH1. As the channel number (CH No.) increases, the dispersion value increases in accordance with the dispersion slope $dD/d\lambda$. From the results illustrated in FIG. 3, the crosstalk amounts at the channels CH2, CH3 and CH4 exhibit comparatively high values.

Figure 4:
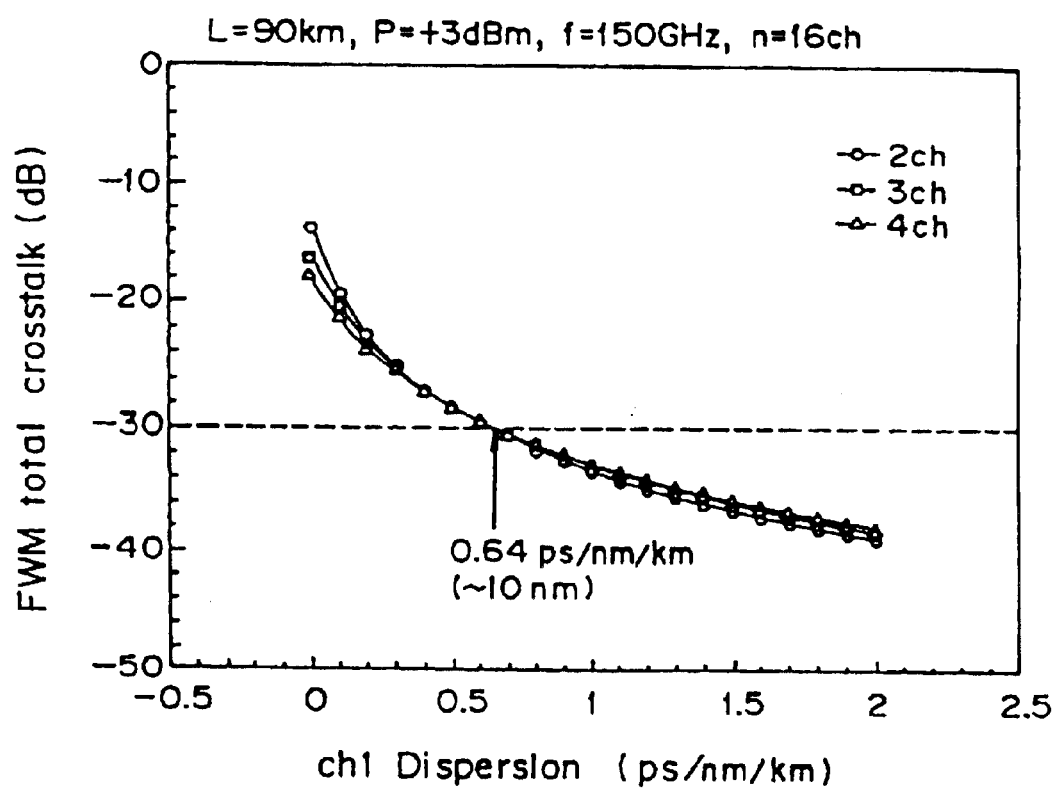

Results of calculation performed paying attention to the channels CH2, CH3 and CH4 are illustrated in FIG. 4. As seen from FIG. 4, in order to suppress the crosstalk amount, for example, below 30 dB, the dispersion value of the channel CH1 should be 0.64 ps/nm/km or more, and where, for example, $dD/d\lambda = 0.065$ ps/(km·nm$^2$), the channel CH1 should be displaced approximately 10 nm from the zero-dispersion wavelength $\lambda_0$. Accordingly, the guard band 5 should have a width of 10 nm.

In this manner, according to the optical wavelength multiplex transmission method of the first embodiment, by arranging signal light waves of different channels from the zero-dispersion wavelength $\lambda_0$ of the optical fiber 2 with the guard band 5 interposed therebetween, an influence of FWM can be suppressed and an influence from another channel by crosstalk can be suppressed. Further, since the band can be utilized efficiently, an optical communication system of an increased capacity can be realized while maintaining a high degree of transmission accuracy.

It is to be noted that, while, in the present embodiment, signal light waves are arranged on the longer wavelength side 6 with respect to the zero-dispersion wavelength $\lambda_0$, they may alternatively be arranged on a shorter wavelength side 7 with respect to the zero-dispersion wavelength $\lambda_0$ with the guard band interposed therebetween.

B. Second Embodiment

Figure 5:
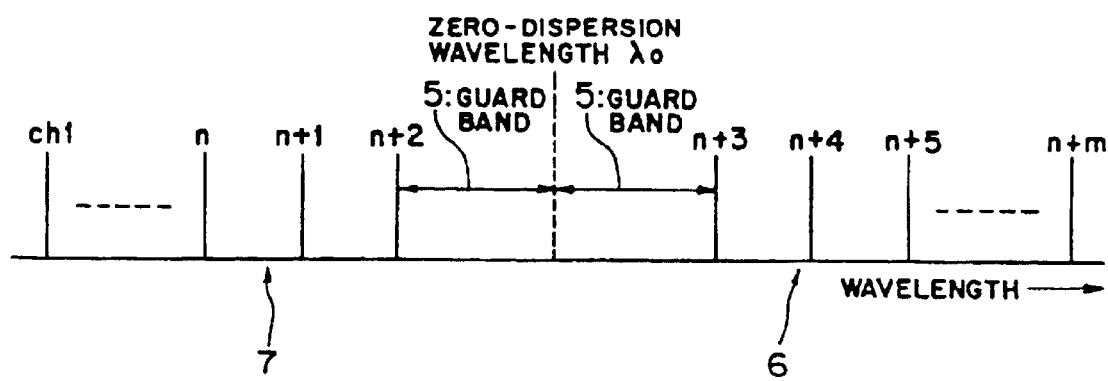
FIG. 5 is a diagrammatic view illustrating the arrangement of signal light waves of a plurality of channels according to an optical wavelength multiplex transmission method of a second preferred embodiment of the present invention.

Subsequently, an optical wavelength multiplex transmission method according to a second preferred embodiment of the present invention will be described. FIG. 5 illustrates an arrangement of signal light waves of a plurality of channels of the optical wavelength multiplex transmission method. It is to be noted that also the optical wavelength multiplex transmission method of the second embodiment is applied to a system similar to the optical WDM (FDM) distribution transmission system described hereinabove with reference to FIG. 2, and overlapping description of the same will be omitted herein to avoid redundancy.

In the optical wavelength multiplex transmission method according to the present embodiment, a pair of FWM suppressing guard bands 5 are provided on the opposite sides of the zero-dispersion wavelength $\lambda_0$, and signal light waves of different channels are arranged on the shorter wavelength side 7 and the longer wavelength side 6 outside the guard bands 5.

Due to the channel arrangement described above, with the optical wavelength multiplex transmission method of the second embodiment, even if the zero-dispersion wavelength $\lambda_0$ is positioned within a band of an optical amplifier or of an optical part, signal light waves can be arranged efficiently and compactly while suppressing an effect of FWM in the limited band to suppress an influence from another channel by crosstalk, and accordingly, there is an advantage in that an increase of the capacity of the system can be realized while maintaining a high degree of transmission accuracy.

C. Third Embodiment

Figure 6:
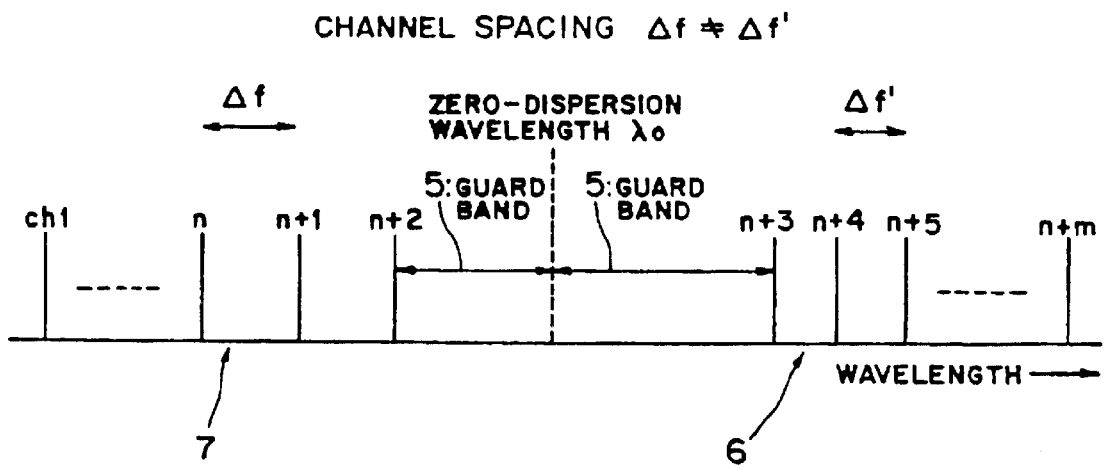
FIG. 6 is a similar view but illustrating the arrangement of signal light waves of a plurality of channels according to an optical wavelength multiplex transmission method of a third preferred embodiment of the present invention.
Figure 7:
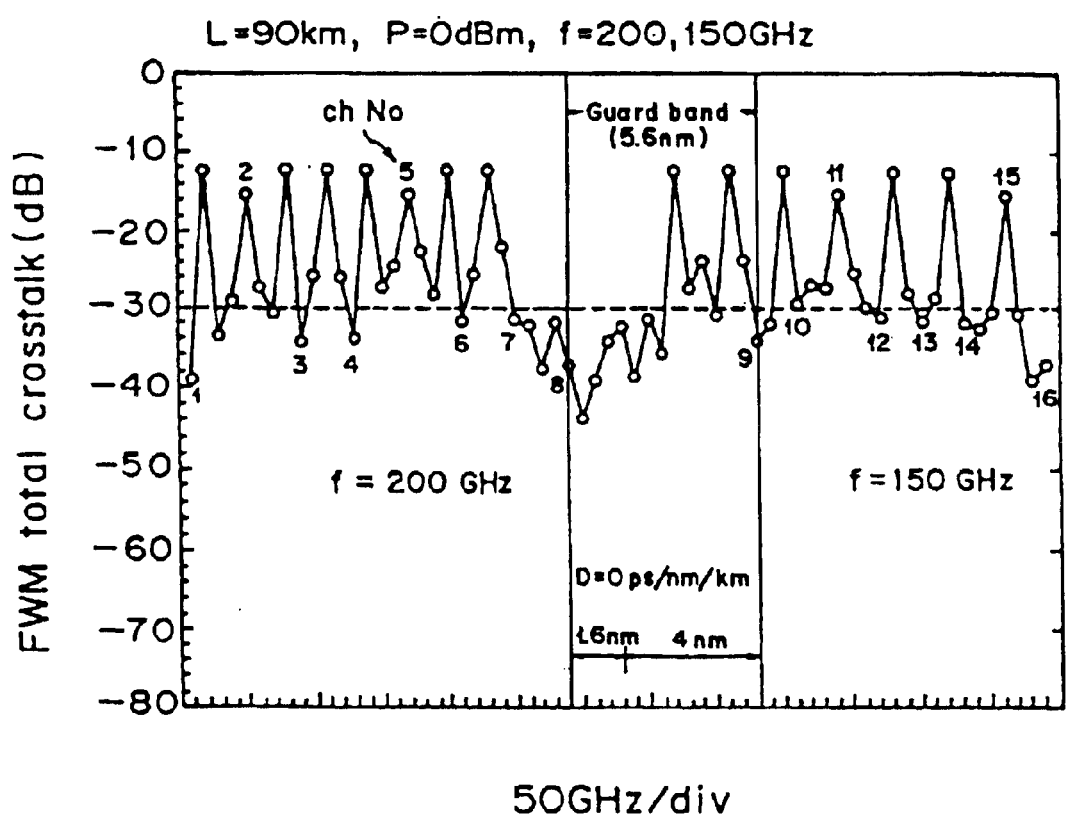
FIG. 7 is a diagram illustrating operation of the third embodiment of the present invention.

Subsequently, an optical wavelength multiplex transmission method according to a third preferred embodiment of the present invention will be described. FIG. 6 illustrates an arrangement of signal light waves of a plurality of channels of the optical wavelength multiplex transmission method, and FIG. 7 illustrates operation according to the optical wavelength multiplex transmission method. It is to be noted that also the optical wavelength multiplex transmission method of the third embodiment is applied to a system similar to the optical WDM (FDM) distribution transmission system described hereinabove with reference to FIG. 2, and overlapping description of the same will be omitted herein to avoid redundancy.

According to the optical wavelength multiplex transmission method of the third embodiment, as shown in FIG. 6, a pair of FWM suppressing guard bands 5 are provided in an asymmetrical relationship on the shorter wavelength side 7 and the longer wavelength side 6 with respect to the zero-dispersion wavelength $\lambda_0$, and signal light waves to be multiplexed are arranged such that the channel spacing thereof is set different between the shorter wave side 7 ($\Delta f$) and the longer wavelength side 6 ($\Delta f'$).

Since the channel spacing is set different between the shorter and longer wavelength sides (with respect to the guard bands 5), it can be prevented that the position at which FWM light appears between signal light on the shorter wavelength side and signal light on the longer wavelength side (with respect to the guard bands) coincides with some signal light wavelength, and consequently, an influence from another channel by crosstalk is suppressed. Here, the width by which the band in which FWM light may appear is displaced from the band of the signal light is desirably set within a range within which the width can be suppressed by the optical filter 4a on the reception side.

Where the channel spacing is made different between the left and the right such that it is set, for example, as shown in FIG. 7, to 200 GHz on the shorter wavelength side 7 and to 150 GHz on the longer wavelength side 6 and the width of the guard band 5 is set to 1.6 nm on the shorter wavelength side 7 and to 4 nm on the longer wavelength side 6, FWM light is produced between different channels, but production of FWM light is reduced within the bands of signal light and also the crosstalk amount is reduced.

In this manner, also with the optical wavelength multiplex transmission method of the third embodiment, since signal light waves of different channels are arranged on the opposite sides of the zero-dispersion wavelength $\lambda_0$ in a spaced relationship from the zero-dispersion wavelength $\lambda_0$ with the guard bands 5 interposed between them, an influence of FWM can be suppressed and an influence from another channel by crosstalk can be suppressed. Further, since the band can be utilized efficiently, there is an advantage in that an increase of the capacity of the system can be realized while maintaining a high degree of transmission accuracy.

D. Fourth Embodiment

Figure 8:
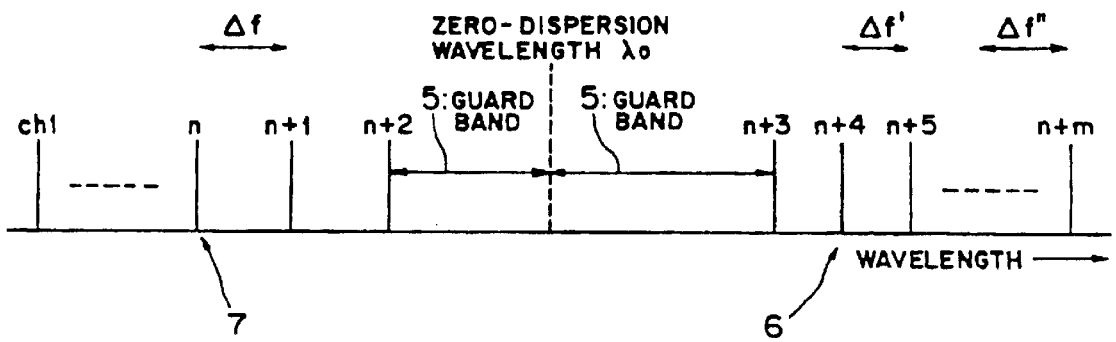
FIG. 8 is a diagrammatic view illustrating the arrangement of signal light waves of a plurality of channels according to an optical wavelength multiplex transmission method of a fourth preferred embodiment of the present invention.

Subsequently, an optical wavelength multiplex transmission method according to a fourth preferred embodiment of the present invention will be described. FIG. 8 illustrates an arrangement of signal light waves of a plurality of channels of the optical wavelength multiplex transmission method. It is to be noted that also the optical wavelength multiplex transmission method of the fourth embodiment is applied to a system similar to the optical WDM (FDM) distribution transmission system described hereinabove with reference to FIG. 2, and overlapping description of the same will be omitted herein to avoid redundancy.

In the optical wavelength multiplex transmission method of the fourth embodiment, the channel spacings on the shorter wavelength side 7 and the longer wavelength side 6 are set individually to a constant multiplied by different integral numbers as seen from FIG. 8.

If, for example, the channel spacing $\Delta f$ is $\Delta f = A \cdot X$, then the channel spacing between a channel n+4 and another channel n+5 is set to $\Delta f' = B \cdot X$, and the channel spacing between a channel n+m−1 and another channel n+m is set to $\Delta f'' = C \cdot X$. Here, X is the constant, and A, B and C are the integral numbers.

Further, as seen from FIG. 8, also in the present embodiment, the FWM suppression guard bands 5 are arranged asymmetrically on the shorter wavelength side 7 and the longer wavelength side 6 with respect to the zero-dispersion wavelength $\lambda_0$.

In the transmission circuit 1 shown in FIG. 2, it is required to stabilize the wavelengths of the laser diodes 1a in a desired channel arrangement and at a desired channel spacing, while in the reception circuit 4, it is required to select and extract a channel. The channel arrangement and the channel spacing required in order to suppress such an influence of FWM as described above are desired to be easy to control by the transmission circuit 1 and easy to extract by the reception circuit 4.

Generally, control of the channel spacing is performed making use of a periodic characteristic of an optical interferometer. When it is tried, for example, to perform control of the channel spacing using Fabry-Perot interferometers, if the desired channel spacing is equal to the distance between transmission peaks of the Fabry-Perot interferometers or equal to an integral number of times the distance between such transmission peaks, then if the wavelengths of the individual laser diodes 1a are stabilized at the positions of the transmission peaks using one of the Fabry-Perot interferometers as a reference, control of all of the channels can be realized simply. However, where the channels are arranged at different spacings, control is complicated.

From such point of view, by setting the channel spacings on the shorter wavelength side 7 and the longer wavelength side 6 (with respect to the zero-dispersion wavelength $\lambda_0$) to integral numbers of times a constant (distance of one period of transmission peaks of optical interferometers or an integral number of times the distance), channels on the shorter wavelength side 7 and the longer wavelength side 6 can be controlled by one or two Fabry-Perot interferometers of the same characteristic. This similarly applies to the reception circuit 4. In particular, by setting the channel spacings to integral numbers of times a constant, an interferometer of the same characteristic can be used.

In this manner, with the optical wavelength multiplex transmission method of the fourth embodiment, since the channel spacings on the transmission side can be controlled by means of a single or two Fabry-Perot interferometers, there is an advantage in that the control on the transmission side can be simplified.

This also applies to the reception side. In particular, by setting the channel spacings to integral numbers of times a constant, an interferometer having the same characteristic as that of the interferometers on the transmission side can be used. Consequently, there is an advantage in that selective reception is facilitated and the apparatus can be simplified.

It is to be noted that, in the present embodiment, the channel spacing between adjacent channels of signal light waves of a plurality of channels can be set such that it may be different on the shorter wavelength side 7 and the longer wavelength side 6 outside the guard bands 5.

E. Fifth Embodiment

Figure 9:
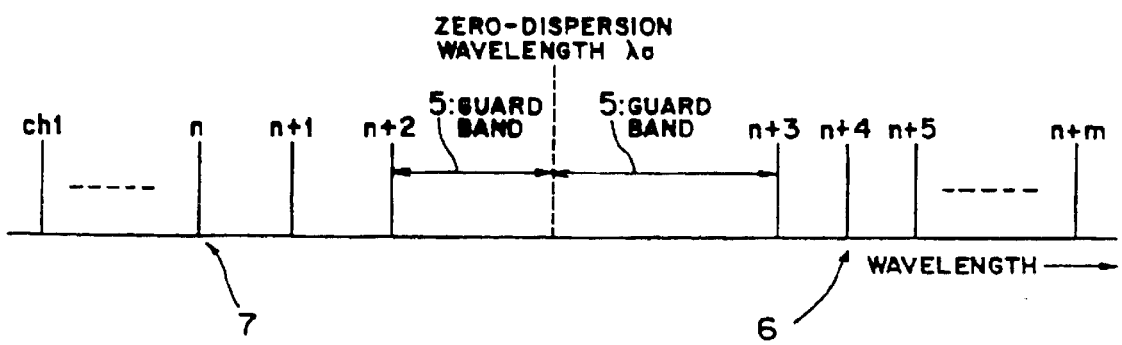
FIG. 9 is a similar view but illustrating the arrangement of signal light waves of a plurality of channels according to an optical wavelength multiplex transmission method of a fifth preferred embodiment of the present invention.

Subsequently, an optical wavelength multiplex transmission method according to a fifth preferred embodiment of the present invention will be described. FIG. 9 illustrates an arrangement of signal light waves of a plurality of channels of the optical wavelength multiplex transmission method. It is to be noted that also the optical wavelength multiplex transmission method of the fifth embodiment is applied to a system similar to the optical WDM (FDM) distribution transmission system described hereinabove with reference to FIG. 2, and overlapping description of the same will be omitted herein to avoid redundancy.

In the optical wavelength multiplex transmission method of the fifth embodiment, the frequencies or wavelengths of signal light waves of different channels are set such that the spacings between the signal light waves of the channels arranged on the opposite sides of the FWM suppression guard bands 5 may satisfy the relationship wherein the signal light waves are spaced from each other by spacings equal to integral numbers of times a constant on the opposite sides of the guard bands 5.

In particular, where the optical frequency of the channel CHi is represented by f, the optical frequency of an arbitrary channel j is set so as to satisfy f±A·X, where A is an integral number and X is a constant.

Due to the channel arrangement described above, with the optical wavelength multiplex transmission method of the fifth embodiment, the channel spacings on the opposite sides of the guard bands 5 can be set to integral numbers of times a constant (distance of one period of transmission peaks of an optical interferometer or an integral number of times the distance), and consequently, control of the channel spacings on the transmission side can be realized only with a single optical interferometer. Further, since it is only required to use an interferometer of the same characteristic on the reception side, there is an advantage in that selective reception is facilitated and the apparatus is simplified.

F. Sixth Embodiment

Figure 10:
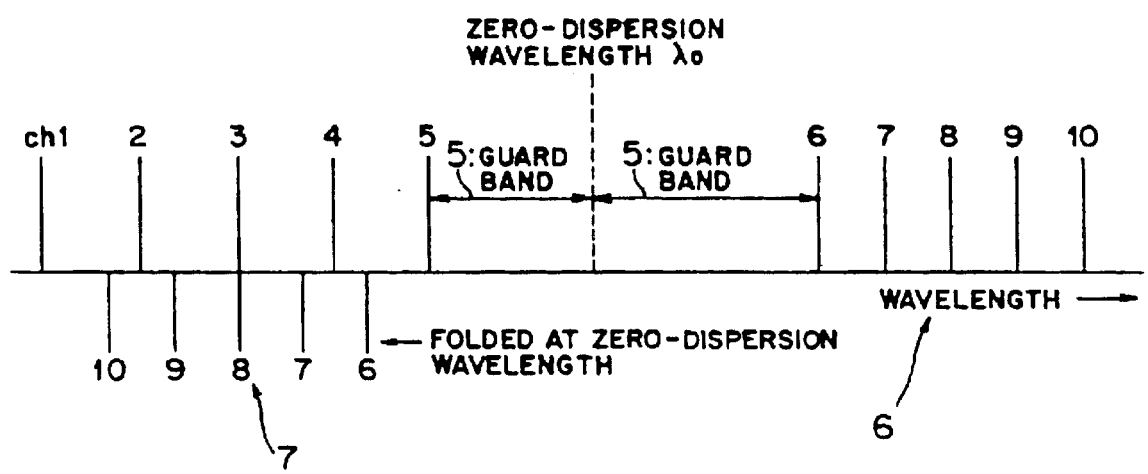
FIG. 10 is a similar view but illustrating the arrangement of signal light waves of a plurality of channels according to an optical wavelength multiplex transmission method of a sixth preferred embodiment of the present invention.
Figure 11:
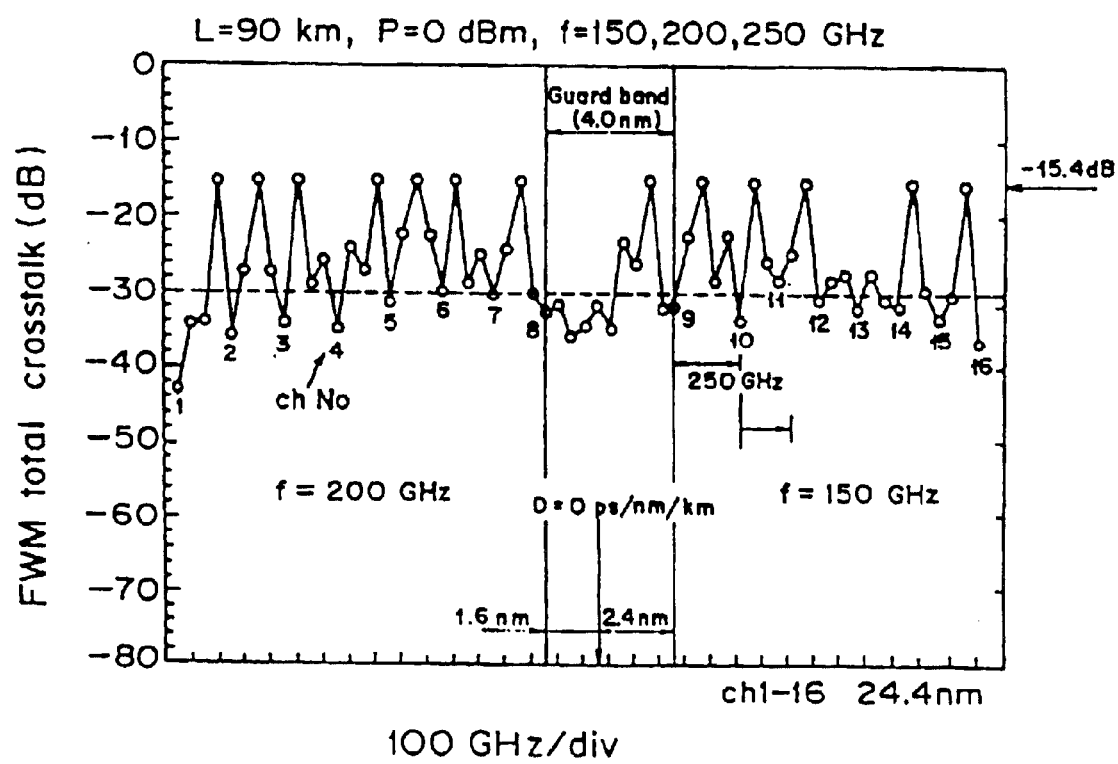
FIGS. 11 and 12 are diagrams illustrating operation of the sixth embodiment of the present invention.
Figure 12:
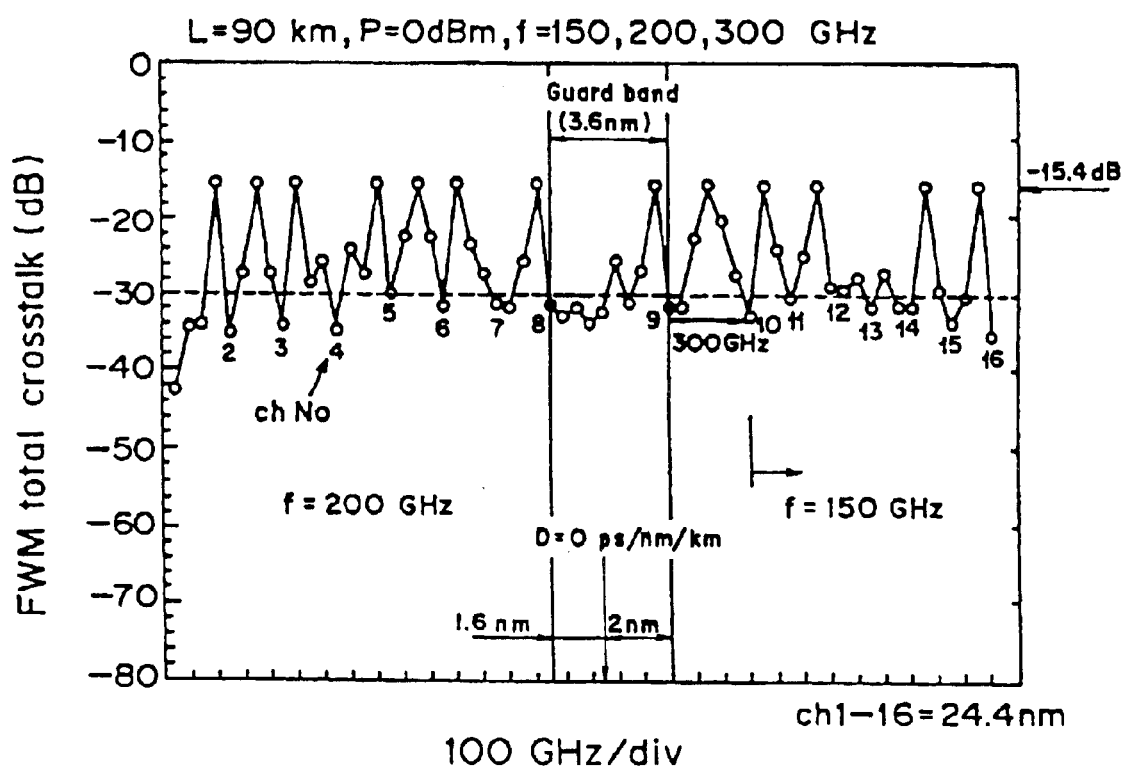

Subsequently, an optical wavelength multiplex transmission method according to a sixth preferred embodiment of the present invention will be described. FIG. 10 illustrates an arrangement of signal light waves of a plurality of channels of the optical wavelength multiplex transmission method, and FIGS. 11 and 12 illustrate operation of the same. It is to be noted that also the optical wavelength multiplex transmission method of the sixth embodiment is applied to a system similar to the optical WDM (FDM) distribution transmission system described hereinabove with reference to FIG. 2, and overlapping description of the same will be omitted herein to avoid redundancy.

In the optical wavelength multiplex transmission method of the sixth embodiment, different channels are arranged such that two or more channels may not overlap with each other, that is, one pair of channels or less may have an equal absolute value of a dispersion value when the channel arrangement is folded on itself at the zero-dispersion wavelength $\lambda_0$ as viewed on the optical frequency (optical wavelength) axis as seen in FIG. 10. In the arrangement shown in FIG. 10, only one pair of channels CH3 and CH8 overlap with each other.

Where, for example, the channel number of the transmission circuit 1 is 16; the channel spacings are 150 GHz, 200 GHz and 250 GHz; the length L of the optical fiber 2 is 90 km; and the optical input power P per one channel is 0 dBm, results of calculation of crosstalk of different channels are such as illustrated in FIG. 11, and in the case of another system wherein the channel number of the transmission circuit 1 is 16; the channel spacings are 150 GHz, 200 GHz and 300 GHz; the length L of the optical fiber 2 is 90 km; and the optical input power P per one channel is 0 dBm, results of calculation of crosstalk of different channels are such as illustrated in FIG. 12. As seen from FIG. 11 or 12, all of the channels exhibit good values of cross talk around −30 dB.

While an influence of crosstalk at the channel CH2, CH5, CH11 or CH15 can be seen in FIG. 7 which illustrates operation of the third embodiment, if the channel arrangement illustrated in FIG. 7 is folded on itself at the zero-dispersion wavelength $\lambda_0$, the channels CH2 and CH15 overlap with each other and the channels CH5 and CH11 overlap with each other. In other words, the two pairs of channels have equal absolute values of dispersion values. In contrast, in the present embodiment, by setting the channel arrangement so that only one pair of channels may be allowed to have an equal absolute value of a dispersion value as seen in FIGS. 11 and 12, crosstalk exhibits good values around approximately −30 dB with all of the channels as described hereinabove.

Where two or more pairs of channels have equal absolute values of dispersion values on the opposite sides of the zero-dispersion wavelength $\lambda_0$, as can be seen also from the equation (5) given hereinabove, the phase mismatch amount $\Delta\beta$ exhibits the value 0 with a combination of three channels within two pairs of channels, and FWM light appears in a high efficiency at the position of the remaining one channel. After all, FWM light appears at the optical frequency positions of all of the four channels of the two pairs and degrades the crosstalk. Accordingly, the channels are set such that less than two pairs of channels may have an equal absolute value of, a dispersion value.

In this manner, with the optical wavelength multiplex transmission method of the sixth embodiment, since less than two pairs of channels have an equal value of a dispersion value on the opposite sides of the zero-dispersion wavelength $\lambda_0$, production of FWM light can be suppressed, and an influence from another channel by crosstalk can be suppressed with certainty. Further, since a band can be utilized efficiently similarly as in the first to fifth embodiments described above, there is an advantage in that an increase of the capacity of the system can be realized while maintaining a high degree of transmission accuracy.

It is to be noted that, while, in the first to sixth embodiments described above, the channel spacing is set in terms of a frequency, it may alternatively be set in terms of a wavelength, and also in this instance, similar advantages to those of the embodiments described above can be achieved.

G. Seventh Embodiment

In order to suppress and eliminate crosstalk by FWM between signal light waves in an optical transmission system based on the WDM method which employs a band around the zero-dispersion wavelength of an optical fiber (in a seventh preferred embodiment of the present invention), such an optical amplifier multi-repeater system (regenerative repeater system) as described hereinbelow with reference to FIG. 15), it is required to separate a signal light band and the zero-dispersion wavelength of the optical fiber from each other as described hereinabove. The channel arrangement then depends principally upon a guard band for suppression of FWM (guard band or bands 5 described in the first to sixth embodiments), a limiting band by an SPD-GVD effect and a gain band of an EDFA. Meanwhile, the zero-dispersion wavelength of an actual optical fiber exhibits a deviation in its longitudinal direction, and it is very important for designing of a system to control the zero-dispersion wavelength and the deviation of the zero-dispersion wavelength. Further, the apparent zero-dispersion wavelength can be shifted by employment of an optical dispersion compensator, which provides an advantage to allow the deviation of the zero-dispersion wavelength.

In the seventh and eighth embodiments described below, a channel arrangement method according to the WDM method when the factors described above are taken into consideration will be described. Conversely speaking, this can be regarded as a defining method between the zero-dispersion wavelength of an optical fiber and the deviation of the zero-dispersion wavelength in a situation wherein the number of channels and the channel spacing are decided.

In the following description, a limiting band by a. a wavelength multiplex signal band, b. a gain band of an EDFA, c. a guard band for suppression of FWM and d. an SPM-GVD effect, which are factors to limit the signal light band, will be described first, and then the relationship between a channel arrangement and characteristics required for an optical fiber will be described taking presence or absence of an inserted optical dispersion compensator into consideration. Limiting Factors a. Wavelength Multiplex Signal Band Where signal light of n waves is arranged at an equal wavelength spacing (channel spacing) $\Delta\lambda_S$, a wavelength multiplex signal light band $\Delta\lambda_{WDM}$ is given by $\Delta\lambda_S \times (n-1)$. It is to be noted that, in the case of an equal wavelength spacing arrangement, FWM light in the signal light band is liable to become high while wavelength stabilization is facilitated as described hereinabove in the fourth and fifth embodiments.

b. EDFA Gain Band

In the case of optical transmission of the WDM method, in order to make the reception characteristic equal among different waves, the signal light power must be made equal among the different waves, and to this end, a frequency band in which the gain of the EDFA exhibits a flat characteristic must be used. For example, in FIG. 16, an example of an ASE spectrum after EDFAs are connected at four stages (the ASE spectrum distribution is substantially equal to the gain distribution of an EDFA) is illustrated, and in the EDFA technique at present, the range of 1,550 to 1,560 nm is a frequency band in which the gain is flat. Consequently, it is desirable to arrange signal light of all channels within the bandwidth ($\Delta\lambda_{EDFA}=10$ nm).

It is to be noted that, as another frequency band than that described above, a frequency band in the proximity of 1,535 nm at which the gain is equal may be used. It is to be noted that, as factors to decide the channel spacing then, there are a wavelength selective filter characteristic, wavelength stability of a semiconductor laser and so forth. Further, as means for expanding the gain bandwidth $\Delta\lambda_{EDFA}$ of the EDFA, optimization of an EDFA operation point, optimization of composition of the EDF, insertion of an optical notch filter and so forth may be available.

c. Guard Band for FWM Suppression

As described also in the first embodiment, in optical WDM (FDM) transmission which employs a band in the proximity of the zero-dispersion wavelength of an optical fiber, it is required to set a channel spacing, a channel arrangement and an input power taking an influence of FWM into consideration. For example, when signal light waves of, for example, wavelengths $\lambda_1$ to $\lambda_n$ are inputted, a fourth light wave (FWM wave) of the wavelength $\lambda_{ijk}$ (i≠k, j≠k) is produced from arbitrary three $\lambda_i$, $\lambda_j$ and $\lambda_k$ of the input signal light waves by a third-order non-linear susceptibility $\chi_{1111}$ of the optical fiber.

The wavelength $\lambda_{ijk}$ satisfies the relationship of the equation (1) given hereinabove and causes crosstalk and degrades the transmission characteristic when signal light is present at the position. Particularly where the channel spacings are equal and the number of channels is great, a plurality of FWM waves are overlapped at the positions of wavelengths $\lambda_{ijk}$ by combinations of i, j and k, resulting in increase of the crosstalk amount. Further, the production efficiency $\eta_{ijk}$ of the wavelength $\lambda_{ijk}$ varies depending upon the phase relationship among the wavelengths $\lambda_i$, $\lambda_j$, $\lambda_k$ and $\lambda_{ijk}$ and indicates a high value in the proximity of the zero-dispersion wavelength $\lambda_0$ of the optical fiber.

Generally, when the polarization conditions of three signal light waves and the phases of the three signal light waves at the input terminal of an optical fiber, the FWM optical powers $P_{ijk}$ and the production efficiencies $\eta_{ijk}$ are given by the equations (2) and (3) and the equations (4) to (6) given hereinabove.

Figure 17:
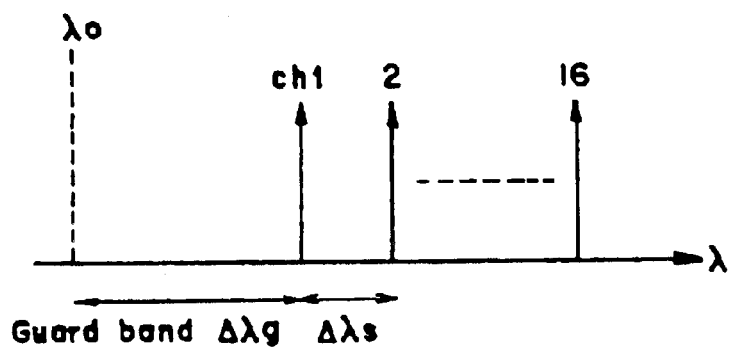
FIG. 17 is a diagram illustrating the arrangement of an FWM suppressing guard band and channels.
Figure 18:
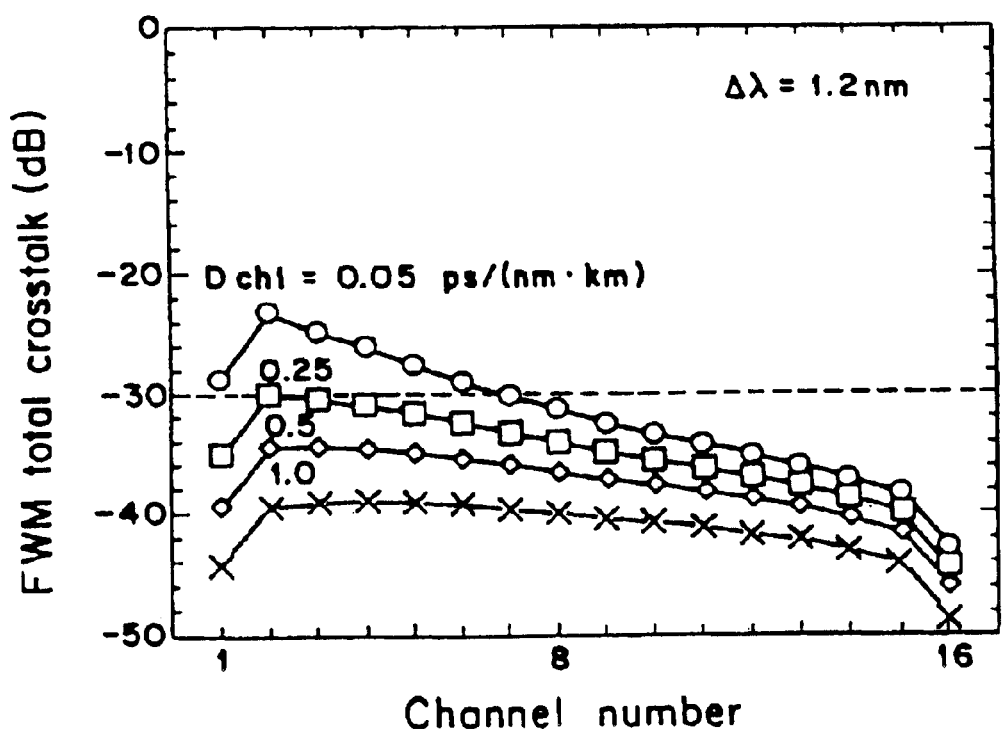
FIG. 18 is a graph illustrating the relationship between a dispersion value of the channel 1 and crosstalk.

An example of calculation of crosstalk amounts (refer to the equation (7) given hereinabove) of different channels where 16 signal light waves are arranged at an equal distance of the wavelength spacing $\Delta\lambda_S=1.2$ nm as shown, for example, in FIG. 17 and when the dispersion value $D_{ch1}$ of the channel 1 is varied is illustrated in FIG. 18. Parameters used for the calculation are: $\lambda=1.55$ $\mu$m, $\chi_{1111}=5.0\times10^{-15}$ esu, $A_{eff}=4.6\times10^{-11}$ m$^2$, $\alpha=5.3\times10^{-5}$ m$^{-1}$ (0.23 dB/km), $dD/d\lambda=0.065$ ps/(km·nm$^2$), L=90 km, and $P_i=0$ dBm/ch.

As seen from FIG. 18, the number of combinations of FWM light waves overlapped with different channels exhibits its maximum value with the channel 7 or 8 at the center. However, since the dispersion values at the different channels are different, the crosstalk amount exhibits a maximum level with the channels 2 to 4 (this is a similar result to that described hereinabove with reference to FIG. 3 in connection with the first embodiment). Where the required crosstalk amount is −30 dB, the dispersion value $D_{chi}$ of the channel 1 must necessarily be set to 0.25 ps/(km·nm). In other words, the wavelength spacing between the zero-dispersion wavelength $\lambda_0$ and the wavelength $\lambda_1$ of the channel 1 must necessarily be set to 3.8 nm or more, and this will be hereinafter referred to as FWM suppressing guard band $\Delta\lambda_g$ in the present embodiment.

d. Limiting Band by SPM-GVD Effect

Figure 15:
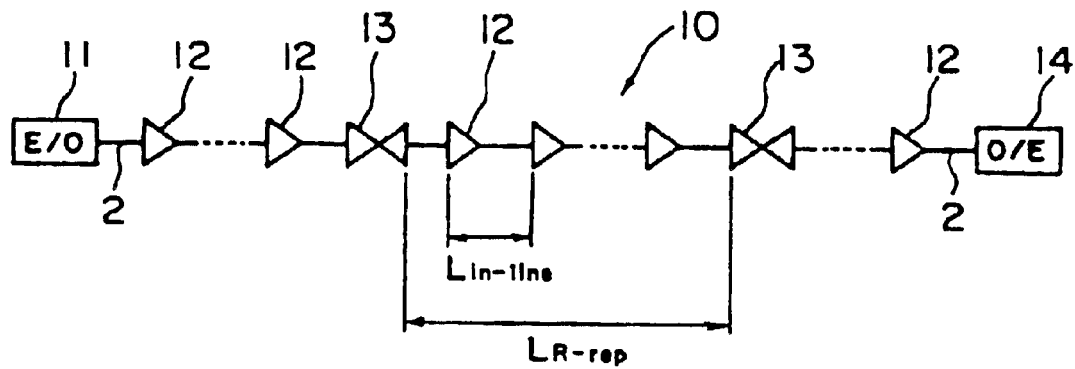
FIG. 15 is a block diagram showing the construction of a regenerative repeater system to which the optical wavelength multiplex transmission method of the seventh embodiment of the present invention is applied.

FIG. 15 shows the construction of a regenerative repeater system or optical transmission system to which the optical wavelength multiplex transmission method of the seventh embodiment of the present invention is applied. Referring to FIG. 15, the regenerative repeater system shown includes a transmitter 11 for converting an electric signal into an optical signal or signal light and performing optical wavelength multiplexing using the construction (transmission circuit 1) described hereinabove with reference to FIG. 2, and a plurality of in-line amplifiers 12 inserted substantially at a fixed distance $L_{in-line}$ in an optical transmission line (optical fiber 2) for amplifying a signal attenuated by line loss.

The regenerative repeater system further includes a plurality of regenerative-repeaters 13 interposed substantially at a fixed distance $L_{R-rep}$ greater than the distance $L_{in-line}$ between the in-line repeaters 12 in the optical transmission line (optical fiber 2). The regenerative-repeaters 13 are provided to regenerate pulse signals from signal light in the optical transmission line before the signal light is degraded by an influence of noise relying upon the line characteristic into a condition in which signals thereof cannot be discriminated from one another, and have three functions represented by words beginning with R including reshaping, retiming and regenerating. Therefore, such a regenerative-repeater is also called 3R repeater.

The regenerative repeater system further includes a receiver 14 for demultiplexing signal light, which has been multiplexed by the construction (reception circuit 4) described hereinabove with reference to FIG. 2 and converting the signal light waves obtained by the demodulation into electric signals.

In the present embodiment, the transmitter 11 and the receiver 14 are interconnected by way of the optical fiber 2 with the plurality of in-line repeaters 12 and regenerative-repeaters 13 interposed in the optical fiber 2 to construct the optical transmission system or regenerative-repeater system 10 according to the optical amplifier multi-repeater WDM method.

By the way, in the case of the optical transmission system of such a construction as described above, the distance $L_{R-rep}$ between the regenerative-repeaters 13 are restricted principally by two factors including 1. optical signal to noise degradation by ASE accumulation at the in-line repeaters 12 and 2. waveform degradation by an SPM-GVD effect caused by a Kerr-effect in the optical fiber 2. Simultaneously, the lower limit to the input power into the optical fiber 2 is limited by the optical signal to noise ratio while the upper limit is limited by the SPM-GVD effect. It is to be noted that, for evaluation of waveform degradation by an SPM-GVD effect, generally a simulation which involves solution of a non-linear Schroedinger equation using the split step Fourier method is effective.

Figure 19:
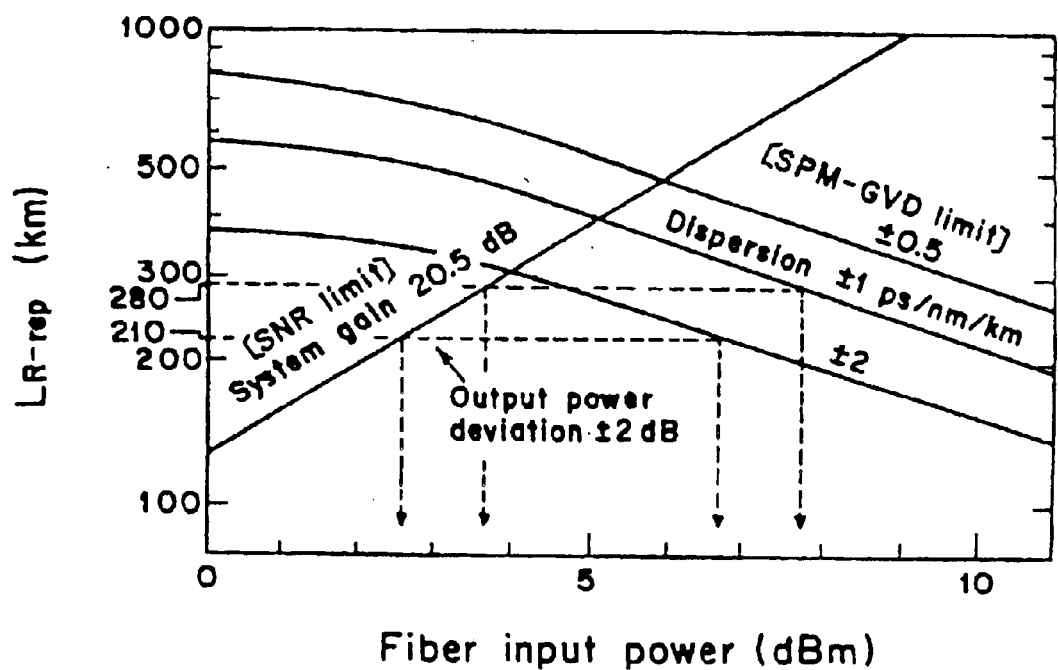
FIG. 19 is a graph illustrating the relationship between the optical fiber input power and the regenerative repeater span.

FIG. 19 illustrates an example of a relationship between the input power to the optical fiber 2 and the distance $L_{R-rep}$ between the regenerative-repeaters 13 when the transmission rate is 10 Gbps, the distance $L_{in-line}$ between the in-line repeaters 12 is 70 km and only one wave is transmitted. If it is assumed that the variation of the optical output from each optical amplifier (in-line repeater 12) is ±2 dB, where an allowable dispersion value $D_{allow}$ is $D_{allow}=\pm 1$ ps/(nm·km), the maximum value of the distance $L_{R-rep}$ between the regenerative-repeaters 13 is 280 km, and where the allowable dispersion value $D_{allow}$ is $D_{allow}=\pm 2$ ps/(nm·km), the maximum value of the distance $L_{R-rep}$ between the regenerative-repeaters 13 is 210 km. In order to realize long-haul transmission, it is necessary to set the allowable dispersion value low and set the input power to the optical fiber 2 high.

Relationship between Channel Arrangement and Characteristic Required for Optical Fiber Three required characteristics for a DSF (optical fiber 2) must be taken into consideration when it is tried to achieve optical transmission based on the WDM method, including 1. the zero-dispersion wavelength $\lambda_0$, 2. the zero-dispersion wavelength deviation $\pm\Delta\lambda_0$, and 3. the dispersion slope (second-order dispersion) $dD/d\lambda$ as described hereinabove. Here, the zero-dispersion wavelength deviation $\pm\Delta\lambda_0$ signifies not only a dispersion involved in production of a DSF but also a maximum deviation width of the zero-dispersion wavelength $\lambda_0$ in the longitudinal direction of the optical fiber 2 within the distance $L_{R-rep}$ between the regenerative-repeaters 13.

Figure 20:
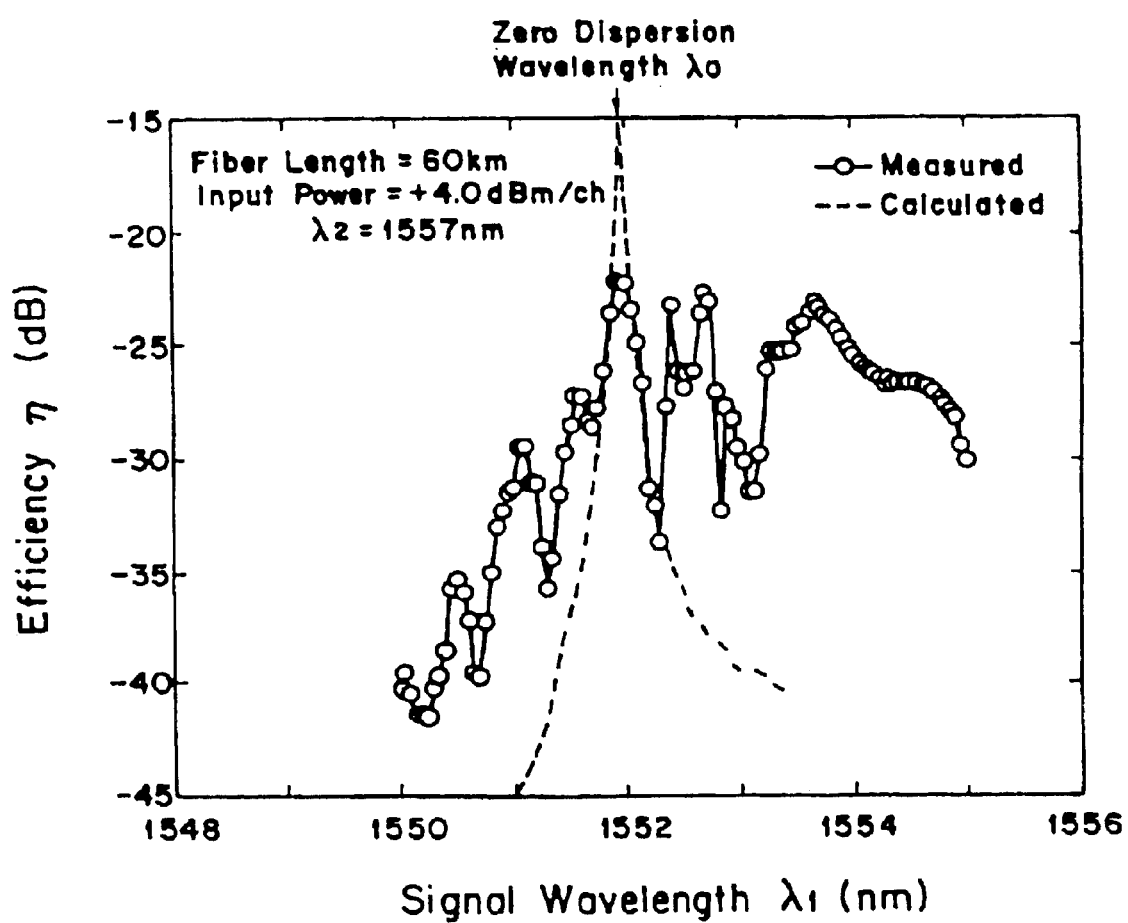
FIG. 20 is a graph illustrating the signal light wavelength dependency of the FWM occurrence efficiency.

FIG. 20 illustrates a result of measurement of the FWM production efficiency v when two signal light waves were inputted to an actual DSF and the wavelength $\lambda_2$ of one of the two signal light waves was fixed to 1,557 nm while the wavelength $\lambda_1$ of the other signal light wave was varied. In FIG. 20, the result of measurement is indicated by a solid line interconnecting blank round marks. In the measurement, the optical fiber length was 60 km, and the power of each signal light wave was +4 dBm. Comparison with another result of calculation (indicated by a broken line in FIG. 20) conducted with the zero-dispersion wavelength $\lambda_0$ fixed to a fixed value reveals that the measurement values indicated by a solid line in FIG. 20 are distributed over a wider wavelength range. This signifies that the zero-dispersion wavelength $\lambda_0$ of the actual DSF exhibits a deviation in the longitudinal direction of the DSF.

Figure 13:
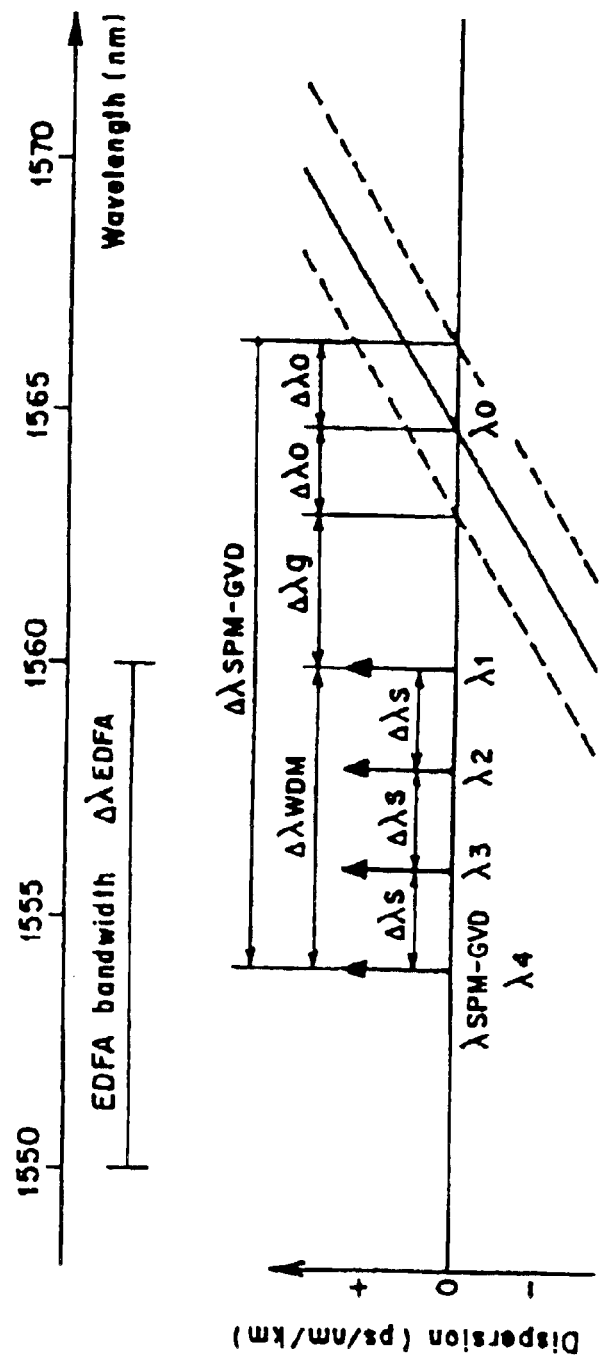
FIG. 13 is a diagrammatic view illustrating the arrangement of signal light waves of a plurality of channels according to an optical wavelength multiplex transmission method of a seventh preferred embodiment of the present invention.

Taking the foregoing points described above into consideration, in the optical wavelength multiplex transmission method of the seventh embodiment of the present invention, signal light waves of different channels are arranged in such a manner, for example, as illustrated in FIG. 13. It is to be noted that, in the present embodiment, description will be given of the case wherein signal light waves of four channels are wavelength multiplexed and transmitted.

In particular, referring to FIG. 13, taking the zero-dispersion wavelength $\lambda_0$ of the optical fiber 2 and the zero-dispersion wavelength deviation $\pm\Delta\lambda_0$ in the longitudinal direction of the optical fiber 2 into consideration, signal light waves of four channels to be multiplexed are arranged at an equal spacing $\Delta\lambda_S$ on the shorter wavelength side than a short wavelength end $\lambda_0-\Delta\lambda_0$ of the range of the zero-dispersion wavelength deviation of the optical fiber 2.

In this instance, an FWM suppressing guard band $\Delta\lambda_g$ is provided on the shorter wavelength side than the short wavelength end $\lambda_0-\Delta\lambda_0$ of the zero-dispersion wavelength deviation range of the optical fiber 2, and signal light waves of four channels (wavelengths $\lambda_1$ to $\lambda_4$ in the channels 1 to 4) are arranged on the further shorter wavelength side than the wavelength $\lambda_0-\Delta\lambda_0-\Delta\lambda_g$. In the present embodiment, the wavelength $\lambda_1$ of the channel 1 is set to the position spaced by $\Delta\lambda_0+\Delta\lambda_g$ on the shorter wavelength side than the zero-dispersion wavelength $\lambda_0$ of the DSF (optical fiber 2). In other words, the wavelength $\lambda_0-\Delta\lambda_0-\Delta\lambda_g$ is set so as to coincide with the wavelength $\lambda_1$ of the channel 1.

Further, in the present embodiment, signal light waves of four channels are arranged within the transmissible bandwidth $\Delta\lambda_{SPM-GVD}$ defined by the allowable dispersion value $D_{allow}$ determined from an SPM-GVD effect in the optical fiber 2. In particular, as seen from FIG. 13, the transmissible wavelength range of signal light is a range within $\Delta\lambda_{SPM-GVD}=|D_{allow}|/(dD/d\lambda)$ on the shorter wavelength side than the long wavelength end $\lambda_0+\Delta\lambda_0$ of the zero-dispersion wavelength deviation range of the optical fiber 2. In this instance, in order to allow transmission of four waves and allow the zero-dispersion wavelength deviation $\Delta\lambda_0$ to be set as great as possible, the wavelength $\lambda_{SPM-GVD}$ $(=(\lambda_0+\Delta\lambda_0)-\Delta\lambda_{SPM-GVD})$ and the wavelength $\lambda_4$ of the channel 4 are set so as to coincide with each other.

Figure 16:
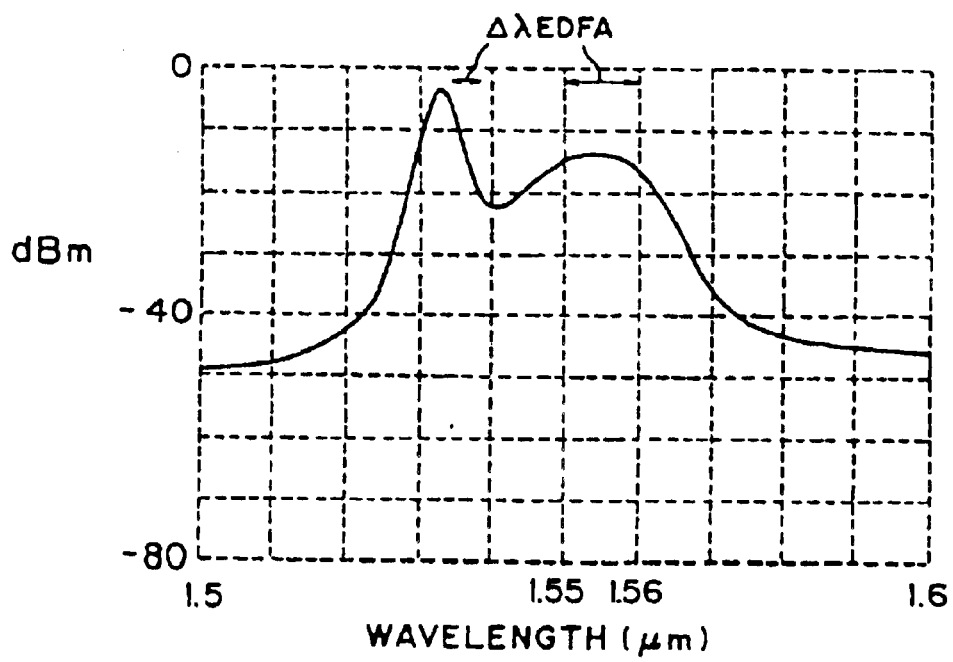
FIG. 16 is a graph showing an ASE spectrum of a gain distribution of an EDFA after connection of EDFAs at four stages and illustrating a gain band of the EDFA.

Further, in the present embodiment, signal light waves of four channels are arranged within a gain band $\Delta\lambda_{EDFA}$ (such a range of 1,550 to 1,560 nm as illustrated, for example, in FIG. 16) of an EDFA (optical amplifier arranged in each in-line repeater 12) connected to the optical fiber 2.

It is to be noted that, though not illustrated in FIG. 13, when the productivity of semiconductor lasers (light sources of signal light waves) and/or the optical wavelength variations of signal light waves caused by the wavelength control accuracy are taken into consideration, the bandwidth $\Delta\lambda_{WDM}$ within which signal light waves of a plurality of channels are arranged is set in an expanded condition in accordance with such variations.

Here, the example of a signal light arrangement illustrated in FIG. 13 is described in more detail by way of an example of numerical values. The relationship between a channel arrangement and characteristics required for a DSF is described for the case wherein, for example, four signal light waves of the transmission rate 10 Gbps are arranged at an equal distance of the wavelength spacing $\Delta\lambda_S=2$ nm on the shorter wavelength side than the zero-dispersion wavelength $\lambda_0$ of the DSF (optical fiber 2) and the distance $L_{in-line}$ between the in-line repeaters 12 is set to 70 km while the distance $L_{R-rep}$ between the regenerative-repeaters 13 is set to 280 km.

Figure 21:
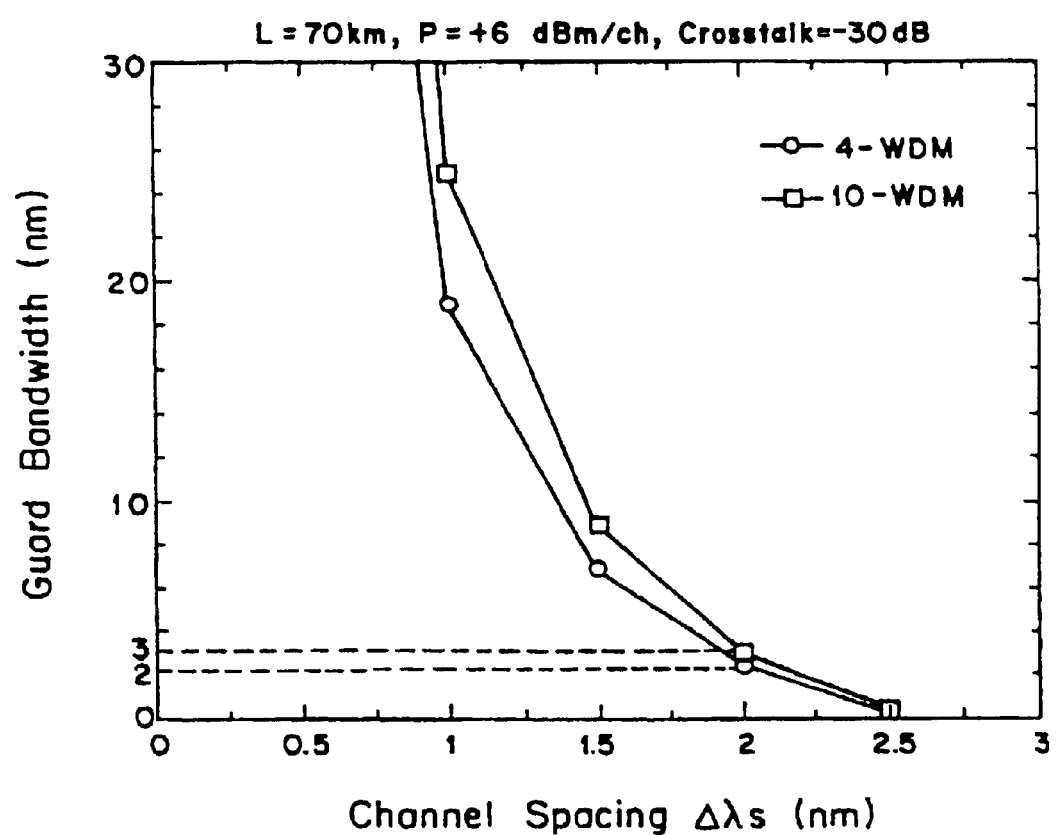
FIG. 21 is a graph illustrating the relationship between the channel spacing and a guard band.

First, the relationship of the guard band $\Delta\lambda_g$ with which the crosstalk amounts at all of the channels are smaller than −30 dB to the wavelength spacing $\Delta\lambda_S$ when the optical fiber length is 70 km and the input power of each channel is +6 dBm is illustrated in FIG. 21. From FIG. 21, it can be seen that, where the wavelength spacing $\Delta\lambda_0$ is 2 nm (signal light bandwidth $\Delta\lambda_{WDM}$−6 nm), the guard band $\Delta\lambda_g$ is required to be $\Delta\lambda_g=3$ nm.

In order to effectively utilize the gain band (1,550 to 1,560 nm) of the EDFA, the wavelength $\lambda_1$ of the channel 1 is set to 1,560 nm which is the longer wavelength end of the gain band as seen from FIG. 13. In this instance, the wavelength $\lambda_1$ is displaced by $\Delta\lambda_0+\Delta\lambda_g$ toward the shorter wavelength side from the zero-dispersion wavelength $\lambda_0$ of the DSF as described hereinabove.

Further, since the allowable dispersion value $D_{allow}$ with which the distance $L_{R-rep}$ between the regenerative-repeaters 13 is $L_{R-rep}=280$ km is −1 ps/(nm·km) from FIG. 19, the transmissible signal light wavelength range is a range within $\Delta\lambda_{SPM-GVD}=|D_{allow}|/(dD/d)$ toward the shorter wavelength side from the wavelength $\lambda_0+\Delta\lambda_0$ as described hereinabove, and in order to allow transmission of all of the four waves and allow the zero-dispersion wavelength deviation $\Delta\lambda_0$ to be set as great as possible, the wavelength $(\lambda_0+\Delta\lambda_0)-\Delta\lambda_{SPM-GVD}$ as and the wavelength $A\lambda_4$ of the channel 4 are set so as to coincide with each other. From those requirements, the values of $\Delta\lambda_{SPM-GVD}$, $\Delta\lambda_0$ and $\lambda_0$ are defined in the equations given below:

$$\Delta\lambda_{SPM-GVD}=|D_{allow}|/(dD/d\lambda)=1 \text{ (ps/(nm·km))}/0.08 \text{ (ps/nm}^2\text{·km))}=12.5 \text{ nm}$$

$$\Delta\lambda_0=(\Delta\lambda_{SPM-GVD}-\Delta\lambda_{WDM}-\Delta\lambda_g)/2=1.75 \text{ nm}$$

$$\lambda_0=\lambda_1+\Delta\lambda_s=1,564.75 \text{ nm}$$

The values given above are values obtained when the deviation $\Delta\lambda_0$ is in the minimum. It is to be noted that, as the dispersion slope $dD/d\lambda$ decreases, $\Delta\lambda_{SP-GVD}$ increases, which allows an increase of the deviation $\Delta\lambda_0$.

Figure 14:
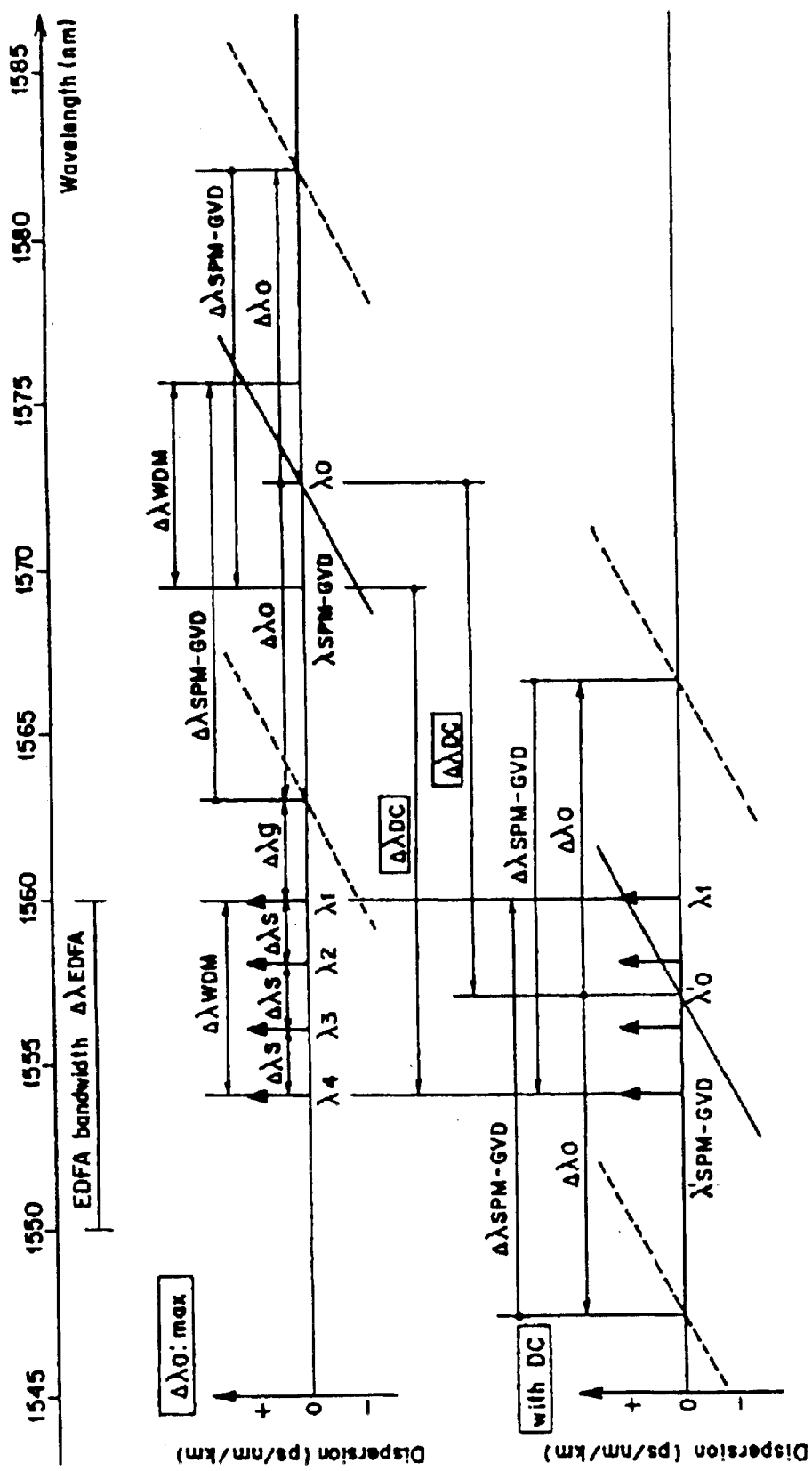
FIG. 14 is a similar view but illustrating a modification to the arrangement of signal light waves illustrated in FIG. 13.

While the case wherein no optical dispersion compensator is employed has been described with reference to FIG. 13, an alternative case wherein signal light arrangement of different channels is performed using an optical dispersion compensator will be described subsequently. In particular, the optical wavelength multiplex transmission method of the seventh embodiment of the present invention can arrange signal light waves of different channels in such a manner, for example, as illustrated in FIG. 14 using an optical dispersion compensator. It is to be noted that description is given also here of the case wherein signal light waves of four channels are wavelength multiplexed and transmitted.

In particular, signal light waves of four channels are first arranged outside a transmissible band $\Delta\lambda_{SPM-GVD}$ defined by an allowable dispersion value $D_{allow}$ determined from an SPM-GVD effect in the optical fiber 2 as illustrated at an upper half of FIG. 14, and then the zero-dispersion wavelength $\Delta\lambda_0$ of the optical fiber 2 is shifted to $\lambda_0'$ as illustrated at a lower half of FIG. 14 using an optical dispersion compensator to arrange the signal light waves of the four channels apparently in the transmissible band $\Delta\lambda_{SPM-GVD}$.

In this instance, the signal light waves of the four channels are arranged, before they are shifted by the optical dispersion compensator, at the equal spacing $\Delta\lambda_S$ on the shorter wavelength side than the wavelength $\lambda_0-\Delta\lambda_0-\Delta\lambda_g$ and within the gain bandwidth $\Delta\lambda_{EDFA}$ of the EDFA similarly as in the example of an arrangement described hereinabove with reference to FIG. 13. It is to be noted that the wavelength $\lambda_1$ of the channel 1 is set so that it may coincide with the wavelength $\lambda_0-\Delta\lambda_0-\Delta\lambda_g$ displaced by $\Delta\lambda_0+\Delta\lambda_g$ toward the shorter wavelength side from the zero-dispersion wavelength $\lambda_0$.

Then, by shifting the actual zero-dispersion wavelength $\lambda_0$ by $\Delta\lambda_{DC}$ toward the shorter wavelength side by means of the optical dispersion compensator, the signal light waves of the four channels are arranged apparently in the transmissible bandwidth $\Delta\lambda_{SPM-GVD}$ as seen in the lower half of FIG. 14.

It is to be noted that, though not illustrated in FIG. 14, when the productivity of semiconductor lasers (light sources of signal light waves) and/or the optical wavelength variations of signal light waves caused by the wavelength control accuracy are taken into consideration, the bandwidth $\Delta\lambda_{WDM}$ within which signal light waves of a plurality of channels are to be arranged is set in an expanded condition in accordance with such variations.

Further, though not illustrated in FIG. 14, where an optical dispersion compensator is employed as described above, taking the dispersion compensation amount deviation range $\pm\delta\lambda_{DC}$ of the optical dispersion compensator into consideration, the signal light bandwidth $\Delta\lambda_{WDM}$ is set expanding the same by the dispersion compensation amount deviation range $\Delta\lambda_{DC}$ on the opposite sides of the longer wavelength side and the shorter wavelength side. Further, for the optical dispersion compensator, such optical dispersion compensators, for example, as hereinafter described in connection with ninth to fifteenth embodiments of the present invention can be employed.

Here, the example of a signal light arrangement illustrated in FIG. 14 is described using an example of detailed values. It is to be noted that the case wherein the zero-dispersion wavelength deviation $\Delta\lambda_0$ of the optical fiber 2 can be set to the maximum using an optical dispersion compensator having a dispersion value of the opposite positive or negative sign to that of the transmission line of a signal band and the dispersion compensation wavelength shift amount $\Delta\lambda_{DC}$ can be minimized from the points of the size and the optical loss of the optical dispersion compensator is considered here. Further, as regards numerical values, it is assumed here that they are similar to those described hereinabove with reference to FIG. 13.

The zero-dispersion wavelength deviation $\Delta\lambda_0$ is allowed to be set to the maximum when an area over which the range of $\Delta\lambda_{SPM-GVD}$ toward the longer wavelength side from the lower limit of the zero-dispersion wavelength deviation and the range of $\Delta\lambda_{SPM-GVD}$ toward the shorter wavelength side from the lower limit of the zero-dispersion wavelength deviation overlap with each other coincides with the signal light bandwidth $\Delta\lambda_{WDM}$ as seen from the lower half of FIG. 14. In short, $$\Delta\lambda_0(max)=(2\cdot\Delta\lambda_{SPM-GVD}-\Delta\lambda_{WDM})/2=(2\times12.5-6)/2=9.5 \text{ nm}$$

and in this instance, the apparent zero-dispersion wavelength $\lambda_0'$ after dispersion compensation is positioned at the center of the signal light bandwidth $\Delta\lambda_{WDM}$.

Before dispersion compensation, as shown in the upper half of FIG. 14, the wavelength $\lambda_1$ of the channel 1 is displaced by $\Delta\lambda_0+\Delta\lambda_g$ toward the shorter wavelength side from the zero-dispersion wavelength $\lambda_0$ from the requirement for FWM suppression. Accordingly, $$\lambda_0=\lambda_1+\Delta\lambda_0+\Delta\lambda_g=1{,}572.5 \text{ nm}$$

and accordingly, $\lambda_0\pm\Delta\lambda_0=1{,}572.5\pm9.5$ nm.

In this instance, the dispersion compensation wavelength shift amount $\Delta\lambda_{DC}$ is $\lambda_0-\lambda_0'$, and is calculated in the following manner:

$$\Delta\lambda_{DC}=(2\cdot\Delta\lambda_0-\Delta\lambda_{SPM-GVD})+\Delta\lambda_g+\Delta\lambda_{WDM}=(2\times9.5-12.5)+3+6=15.5 \text{ nm}$$

Optical dispersion compensators are required to have a higher dispersion, a lower loss and a smaller size, and various types of optical dispersion compensators including the dispersion compensation fiber type, the transversal filter type and the optical resonator type have been proposed. Here, optical dispersion compensators of the optical dispersion compensation type, which will be hereinafter described in connection with the ninth to fifteenth embodiments of the present invention, are employed.

It is to be noted that, since the example illustrated in FIG. 14 requires an optical dispersion compensator having a positive dispersion value, if, for example, an ordinary single mode fiber (dispersion value $D_{DC}=18$ ps/(nm·km)) is employed, then the required fiber length $L_{DC}$ is given in the following manner:

$$L_{DC}=(\Delta\lambda_{DC}\cdot dD/d\lambda\cdot L_{R-rep})/D_{DC}=(15.5\times0.08\times280)/18=19.3 \text{ km}$$

Figure 22:
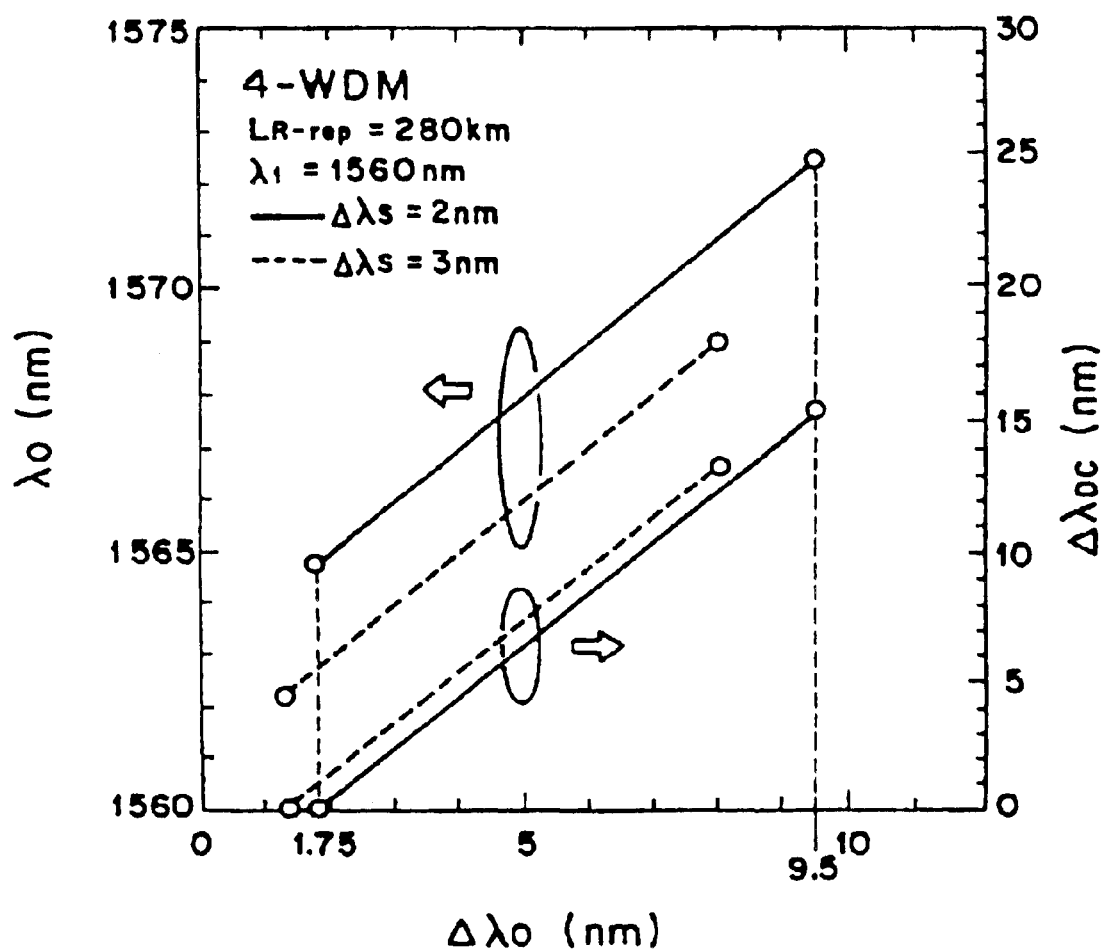
FIG. 22 is a graph illustrating the relationship of the zero-dispersion wavelength and the dispersion compensation amount to the zero-dispersion wavelength deviation in the seventh embodiment of the present invention.

While, in the examples of FIGS. 13 and 14 described hereinabove, detailed examples have been described for the cases wherein the zero-dispersion wavelength deviation $\Delta\lambda_0$ has the minimum value and the maximum value, respectively, the relationship of the zero-dispersion wavelength $\lambda_0$ and the dispersion compensation wavelength shift amount $\Delta\lambda_{DC}$ to the deviation $\Delta\lambda_0$ where signal light waves are arranged on the shorter wavelength side than the zero-dispersion wavelength $\lambda_0$ is illustrated in FIG. 22. In FIG. 22, the relationship where the wavelength spacing $\Delta\lambda_S$ is $\Delta\lambda_S=2$ nm and the guard band $\Delta\lambda_g$ is $\Delta\lambda$hd g=3 nm is indicated by a solid line. Meanwhile, the relationship where the wavelength spacing $\Delta\lambda_S$ is $\Delta\lambda_S=3$ nm is indicated by a broken line. In this instance, from FIG. 13, since it is only required that the zero-dispersion wavelength $\lambda_0$ and the wavelength $\lambda_1$ of the channel 1 do not coincide with each other, the guard band $\Delta\lambda_S$ is set to $\Delta\lambda_g=1$ nm.

In this manner, with the optical wavelength multiplex transmission method of the seventh embodiment, signal light waves of different channels can be arranged without being influenced by FWM in an optical amplifier multi-repeater WDM method which makes use of a band in the proximity of the zero-dispersion wavelength $\lambda_0$ of the optical fiber 2, and simultaneously, a required characteristic regarding the zero-dispersion wavelength $\lambda_0$ of an optical fiber transmission line to be laid can be made definite and a channel arrangement method for signal light and a transmission line designing method in an optical amplifier multi-repeater WDM method can be established.

Particularly, according to the present embodiment, by arranging signal light waves of different channels on the shorter wavelength side than the wavelength $\lambda_0-\Delta\lambda_0-\Delta\lambda_g$ taking the zero-dispersion wavelength deviation range and the FWM suppressing guard band into consideration, the zero-dispersion wavelength deviation in the longitudinal direction of the optical fiber 2 is taken into consideration and controlled, and simultaneously, an influence of FWM is suppressed. Consequently, an influence from another channel by crosstalk is suppressed, and a high degree of transmission accuracy can be maintained.

Further, according to the present invention, in addition to the fact that signal light arrangement can be performed taking waveform degradation by an SPM-GVD effect into consideration, the powers of the signal light waves can be made equal and the received characteristics for the signal light waves can be made equal by arranging the signal light waves of the different channels within the gain bandwidth $\Delta\lambda_{EDFA}$ of the EDFA.

Furthermore, by setting the bandwidth $\Delta\lambda_{WDM}$, within which signal light waves are to be arranged, in an expanded condition in accordance with optical wavelength variations of the signal light waves of the different channels, the variations of the signal light waves caused by the productivity and/or the wavelength control accuracy of light sources for the signal light waves such as semiconductor lasers are taken into consideration, and where an optical dispersion compensator is employed, by setting the bandwidth $\Delta\lambda_{WDM}$, within which the signal light waves are to be arranged, expanding the same by the dispersion compensation amount deviation range $\delta\lambda_{DC}$ of the optical dispersion compensator on the opposite sides of the longer wavelength side and the shorter wavelength side, also the dispersion compensation amount deviation of the optical dispersion compensator is taken into consideration. Consequently, optical transmission of higher reliability can be achieved.

It is to be noted that, while, in the seventh embodiment described above, the case wherein signal light waves of four channels are to be arranged is described above, the present invention is not limited to this.

H. Eighth Embodiment

Figure 23:
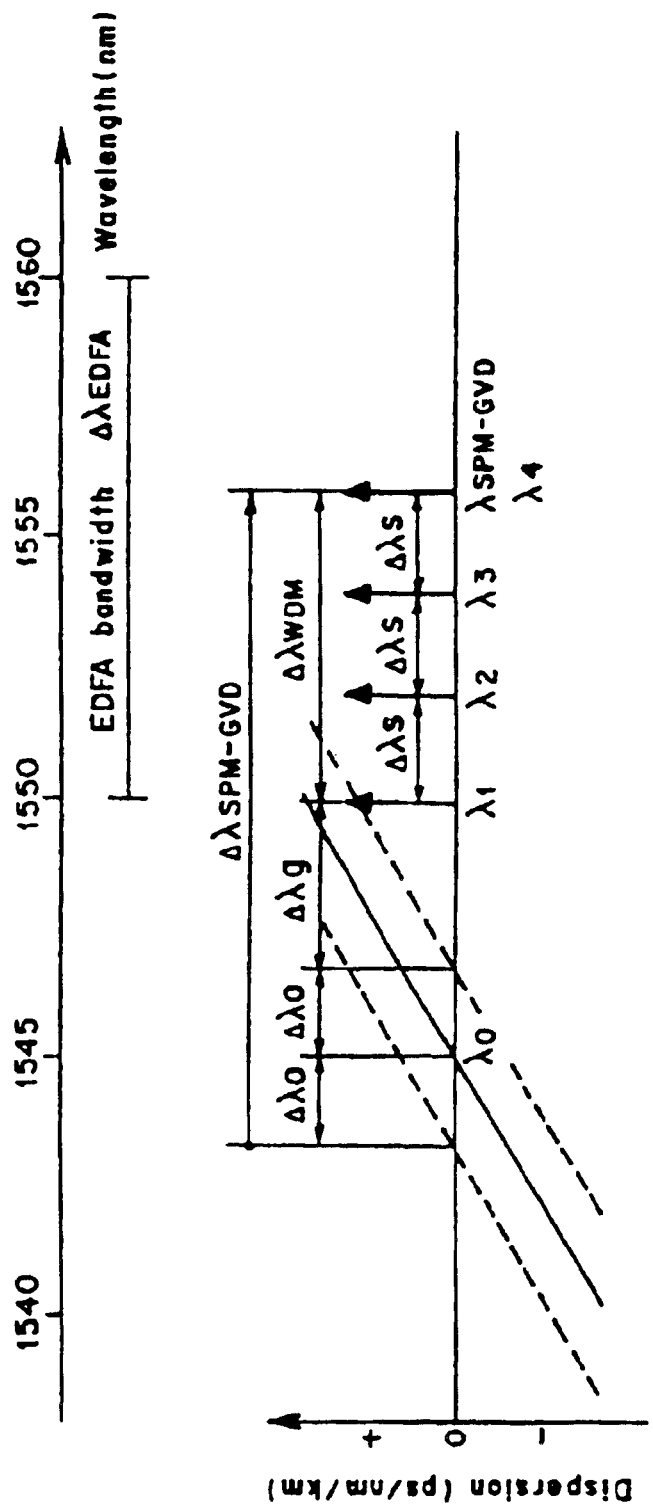
FIG. 23 is a diagram illustrating the arrangement of signal light waves of a plurality of channels according to an optical wavelength multiplex transmission method of an eighth preferred embodiment of the present invention.
Figure 24:
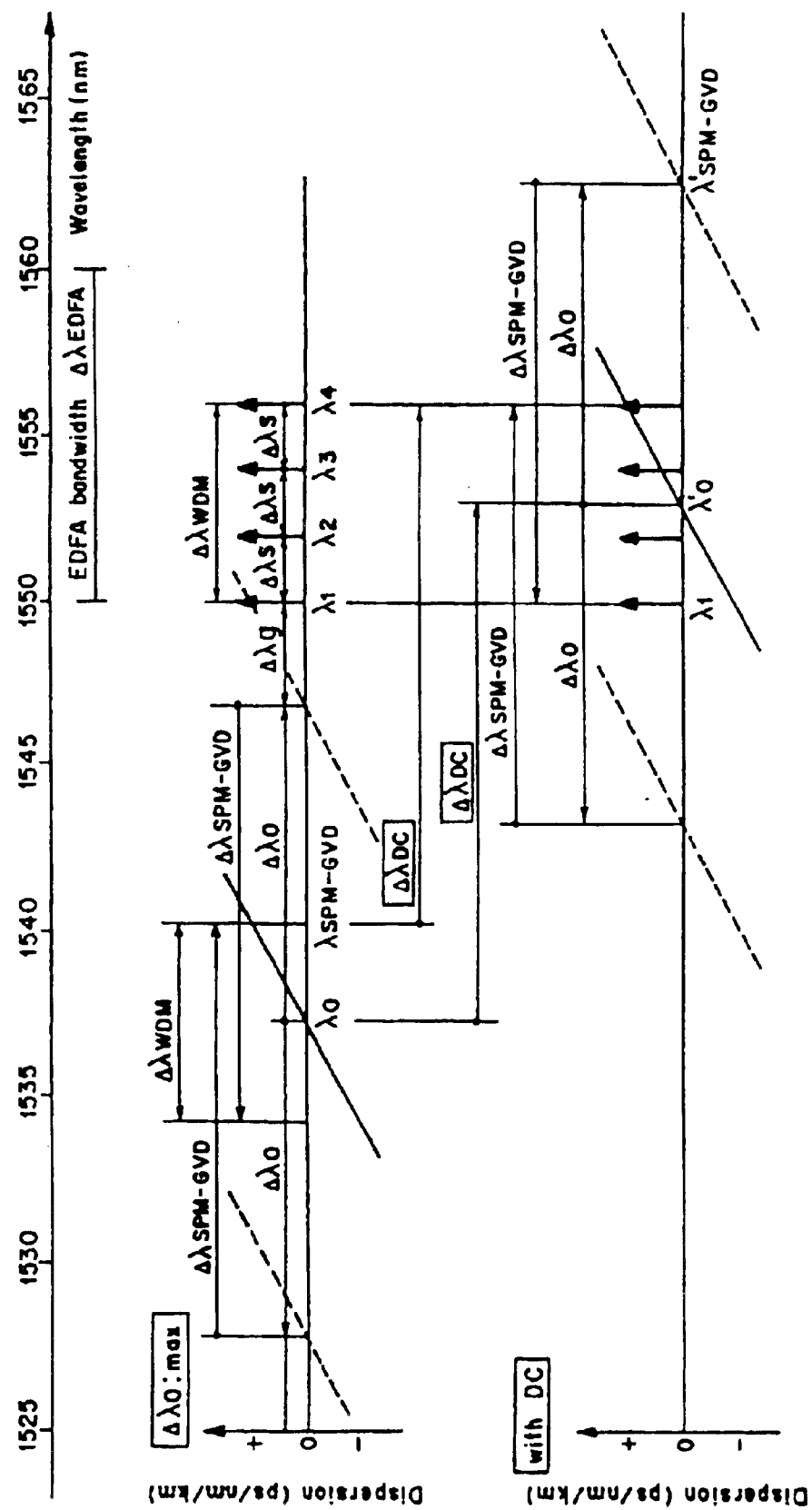
FIG. 24 is a similar view but illustrating a modification to the arrangement of signal light waves illustrated in FIG. 23.
Figure 25:
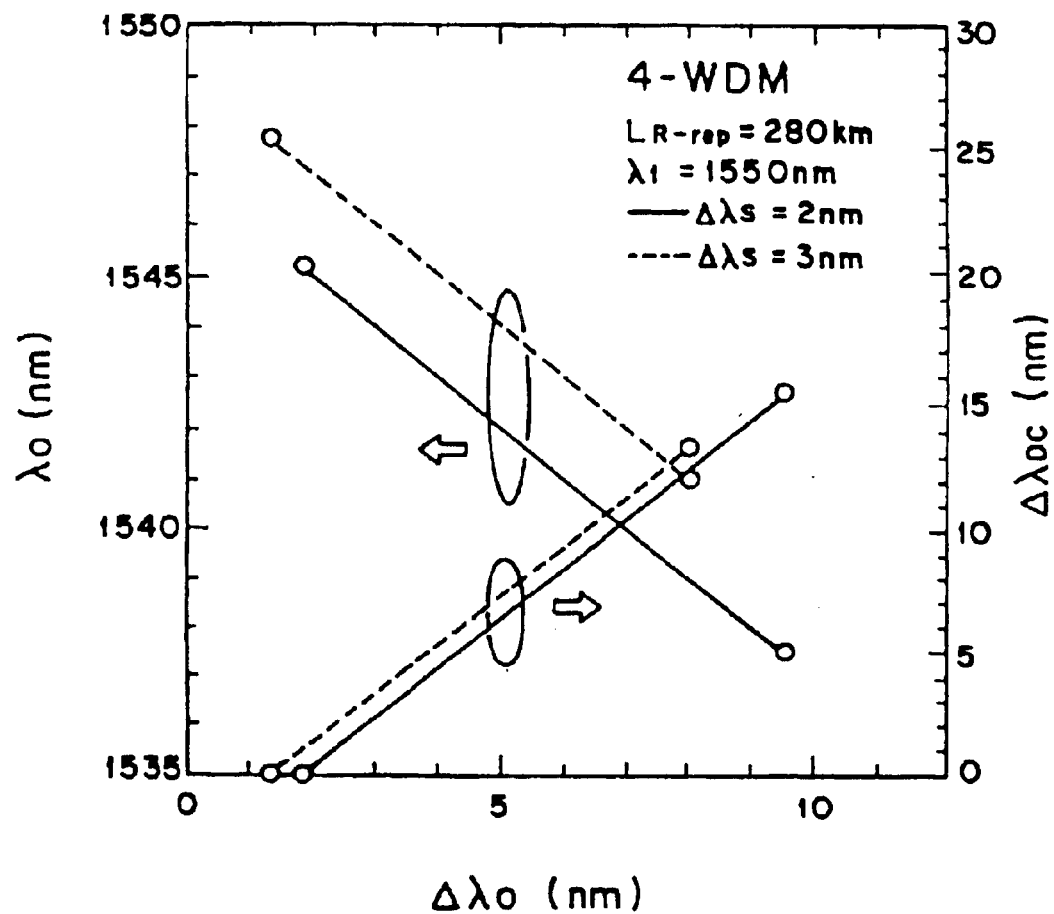
FIG. 25 is a graph illustrating the relationship of the zero-dispersion wavelength and the dispersion compensation amount to the zero-dispersion-wavelength deviation in the eighth embodiment of the present invention.

Subsequently, an optical wavelength multiplex transmission method of an eighth preferred embodiment of the present invention. FIG. 23 illustrates a signal light arrangement of a plurality of channels of the optical wavelength multiplex transmission method while FIG. 24 illustrates a modification to the signal light arrangement illustrated in FIG. 23, and FIG. 25 illustrates the relationship of the zero-dispersion wavelength and the dispersion compensation amount to the zero-dispersion wavelength deviation in the optical wavelength multiplex transmission method. It is to be noted that also the optical wavelength multiplex transmission method of the eighth embodiment is applied to a system similar to the regenerative-repeater system or optical transmission system described hereinabove with reference to FIG. 15, and overlapping description of the same will be omitted herein to avoid redundancy.

While, in the seventh embodiment described above, description has been given of the case wherein signal light waves of different channels are arranged on the shorter wavelength side than the zero-dispersion wavelength $\lambda_0$ of the optical fiber 2, in the eighth embodiment, signal light waves of different channels are arranged on the longer wavelength side than the zero-dispersion wavelength $\lambda_0$ of the optical fiber 2. Then, after the wavelength $\lambda_1$ of the channel 1 is set to the shorter wavelength end 1,550 nm of the gain bandwidth of the EDFA, the relationship between the channel arrangement and characteristics required for the DSF (optical fiber 2) are determined by the quite same means as that of the seventh embodiment described hereinabove with reference to FIG. 13.

In particular, taking the zero-dispersion wavelength $\lambda_0$ of the optical fiber 2 and the zero-dispersion wavelength deviation $\pm\Delta\lambda_0$ in the longitudinal direction of the optical fiber 2 into consideration, signal light waves of fourth channels to be multiplexed are arranged at an equal spacing $\Delta\lambda_S$ on the longer wavelength side than the longer wavelength end $\lambda_0+\Delta\lambda_0$ of the zero-dispersion wavelength deviation range of the optical fiber 2 as illustrated in FIG. 23.

In this instance, an FWM suppressing guard band $\Delta\lambda_g$ is provided on the longer wavelength side than the longer wavelength end $\lambda_0+\Delta\lambda_0$ of the zero-dispersion wavelength deviation range of the optical fiber 2, and the signal light waves of the four channels (for the channels 1 to 4 of the wavelengths $\lambda_1$ to $\lambda_4$) are arranged on the further longer wavelength side than the wavelength $\lambda_0+\Delta\lambda_0+\Delta\lambda_g$. In the present embodiment, the wavelength $\lambda_1$ of the channel 1 is set at the position displaced by $\Delta\lambda_0+\Delta\lambda_g$ toward the longer wavelength side from the zero-dispersion wavelength $\lambda_0$ of the DSF (optical fiber 2), that is, the wavelength $\lambda_0+\Delta\lambda_0+\Delta\lambda_g$ is set so as to coincide with the wavelength $\lambda_1$ of the channel 1.

Further, in the present embodiment, signal light waves of four channels are arranged in a transmissible band $\Delta\lambda_{SPM-GVD}$ defined by an allowable dispersion value $D_{allow}$ determined from an SPM-GVD in the optical fiber 2. In particular, as illustrated in FIG. 23, the transmissible signal light wavelength range is a range within $\Delta\lambda_{SPM-GVD}=|D_{allow}|/(dD/d\lambda)$ displaced toward the longer wavelength side from the shorter wavelength end $\lambda_0-\Delta\lambda_0$ of the zero-dispersion wavelength deviation range of the optical fiber 2. In this instance, in order to allow the four waves to be transmitted and allow the zero-dispersion wavelength deviation $\Delta\lambda_0$ to be set as great as possible, the wavelength $\lambda_{SPM-GVD}$ $(=(\lambda_0-\Delta\lambda_0)+\Delta\lambda_{SPM-GVD})$ and the wavelength $\lambda_4$ of the channel 4 are set so as to coincide with each other.

Further, in the present embodiment, the signal light waves of the four channels are arranged within a gain bandwidth $\Delta\lambda_{EDFA}$ (for example, such a range of 1,550 to 1,560 nm as shown in FIG. 16) of an EDFA connected to the optical fiber 2.

It is to be noted that, though not illustrated in FIG. 23, also in the present embodiment, when the productivity of semiconductor lasers (light sources of signal light waves) and/or the optical wavelength variations of the signal light waves caused by the wavelength control accuracy are taken into consideration, the bandwidth $\Delta\lambda_{WDM}$ within which signal light waves of a plurality of channels are to be arranged is set in an expanded condition in accordance with such variations.

By the way, while the case wherein an optical dispersion compensator is not employed is described above with reference to FIG. 23, another case wherein signal light arrangement of different channels is performed using an optical dispersion compensator will be described subsequently. In other words, with the optical wavelength multiplex transmission method of the eighth embodiment of the present invention, signal light waves of different channels can be arranged, for example, in such a manner as illustrated in FIG. 24 by using an optical dispersion compensator.

In particular, signal light waves of four channels are first arranged outside a transmissible band $\Delta\lambda_{SPM-GVD}$ defined by an allowable dispersion value $D_{allow}$ determined by an SPM-GVD effect in the optical fiber 2 as illustrated in the upper half of FIG. 24, and then the zero-dispersion wavelength $\lambda_0$ of the optical fiber 2 is shifted to $\lambda_0'$ using an optical dispersion compensator as illustrated in the lower half of FIG. 24 to arrange the signal light waves of the four channels apparently within the transmissible band $\Delta\lambda_{SPM-GVD}$.

In this instance, the signal light waves of the four channels are arranged, before shifting by the optical dispersion compensator is performed, at an equal spacing $\Delta\lambda_S$ on the longer wavelength side than the wavelength $\lambda_0+\Delta\lambda_0+\Delta\lambda_g$ and within the gain bandwidth $\Delta\lambda_{EDFA}$ of the EDFA similarly as in the example of an arrangement described hereinabove with reference to FIG. 23. It is to be noted that the wavelength $\lambda_1$ of the channel 1 is set so as to coincide with the wavelength $\lambda_0+\Delta\lambda_0+\Delta\lambda_g$ displaced by $\Delta\lambda_0+\Delta\lambda_g$ toward the longer wavelength side from the zero-dispersion wavelength $\lambda_0$.

Then, the actual zero-dispersion wavelength $\lambda_0$ is shifted by $\Delta\lambda_{DC}$ $(=\lambda_0'-\lambda_0)$ toward the longer wavelength side by means of the optical dispersion compensator thereby to apparently arrange the signal light waves of the four channels within the transmissible band $\Delta\lambda_{SPM-GVD}$.

It is to be noted that also FIG. 24 illustrates the case wherein, as described hereinabove in connection with the seventh embodiment with reference to FIG. 14, an area over which the range of $\Delta\lambda_{SPM-GVD}$ displaced toward the longer wavelength side from the lower limit of the zero-dispersion wavelength deviation and the range of $\Delta\lambda_{SPM-GVD}$ displaced toward the shorter wavelength side from the lower limit of the zero-dispersion wavelength deviation overlap with each other is made coincide with the signal light bandwidth $\Delta\lambda_{WDM}$ so that the zero-dispersion wavelength deviation $\Delta\lambda_0$ is allowed to be set to the maximum as described hereinabove in connection with the seventh embodiment with reference to FIG. 14.

Further, though not illustrated in FIG. 24, when the productivity of semiconductor lasers (light sources of the signal light waves) and/or the optical wavelength variations of the signal light waves caused by the wavelength control accuracy are taken into consideration, the bandwidth $\Delta\lambda_{WDM}$ within which signal light waves of a plurality of channels are to be arranged is set in an expanded condition in accordance with such variations.

Further, though not illustrated in FIG. 24, where an optical dispersion compensator is employed as described above, taking the dispersion compensation amount deviation range $\pm\delta\lambda_{DC}$ of the optical dispersion compensator into consideration, the signal light bandwidth $\Delta\lambda_{WDM}$ is set expanding the same by the dispersion compensation amount deviation range $\delta\lambda_{DC}$ on the opposite sides of the longer wavelength side and the shorter wavelength side. Further, for the optical dispersion compensator, such optical dispersion compensators, for example, as hereinafter described in connection with ninth to fifteenth embodiments of the present invention can be employed.

While, in the examples of FIGS. 23 and 24 described hereinabove, the cases wherein the zero-dispersion wavelength deviation $\Delta\lambda_0$ has the minimum value and the maximum value, respectively, have been described, the relationship of the zero-dispersion wavelength $\lambda_0$ and the dispersion compensation wavelength shift amount $\Delta\lambda_{DC}$ to the deviation $\Delta\lambda_0$ where signal light waves are arranged on the longer wavelength side than the zero-dispersion wavelength $\lambda_0$ is illustrated in FIG. 25. Also in FIG. 25, similar numerical values to those described hereinabove in connection with the seventh embodiment with reference to FIG. 22 are applied. However, in FIG. 25, the slope of the zero-dispersion wavelength $\lambda_0$ relative to the deviation $\Delta\lambda_0$ is set opposite to that illustrated in FIG. 22 in order to arrange the signal light waves on the longer wavelength side than the zero-dispersion wavelength $\lambda_0$.

In this manner, similar advantages to those described hereinabove in connection with the seventh embodiment can be achieved by the optical wavelength multiplex transmission method of the eighth embodiment.

It is to be noted that, while in the eighth embodiment described above, the case wherein the signal light waves of the four channels are to be arranged has been described, the present invention is not limited to this, and the signal light waves of the channels can be arranged on the opposite sides of the zero-dispersion wavelength $\lambda_0$. In this instance, when optical dispersion compensation is involved, different optical dispersion compensators of the opposite positive and negative signs must necessarily be used for the channels on the shorter wavelength side and the longer wavelength side of the zero-dispersion wavelength $\lambda_0$.

I. Ninth Embodiment

Figure 26:
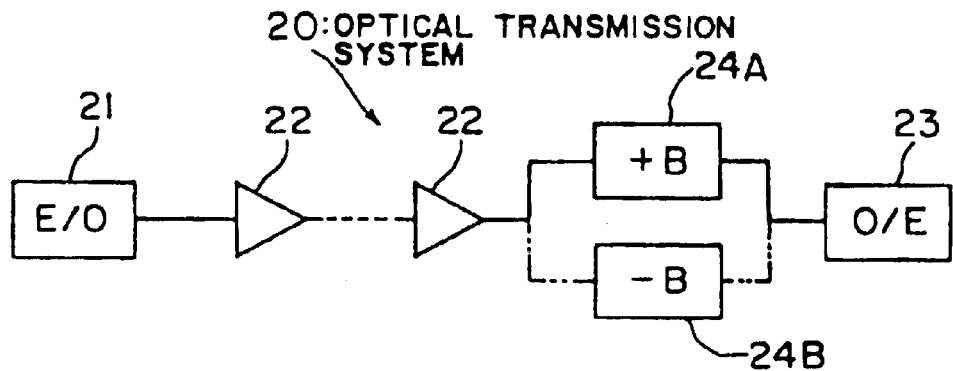
FIG. 26 is a block diagram showing an optical dispersion compensation system to which an optical dispersion compensation method of a ninth preferred embodiment of the present invention is applied.

Subsequently, an optical dispersion compensation method as a ninth preferred embodiment of the present invention will be described. FIG. 26 shows, in block diagram, an optical dispersion compensation system to which the optical dispersion compensation method is applied. Referring to FIG. 26, the optical dispersion compensation system shown is denoted at 20 and includes a transmitter 21 for converting an electric signal into an optical signal and transmitting the optical signal, and a plurality of repeaters 22 inserted in an optical transmission line (optical fiber 2). Such an in-line repeater or a regenerative-repeater as described hereinabove may be employed for the repeaters 22.

The optical dispersion compensation system 20 further includes a receiver 23 for converting a received optical signal into an electric signal. The transmitter 21 and the receiver 23 are interconnected by way of the optical fiber 2 with the repeaters 22 interposed in the optical fiber 2. In the optical transmission system 20, signal light from the transmitter 21 is transmitted to the receiver 23 by way of the repeaters 22 and the optical fiber 2.

The optical dispersion compensation system 20 further includes two kinds of optical dispersion compensator units including an optical dispersion compensator unit 24A having a positive dispersion amount +B and another optical dispersion compensator unit 24B having a negative dispersion amount −B. The two kinds of optical dispersion compensator units 24A and 24B are prepared in advance and are interposed in the optical transmission system 20, that is, at any location of the optical fiber 2, the transmitter 21, the repeaters 22 and the receiver 23.

By the way, where the optical transmission system 20 is such an optical amplifier regenerative-repeater system as described hereinabove with reference to FIG. 15, since the allowable dispersion value decreases as the regenerative-repeater span increases as described hereinabove with reference to FIG. 19, an optical dispersion compensator for restraining the arrangement positions of the channels (signal light) within an allowable dispersion range for the arrangement positions is essentially required.

Further, while, in the first to eighth embodiments described hereinabove, the zero-dispersion wavelength of the optical fiber 2 and the signal light wavelength are separated from each other in order to eliminate otherwise possible crosstalk by FWM in the WDM method which makes use of a band in the proximity of the zero-dispersion wavelength of the optical fiber 2, dispersion compensation by the corresponding amount (refer particularly to the examples of FIGS. 14 and 24 in the seventh and eighth embodiments) is required. Such dispersion compensation is required also for one-wave transmission or SMF transmission.

Particularly in the case of an optical communication system on land, since the repeater span is not fixed and besides the zero-dispersion wavelength of an actual optical fiber exhibits a deviation in the longitudinal direction, it is difficult to set the dispersion amounts of different repeater sections equal to each other. Therefore, when a signal light wavelength is set in the proximity of the zero-dispersion wavelength of the DSF (optical fiber 2), there is even the possibility that the positive or negative sign of the dispersion amount may be different among different repeater sections.

Thus, in the present ninth embodiment, in order to compensate for the dispersion amount of the optical transmission system 20, the two kinds of optical dispersion compensator units 24A and 24B prepared in advance are inserted into the optical transmission system 20, and one of the optical dispersion compensator units 24A and 24B which provides a better transmission characteristic to the optical transmission system 20 is selected and incorporated into the optical transmission system 20.

Consequently, when an accurate dispersion amount cannot be measured and the zero-dispersion wavelength deviation can be grasped to some degree, the dispersion amount of the optical transmission system 20 can be compensated for readily.

On the other hand, when the dispersion amount of the optical transmission system 20 can be measured, by selecting one of the optical dispersion compensator units 24A and 24B which has the sign opposite to the sign of the measured dispersion amount, the dispersion amount of the optical transmission system 20 can be compensated for with a higher degree of certainty.

In this manner, with the optical dispersion compensation method of the ninth embodiment, the waveform degradation by an SPM-GVD effect or the dispersion amount of a guard band can be compensated for without designing or producing optical dispersion compensators conforming to individual transmission lines, and reduction of the number of steps and reduction of the time until an optical communication system is built up can be realized.

Here, an example of detailed numerical values of the ninth embodiment will be described. If it is assumed that the transmission rate is 10 Gbps; the in-line repeater span $L_{in\text{-}line}$ is 70 km; the variation of the optical output of each optical amplifier is ±2 dB, from FIG. 19, the maximum regenerative-repeater span is 280 km at the allowable dispersion value $D_{allow}=\pm 1$ ps/(nm·km), and accordingly, the dispersion compensation of ±280 ps/nm is required for the dispersion amount of signal light after transmission of 280 km. Therefore, where the transmission line dispersion amount is, for example, +1,200 ps/nm, when the optical dispersion compensator units 24A and 24B of the dispersion amounts +1,000 ps/nm and −1,000 ps/nm are prepared, if the optical dispersion compensator unit 24B of the dispersion amount −1,000 ps/nm is inserted into the transmission line, then the total dispersion amount is +200 ps/nm, and therefore, transmission is possible.

J. Tenth Embodiment

Figure 27:
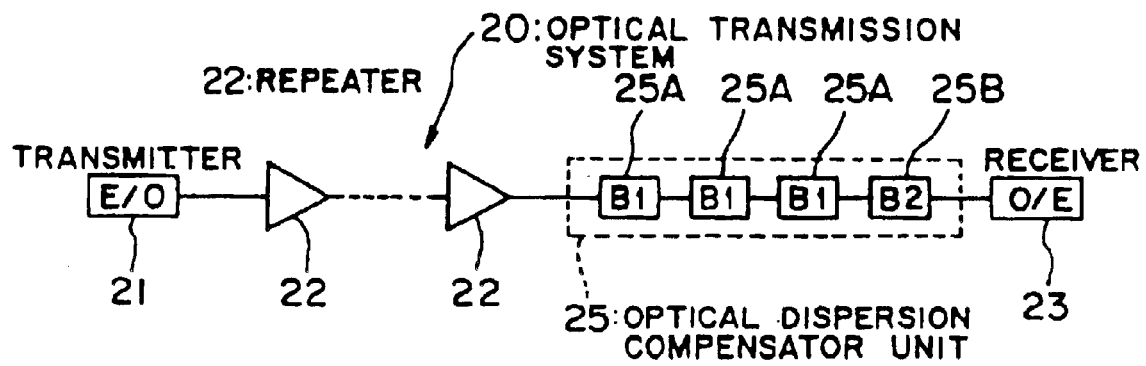
FIG. 27 is a block diagram showing an optical dispersion compensation system to which an optical dispersion compensation method of a tenth preferred embodiment of the present invention is applied.

Subsequently, an optical dispersion compensation method of a tenth preferred embodiment of the present invention will be described. FIG. 27 shows, in block diagram, an optical dispersion compensation apparatus to which the optical dispersion compensation method is applied. In FIG. 27, like elements are denoted by like reference characters to those of FIG. 26, and overlapping description thereof is omitted herein to avoid redundancy.

While, in the ninth embodiment described above, the two kinds of optical dispersion compensator units having the positive dispersion amount +B and the negative dispersion amount −B are prepared in advance, in the present tenth embodiment, a plurality of kinds of optical dispersion compensators 25A and 25B having different dispersion amounts having different positive and negative signs are prepared in advance.

Here, two kinds of optical dispersion compensator units 25A and 25B having dispersion amounts B1 and B2 are prepared each by a plural number, and an optical dispersion compensator unit 25 which is constituted from a combination of such optical dispersion compensation units 25A and 25B is inserted into the optical transmission system 20, that is, at any portion of the optical fiber 2, the transmitter 21, the repeaters 22 and the receiver 23.

Further, in the present embodiment, at a cite at which an optical communication system is to be installed, the two kinds of optical dispersion compensator units 25A and 25B are inserted into the optical transmission system 20 changing the number and the combination of units to be installed, and the transmission characteristic, particularly the code error rate, of the optical transmission system 20 is measured. Then, an optical dispersion compensator unit 25 of the number and the combination of units which provide a good transmission characteristic (in FIG. 27, the combination of three optical dispersion compensator units 25A and one optical dispersion compensator unit 25B) is selectively determined from the two kinds of optical dispersion compensator units 25A and 25B and incorporated into the optical transmission system 20.

Consequently, even when the zero-dispersion wavelength deviation is not known or when the zero-dispersion and the signal light wavelength are displaced by a great amount from each other, the dispersion amount of the optical transmission system 20 can be compensated for readily and optimally.

In contrast, when the dispersion amount of the optical transmission system 20 can be measured, the dispersion amount is measured first, and then an optical dispersion compensator unit of the installation number and the combination of units with which the dispersion value of signal light falls within a transmissible dispersion value range is selectively determined from the two kinds of optical dispersion compensator units 25A and 25B and incorporated into the optical transmission system 20. Consequently, the dispersion amount of the optical transmission system 20 can be compensated for so that it can be accommodated into the allowable dispersion value range with certainty.

In this manner, also with the optical dispersion compensation method of the tenth embodiment, the waveform degradation by an SPM-GVD effect or the dispersion amount of a guard band can be compensated for without designing or producing optical dispersion compensators conforming to individual transmission lines, and reduction of the number of steps and reduction of the time until an optical communication system is built up can be realized.

It is to be noted that, while, in the tenth embodiment described above, description has been given of the case wherein two kinds of optical dispersion compensator units are prepared in advance, the present invention is not limited to this.

Here, an example of detailed numerical values of the tenth embodiment will be described. Where the dispersion compensation of ±280 ps/nm is required as a dispersion amount for signal light after transmission over the distance of 280 km, if it is assumed that optical dispersion compensator units having the dispersion amounts A1, A2, B1 and B2, for example, of +300 ps/nm, +100 ps/nm, −300 ps/nm and −100 ps/nm, respectively, are prepared in advance, then if three optical dispersion compensator units of the dispersion amount B1 and one optical dispersion compensator unit of the dispersion amount B2 are inserted in combination into the transmission line, then the total dispersion amount is +200 ps/nm, which allows transmission.

K. Eleventh Embodiment

Figure 28:
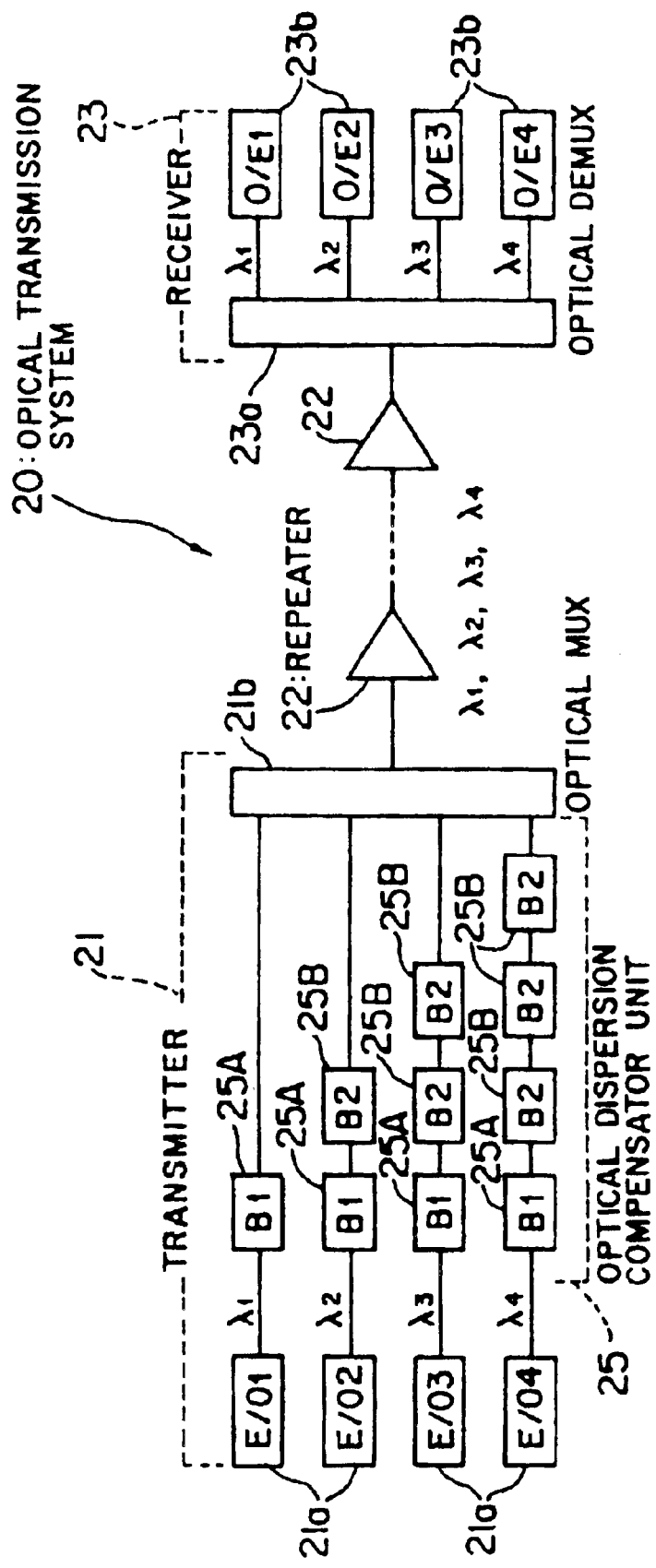
FIG. 28 is a block diagram showing an optical dispersion compensation system to which an optical dispersion compensation method of an eleventh preferred embodiment of the present invention is applied.
Figure 29:
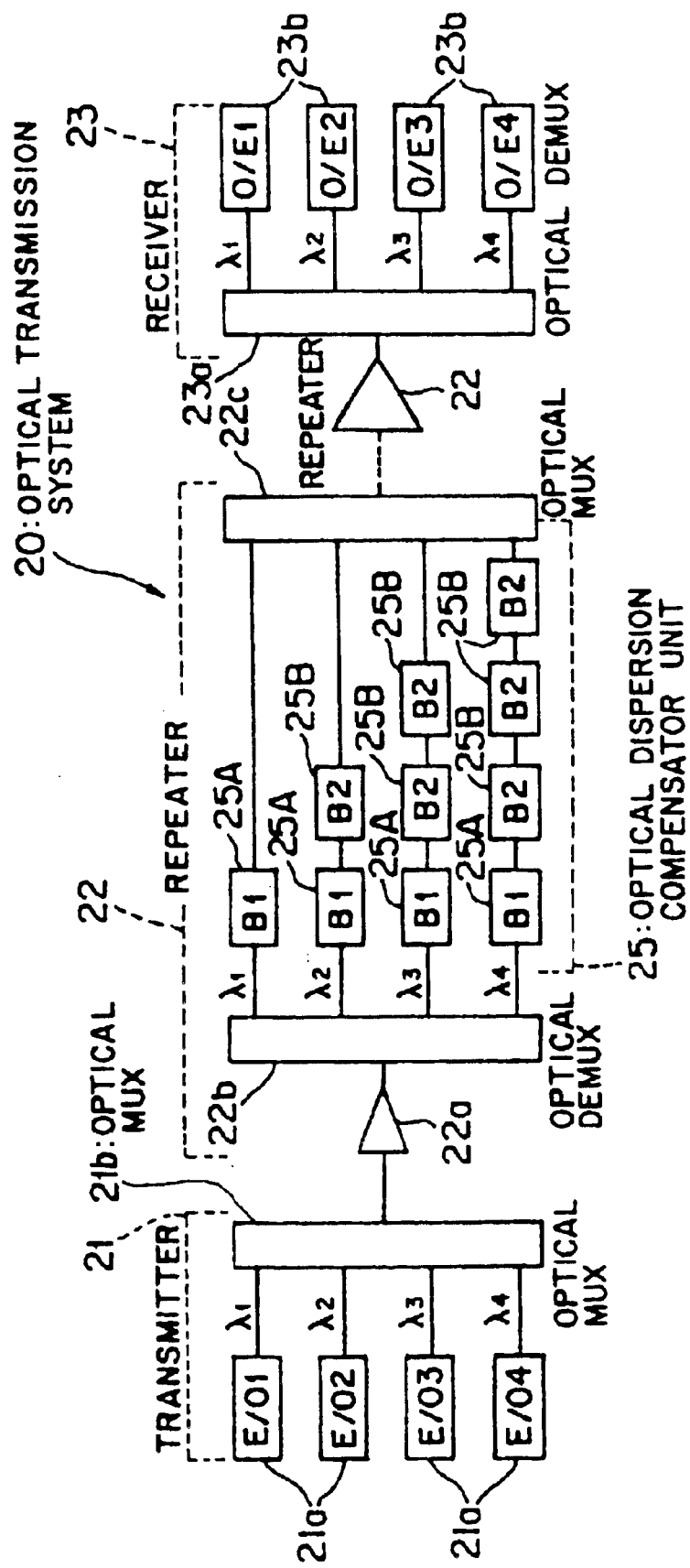
FIG. 29 is a block diagram showing a modification to the optical dispersion compensation system shown in FIG. 28.
Figure 30:
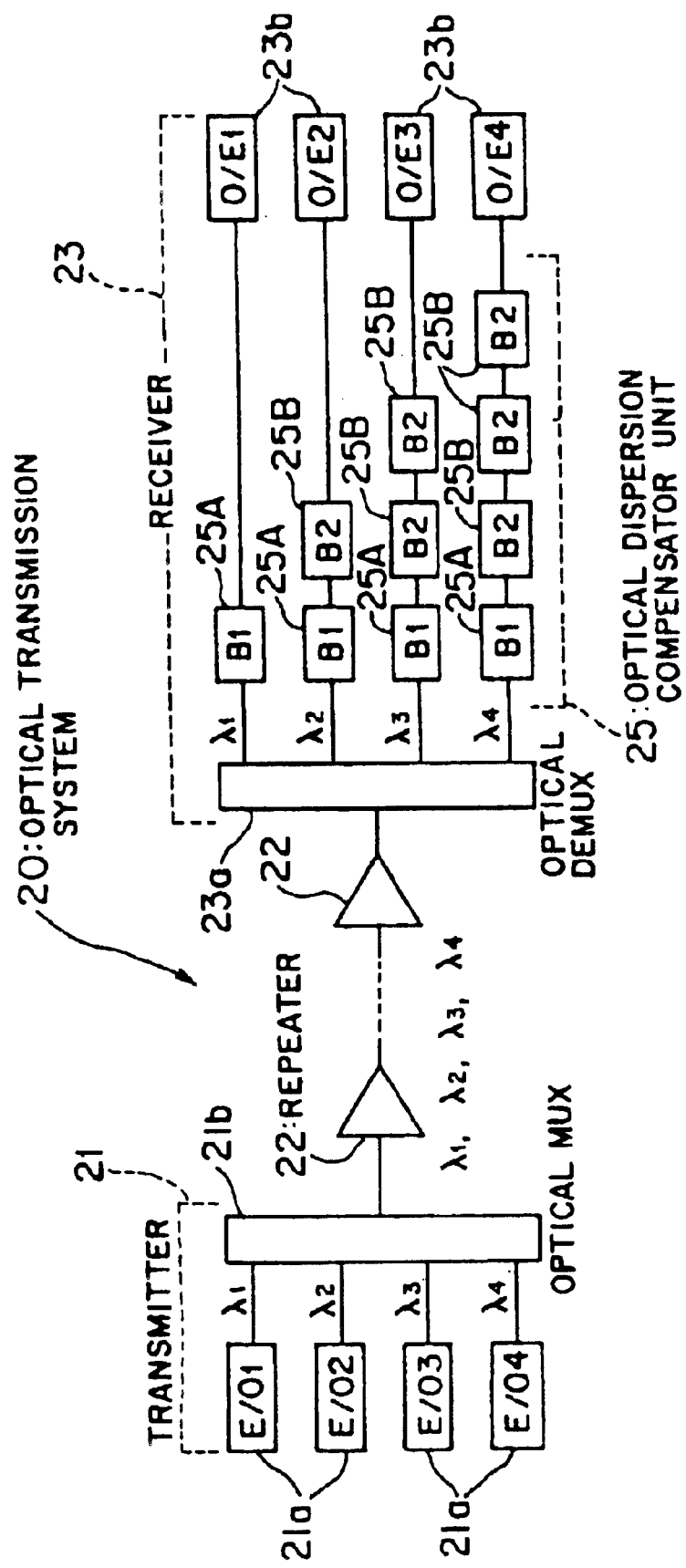
FIG. 30 is a block diagram showing another modification to the optical dispersion compensation system shown in FIG. 28.

Subsequently, an optical dispersion compensation method of an eleventh preferred embodiment of the present invention will be described. FIG. 28 shows, in block diagram, an optical dispersion compensation apparatus to which the optical dispersion compensation method is applied, and FIGS. 29 and 30 show different modifications to the optical dispersion compensation apparatus. It is to be noted that, while, in the ninth and tenth embodiments described above, description has been given only of transmission of one signal light wave, in the present embodiment, description will be given of the case wherein signal light waves (wavelengths $\lambda_1$ to $\lambda_4$) of four channels are wavelength multiplexed and transmitted.

As seen from FIG. 28, also in the present embodiment, an optical transmission system 20 is constituted from a transmitter 21, a plurality of repeaters 22 and a receiver 23 interconnected by an optical fiber 2. However, in the present eleventh embodiment, the transmitter 21 is constructed so as to first convert electric signals of different channels into signal light waves having different wavelengths or frequencies from one another and then multiplex the signal light waves by optical wavelength multiplexing. To this end, the transmitter 21 includes a plurality of electro-optical conversion sections (E/O1 to E/O4) 21a provided for the individual channels for converting electric signals of the channels into signal light waves of the predetermined wavelengths, and an optical multiplexing section 21b for receiving signal light waves from the electro-optical conversion sections 21a for the individual channels and multiplexing the received signal light waves.

Meanwhile, the receiver 23 demultiplexes multiplexed signal light transmitted thereto from the transmitter 21 by way of the optical fiber 2 and the repeaters 22 and converts signal light waves obtained by such demultiplexing individually into electric signals. To this end, the receiver 23 includes an optical demultiplexing section 23a for demultiplexing and distributing multiplexed signal light into different channels, and a plurality of opto-electric conversion sections (O/E1 to O/E4) 23b provided individually for the channels for converting signal light waves of the channels distributed thereto from the optical demultiplexing section 23a into electric signals.

Further, in the present embodiment, optical dispersion compensator units 25 are interposed between the electro-optical conversion sections 21a and the optical multiplexing section 21b of the transmitter 21. In particular, a suitable number and combination of optical dispersion compensator units 25A and 25B are provided for each of signal light waves of wavelengths $\lambda_1$ to $\lambda_4$ before wavelength multiplexing.

In the arrangement shown in FIG. 28, for the channel of the wavelength $\lambda_1$, only one optical dispersion compensator unit 25A of the dispersion amount B1 is provided; for the channel of the wavelength $\lambda_2$, one optical dispersion compensator unit 25A of the dispersion amount B1 and one optical dispersion compensator unit 25B of the dispersion amount B2 are provided; for the channel of the wavelength $\lambda_3$, one optical dispersion compensator unit 25A of the dispersion amount B1 and two optical dispersion compensator units 25B of the dispersion amount B2 are provided; and for the channel of the wavelength $\lambda_4$, one optical dispersion compensator unit 25A of the dispersion amount B1 and three optical dispersion compensator units 25B of the dispersion amount B2 are provided.

In this instance, when the installation number and the combination of the optical dispersion compensator units 25A and 25B arranged for the different channels are to be selected, as described hereinabove in the ninth and tenth embodiments, those which provide good transmission characteristics for the individual channels may be selected by trial and error or, when the dispersion value of the optical transmission system 20 can be measured, those with which the dispersion values of signal light waves fall within transmissible dispersion value ranges may be selected in accordance with a result of the measurement.

While the arrangement wherein the optical dispersion compensator units 25 are provided in the transmitter 21 are shown in FIG. 28, such optical dispersion compensator units 25 may be provided alternatively in each repeater 22 or the receiver 23 as seen in FIG. 29 or 30.

As shown in FIG. 29, where the optical dispersion compensator units 25 are provided in each repeater 22, the repeater 22 includes, in addition to an optical amplifier 22a constituting the repeater 22, an optical demultiplexing section 22b provided at a next stage to the optical amplifier 22a for demultiplexing signal light amplified by the optical amplifier 22a into individual signal light waves of different wavelengths $\lambda_1$ to $\lambda_4$ by wavelength demultiplexing, an optical dispersion compensator unit 25 provided for each of the channels of signal light waves of the wavelengths $\lambda_1$ to $\lambda_4$ demultiplexed by the optical demultiplexing section 22b and including a suitable installation number and a suitable combination of optical dispersion compensator units 25A and 25B, and an optical multiplexing section 22c for multiplexing signal light waves of the channels dispersion compensated for by the optical dispersion compensator units 25 back into signal light by wavelength multiplexing and sending out the thus multiplexed signal light into a transmission line. It is to be noted that the optical demultiplexing section 22b, the optical dispersion compensator units 25 and the optical multiplexing section 22c may be provided otherwise at a preceding stage to the optical amplifier 22a.

On the other hand, where the optical dispersion compensator units 25 are to be provided in the receiver 23, as shown in FIG. 30, they are interposed between the optical demultiplexing section 23a and the opto-electric conversion sections 23b of the receiver 23. In particular, a suitable installation number and a suitable combination of optical dispersion compensator units 25A and 25B are provided for each of the signal light waves of the wavelengths $\lambda_1$ to $\lambda_4$ after wavelength demultiplexing.

In this manner, with the optical dispersion compensation method of the eleventh embodiment, also where the optical transmission system 20 performs optical wavelength multiplex transmission to multiplex and transmit signal light waves of different wavelengths, similar advantages to those described hereinabove in connection with the ninth and tenth embodiments can be attained by providing a suitable installation number and a suitable combination of optical dispersion compensator units 25A and 25B for each wavelength.

It is to be noted that, while the embodiment described above involves four channels of signal light waves to be multiplexed and two kinds of optical dispersion compensator units prepared in advance for dispersion compensation for the individual channels, the present invention is not limited to this.

L. Twelfth Embodiment

Figure 31:
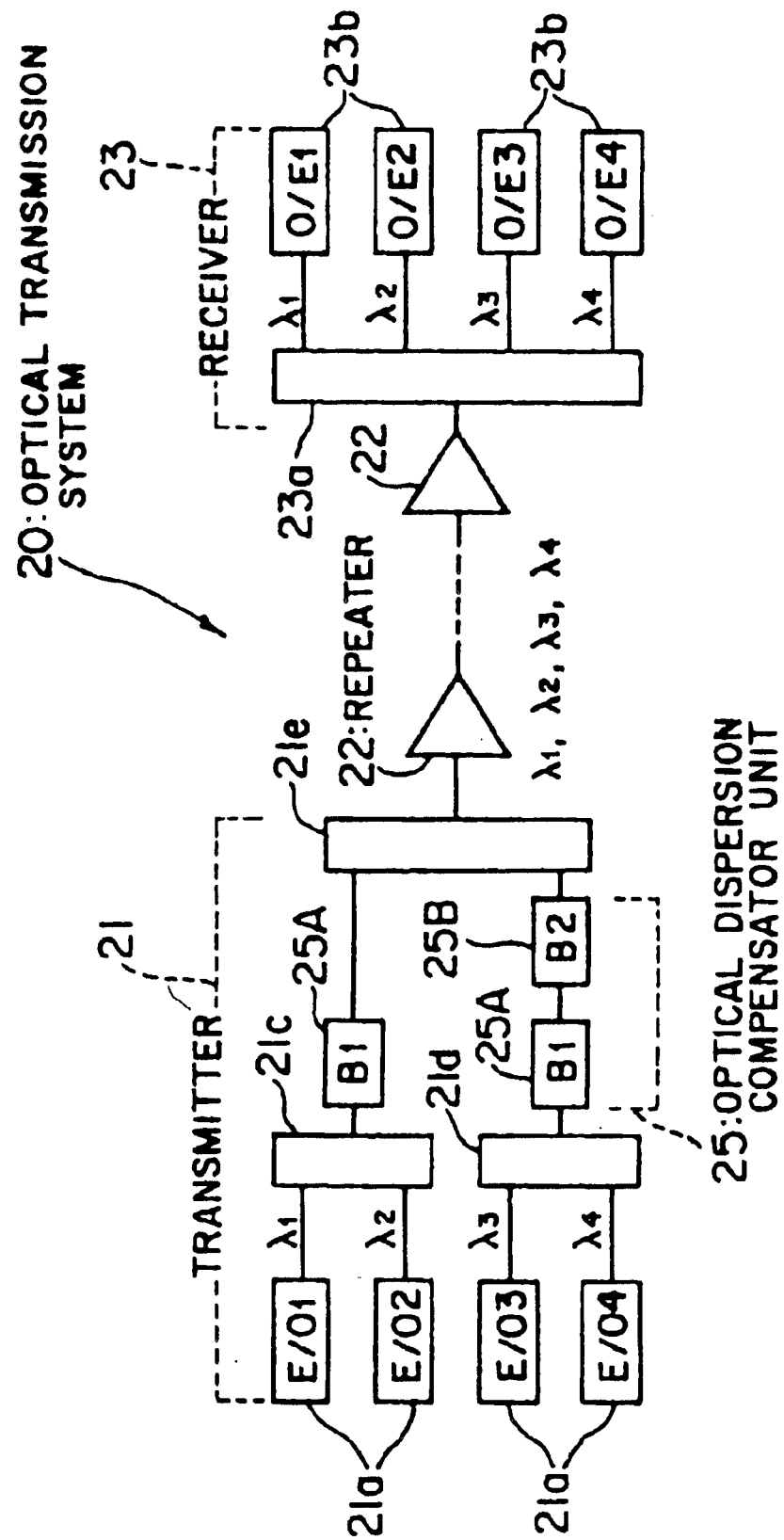
FIG. 31 is a block diagram showing an optical dispersion compensation system to which an optical dispersion compensation method of a twelfth preferred embodiment of the present invention is applied.
Figure 32:
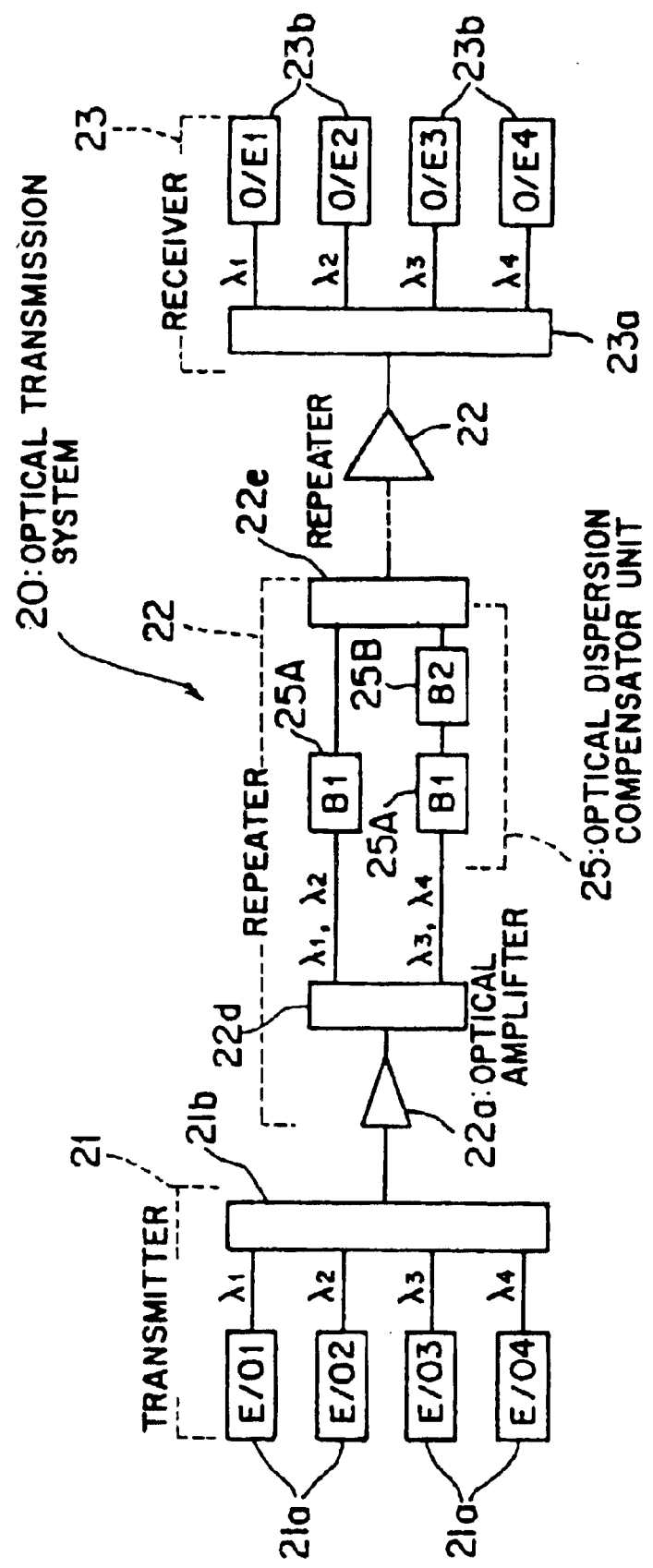
FIG. 32 is a block diagram showing a modification to the optical dispersion compensation system shown in FIG. 31.
Figure 33:
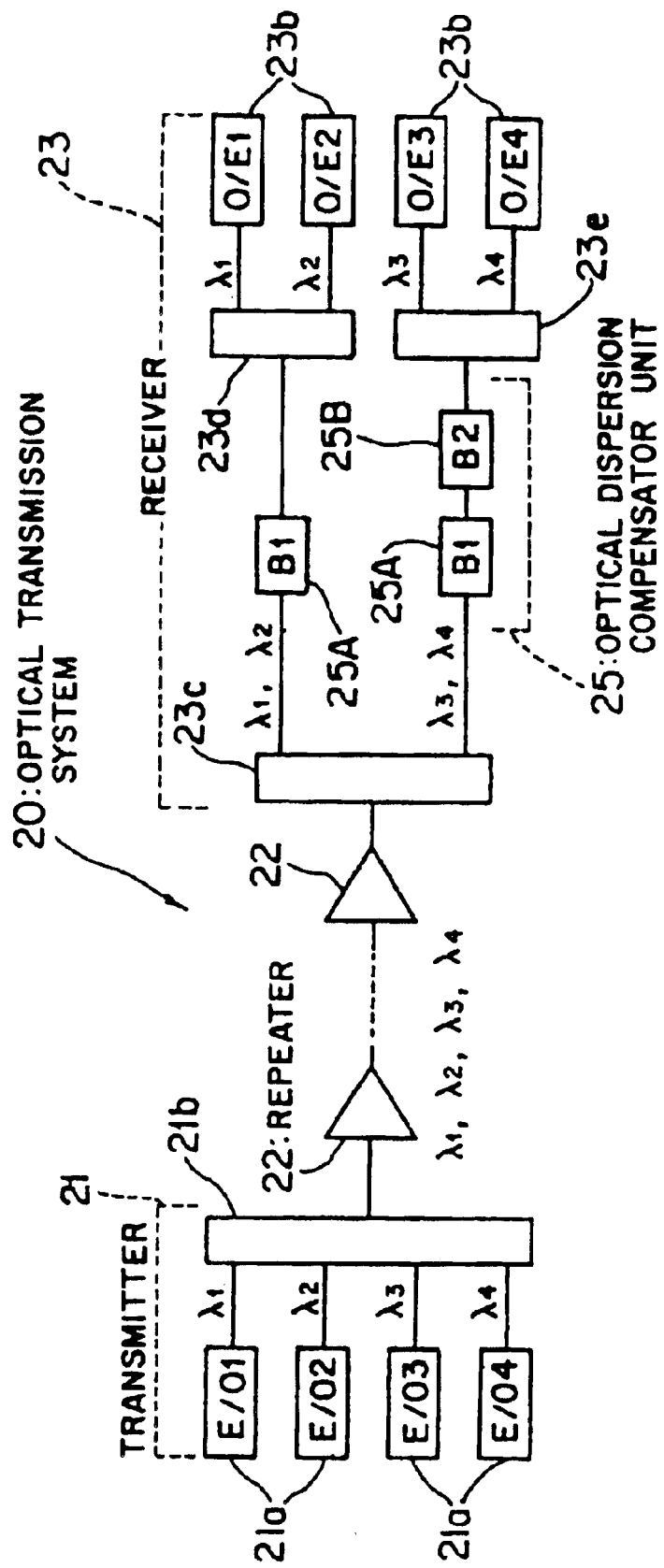
FIG. 33 is a block diagram showing another modification to the optical dispersion compensation system shown in FIG. 31.

Subsequently, an optical dispersion compensation method of a twelfth preferred embodiment of the present invention will be described. FIG. 31 shows, in block diagram, an optical dispersion compensation apparatus to which the optical dispersion compensation method is applied, and FIGS. 32 and 33 show different modifications to the optical dispersion compensation apparatus. It is to be noted that like reference characters denote like elements to those described hereinabove, and overlapping description thereof is omitted herein to avoid redundancy.

While, in the eleventh embodiment described above, description has been given of the case wherein a suitable installation number and a suitable combination of optical dispersion compensator units 25A and 25B are provided for each wavelength, in the present twelfth embodiment, a suitable installation number and a suitable combination of optical dispersion compensator units 25A and 25B are provided in the optical transmission system 20 for each channel group including a plurality of signal light waves (two signal light waves in the present embodiment).

In particular, FIGS. 31 to 33 illustrate different arrangements wherein optical dispersion compensator units 25 are provided in the transmitter 21, each of the repeaters 22 and the receiver 23, respectively. Where the optical dispersion compensator units 25 are provided in the transmitter 21 as shown in FIG. 31, the optical multiplexing section 21b of the transmitter 21 described hereinabove includes an optical multiplexing section 21c for multiplexing signal light waves of the wavelengths $\lambda_1$ and $\lambda_2$ from the electro-optical conversion section 21a, another optical multiplexing section 21d for multiplexing signal light waves of the wavelengths $\lambda_3$ and $\lambda_4$ from the electro-optical conversion section 21a, and a further optical multiplexing section 21e for multiplexing two signal light beams multiplexed by the optical multiplexing sections 21c and 21d.

An optical dispersion compensator unit 25 is interposed between each of the multiplexing sections 21c and 21d and the optical multiplexing section 21e. In other words, a suitable installation number and a suitable combination of optical dispersion compensator units 25A and 25B are provided for each of channel groups each including two signal light waves.

For example, in the arrangement shown in FIG. 31, for the channel group of the wavelengths $\lambda_1$ and $_2$, only one optical dispersion compensator unit 25A of the dispersion amount B1 is provided; and for the channel group of the wavelengths $\lambda_3$ and $\lambda_4$, one optical dispersion compensator unit 25A of the dispersion amount B1 and one optical dispersion compensator unit 25B of the dispersion amount B2 are provided.

In this instance, when the installation number and the combination of the optical dispersion compensator units 25A and 25B to be arranged for the different channels are to be selected, as described hereinabove in the ninth and tenth embodiments, those which provide good transmission characteristics for the individual channels may be selected by trial and error or, when the dispersion amount of the optical transmission system 20 can be measured, those with which the dispersion values of signal light waves fall within a transmissible dispersion value range may be selected in accordance with a result of the measurement.

Meanwhile, where the optical dispersion compensator units are provided in each repeater 22 as shown in FIG. 32, the repeater 22 includes, in addition to the optical amplifier 22a constituting the repeater 22, an optical demultiplexing section 22d provided at a next stage to the optical amplifier 22a for demultiplexing signal light amplified by the optical amplifier 22a into two channel groups including a group of the wavelengths $\lambda_1$ and $\lambda_2$ and another group of the wavelengths $\lambda_3$ and $\lambda_4$ by wavelength demultiplexing, an optical dispersion compensator unit provided for each of the channel groups demultiplexed by the optical demultiplexing section 22d and including a suitable installation number and a suitable combination of optical dispersion compensator units 25A and 25B, and an optical multiplexing section 22e for multiplexing signal light waves of the channel groups dispersion compensated for by the optical dispersion compensator units 25 back into signal light by wavelength multiplexing and sending out the thus multiplexed signal light into the transmission line. It is to be noted that the optical demultiplexing section 22d, the optical dispersion compensator units 25 and the optical multiplexing section 22e may be provided otherwise at a preceding stage to the optical amplifier 22a.

On the other hand, where the optical dispersion compensator units 25 are to be provided in the receiver 23, as shown in FIG. 33, the optical demultiplexing section 23a of the receiver 23 described above includes an optical demultiplexer 23c for demultiplexing received signal light into a channel group of the wavelengths $\lambda_1$ and $\lambda_2$ and another channel group of the wavelengths $\lambda_3$ and $\lambda_4$, another optical demultiplexing section 23d for demultiplexing the channel group of the wavelengths $\lambda_1$ and $\lambda_2$ into signal light waves of the wavelengths $\lambda_1$ and $\lambda_2$, and a further optical demultiplexing section 23e for demultiplexing the channel group of the wavelengths $\lambda_3$ and $\lambda_4$ into signal light waves of the wavelengths $\lambda_3$ and $\lambda_4$.

Further, an optical dispersion compensator unit 25 is interposed between the optical demultiplexing section 23c and each of the optical demultiplexing sections 23d and 23e. In particular, a suitable installation number and a suitable combination of optical dispersion compensator units 25A and 25B are provided for each of the channel groups each including two signal light waves.

In this manner, with the optical dispersion compensation method of the twelfth embodiment, also where the optical transmission system 20 performs optical wavelength multiplex transmission to multiplex and transmit signal light waves of different wavelengths, similar advantages to those described hereinabove in connection with the ninth and tenth embodiments can be attained by providing a suitable installation number and a suitable combination of optical dispersion compensator units 25A and 25B for each channel group.

It is to be noted that, while the embodiment described above involves four channels of signal light waves to be multiplexed and two kinds of optical dispersion compensator units prepared in advance for dispersion compensation for the individual channels and besides involves separation of the channels into two channel groups, the present invention is not limited to this.

M. Thirteenth Embodiment

Figure 34:
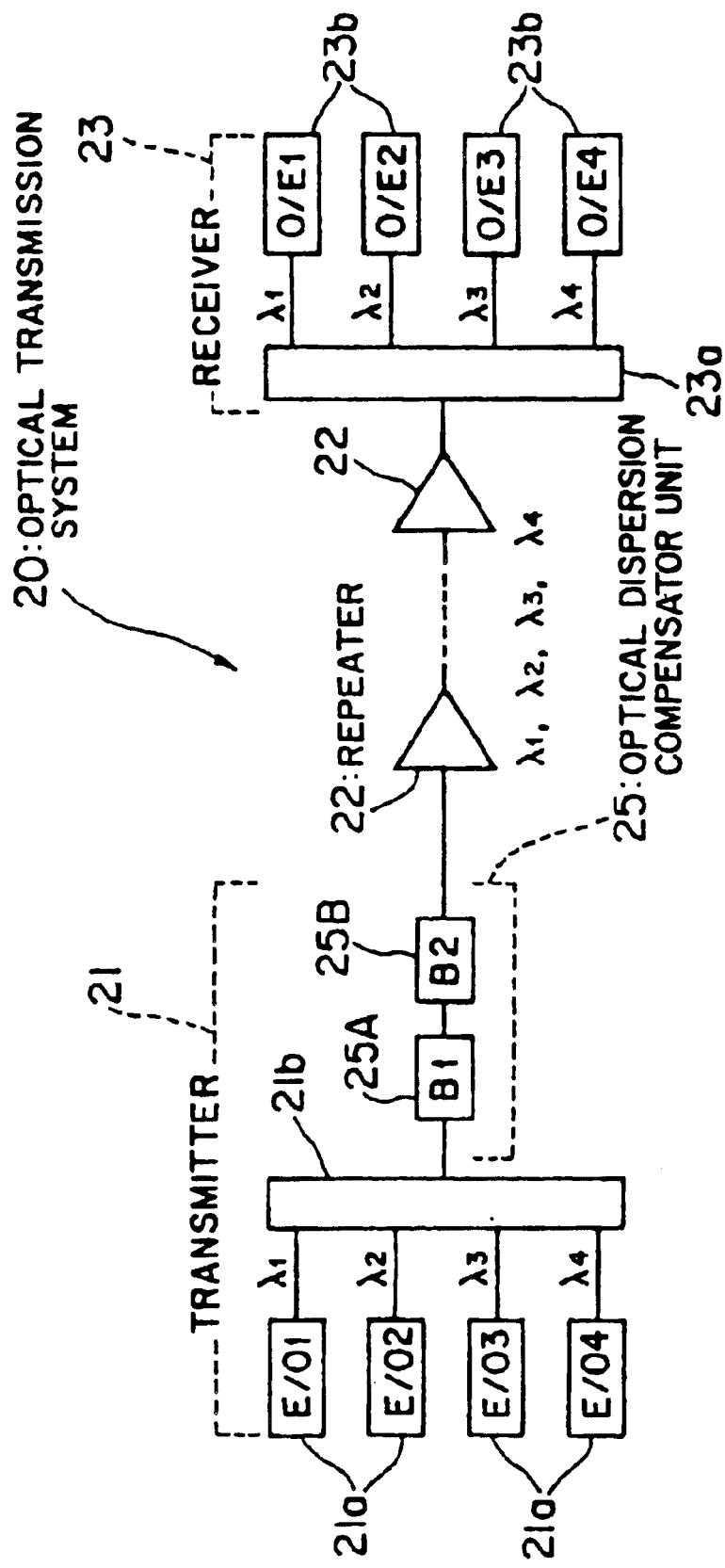
FIG. 34 is a block diagram showing an optical dispersion compensation system to which an optical dispersion compensation method of a thirteenth preferred embodiment of the present invention is applied.
Figure 35:
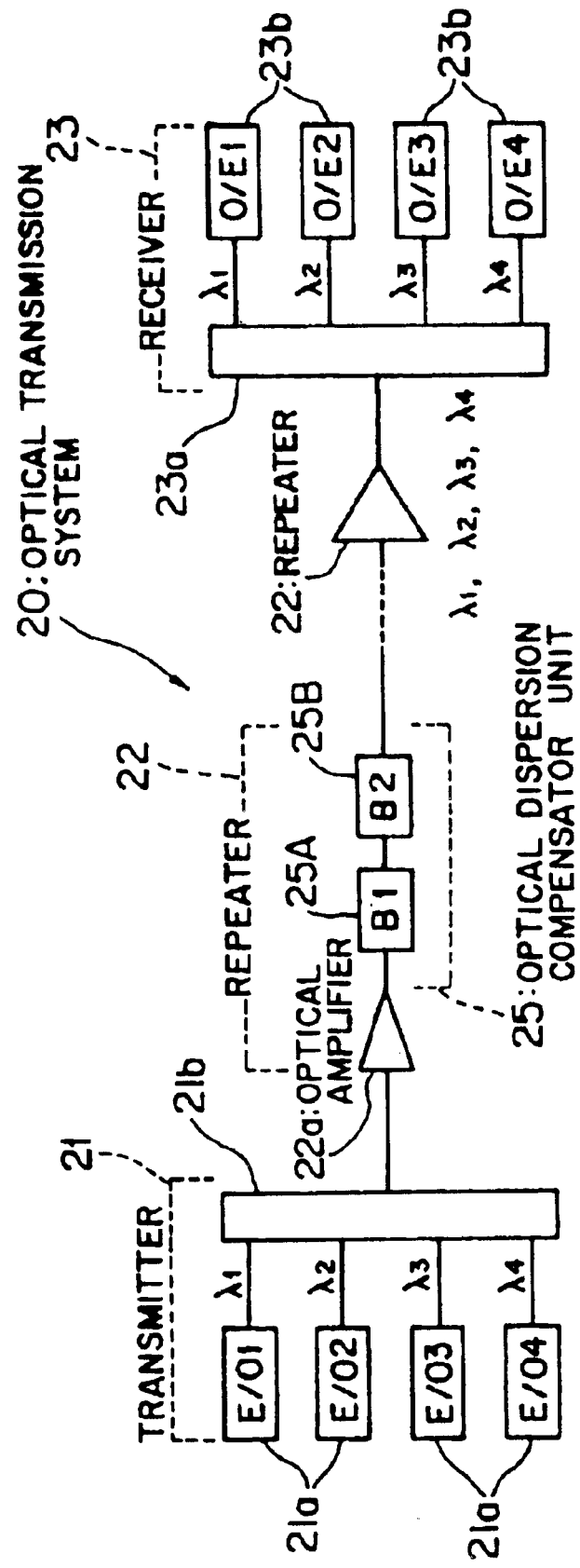
FIG. 35 is a block diagram showing a modification to the optical dispersion compensation system shown in FIG. 34.
Figure 36:
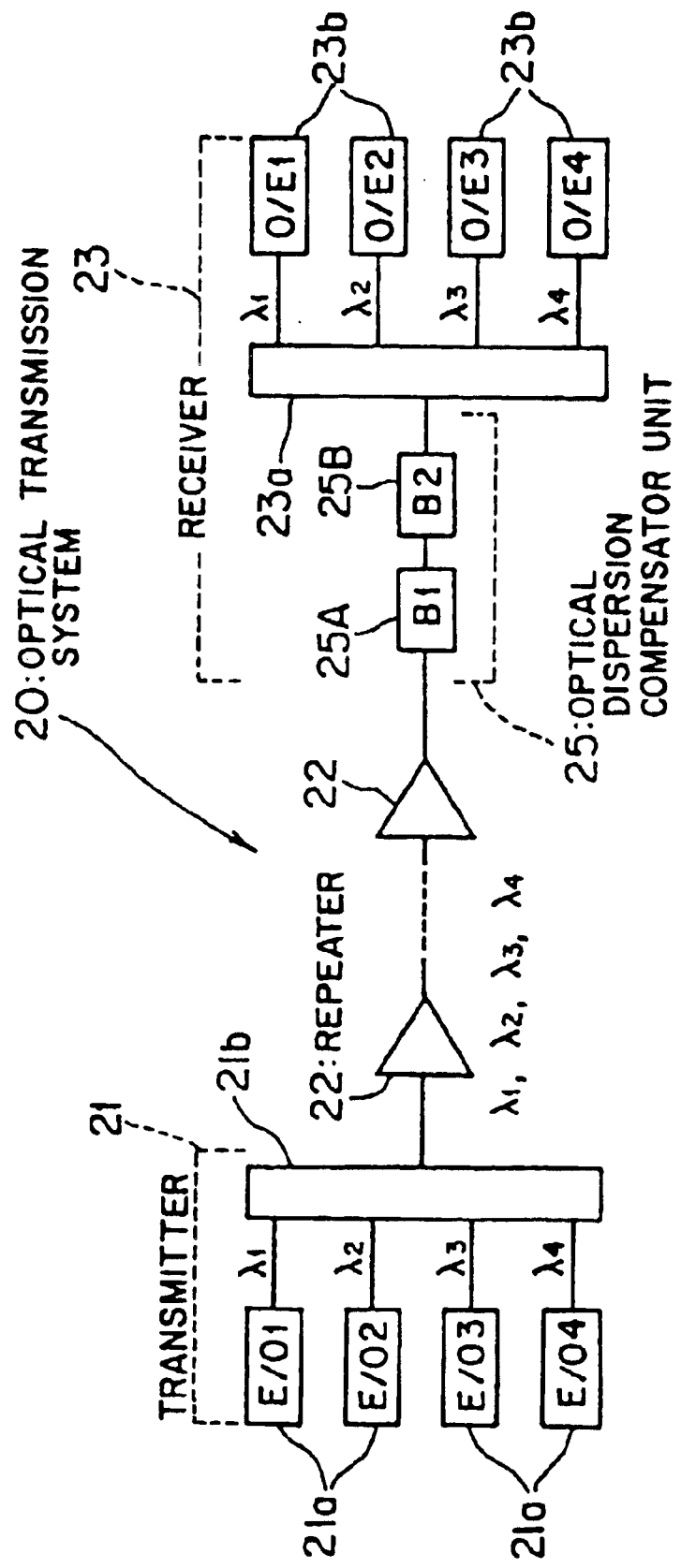
FIG. 36 is a block diagram showing another modification to the optical dispersion compensation system shown in FIG. 34.

Subsequently, an optical dispersion compensation method of a thirteenth preferred embodiment of the present invention will be described. FIG. 34 shows, in block diagram, an optical dispersion compensation apparatus to which the optical dispersion compensation method is applied, and FIGS. 35 and 36 show different modifications to the optical dispersion compensation apparatus. It is to be noted that like reference characters denote like elements to those described hereinabove, and overlapping description thereof is omitted herein to avoid redundancy.

While, in the eleventh or twelfth embodiment described above, description has been given of the case wherein a suitable installation number and a suitable combination of optical dispersion compensator units 25A and 25B are provided for each wavelength or for each channel group, in the present thirteenth embodiment, a suitable installation number and a suitable combination of optical dispersion compensator units 25A and 25B are provided in the optical transmission system 20 for all of signal light waves of a plurality of channels (four channels in the arrangement shown in FIG. 34).

In particular, FIGS. 34 to 36 illustrate different arrangements wherein an optical dispersion compensator unit 25 is provided in the transmitter 21, each of the repeaters 22 and the receiver 23, respectively. Where the optical dispersion compensator unit 25 is provided in the transmitter 21 as shown in FIG. 34, the optical dispersion compensator unit 25 is provided at a next stage to the optical multiplexing section 21b of the transmitter 21 and includes a suitable installation number and a suitable combination of optical dispersion compensator units 25A and 25B. For example, in the arrangement shown in FIG. 34, one optical dispersion compensator unit 25A of the dispersion amount B1 and one optical dispersion compensator unit 25B of the dispersion amount B2 are provided.

In this instance, when the installation number and the combination of the optical dispersion compensator units 25A and 25B to be arranged for all of the signal light waves are to be selected, as described hereinabove in the ninth and tenth embodiments, those which provide good transmission characteristics for the individual channels may be selected by trial and error or, when the dispersion amount of the optical transmission system 20 can be measured, those with which the dispersion values of signal light waves fall within a transmissible dispersion value range may be selected in accordance with a result of the measurement.

Meanwhile, where the optical dispersion compensator unit is provided in each repeater 22 as shown in FIG. 35, it is located at a next stage to the optical amplifier 22a constituting the repeater 22 and includes a-suitable installation number and a suitable combination of optical dispersion compensator units 25A and 25B. It is to be noted that the optical dispersion compensator unit 25 may be provided otherwise at a preceding stage to the optical amplifier 22a.

On the other hand, where the optical dispersion compensator unit 25 is to be provided in the receiver 23, as shown in FIG. 36, it is located at a preceding stage to the optical demultiplexing section 23a of the receiver 23 and includes a suitable installation number and a suitable combination of optical dispersion compensator units 25A and 25B.

In this manner, with the optical dispersion compensation method of the thirteenth embodiment, also where the optical transmission system 20 performs optical wavelength multiplex transmission to multiplex and transmit signal light waves of different wavelengths, similar advantages to those described hereinabove in connection with the ninth and tenth embodiments can be attained by providing a suitable installation number and a suitable combination of optical dispersion compensator units 25A and 25B for all of signal light waves of the channels.

It is to be noted that, while the embodiment described above involves four channels of signal light waves to be multiplexed and two kinds of optical dispersion compensator units prepared in advance for dispersion compensation for the individual channels, the present invention is not limited to this.

Further, in the tenth to thirteenth embodiments described above, it is important to design the dispersion values of the involved optical dispersion compensator units taking the wavelength spacing between the channels and the dispersion slope dD/dλ of the transmission line into consideration and reduce the number of types of optical dispersion compensator units as small as possible.

N. Fourteenth Embodiment

Figure 37:
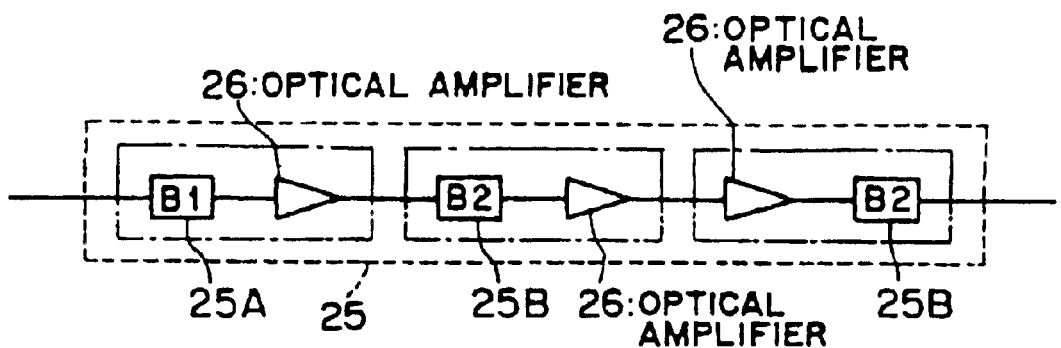
FIG. 37 is a block diagram showing an optical dispersion compensation system to which an optical dispersion compensation method of a fourteenth preferred embodiment of the present invention is applied.
Figure 38A:
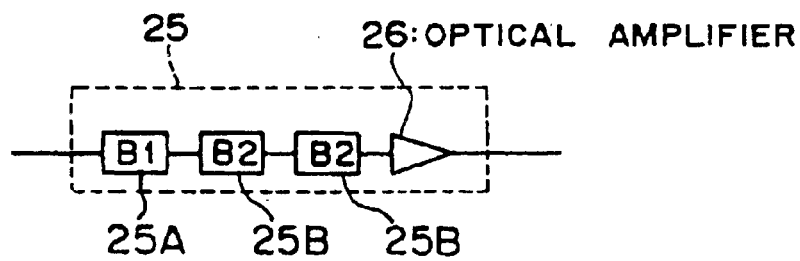
FIGS. 38(a) and 38(b) are block diagrams showing a modification to the optical dispersion compensation system shown in FIG. 37.
Figure 38B:
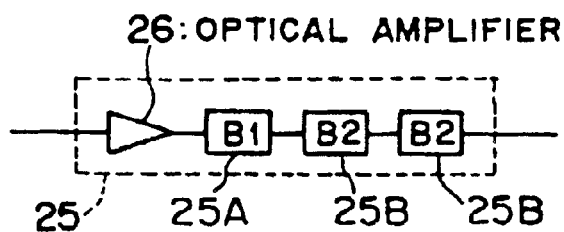
Figure 39:
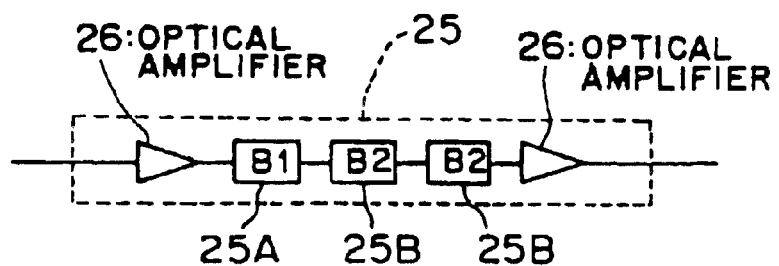
FIG. 39 is a block diagram showing another modification to the optical dispersion compensation system shown in FIG. 37.
Figure 40:
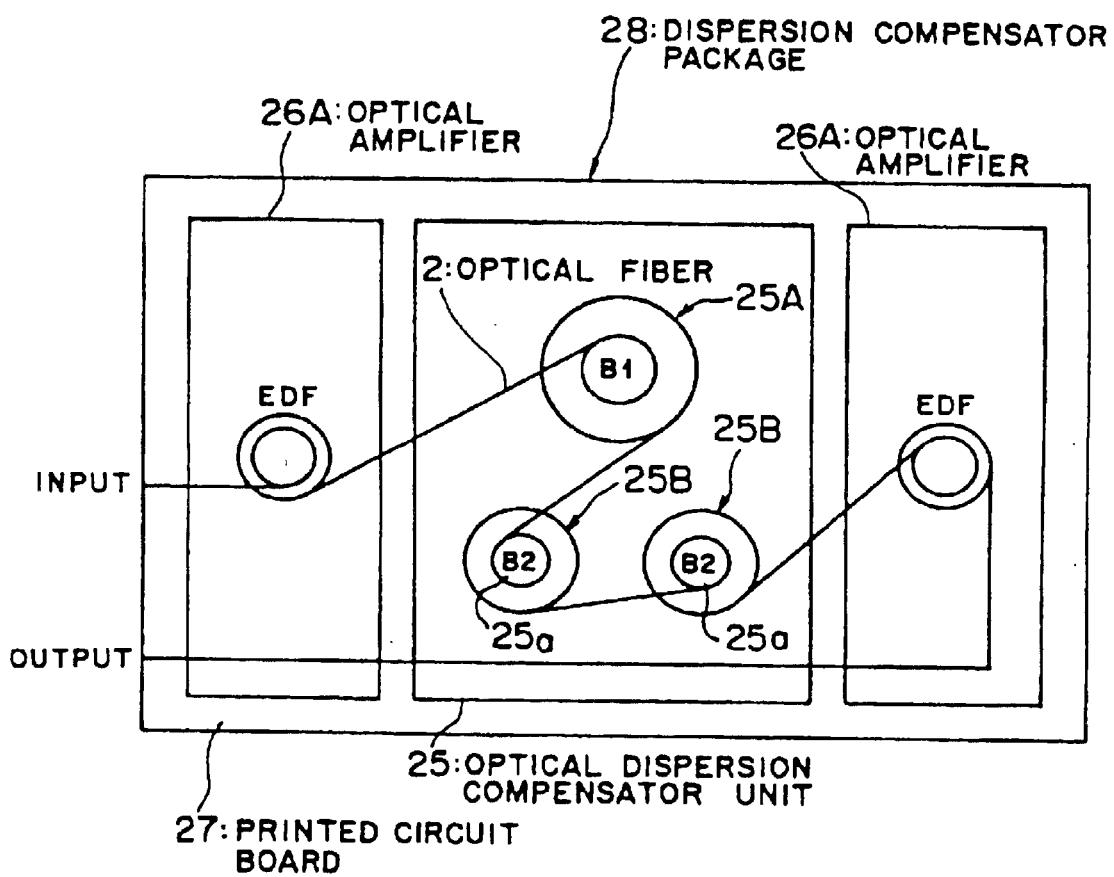
FIG. 40 is a schematic illustration showing an exemplary construction of a package according to the modified optical dispersion compensation system shown in FIG. 39.

Subsequently, an optical dispersion compensation method of a fourteenth preferred embodiment of the present invention will be described. FIG. 37 shows, in block diagram, an optical dispersion compensation apparatus to which the optical dispersion compensation method is applied, and FIGS. 38(a) and 38(b) show a modification to the optical dispersion compensation apparatus while FIG. 39 show another modification to the optical dispersion compensation apparatus and FIG. 40 shows an example of the construction of a packet based on the modified optical dispersion compensation apparatus of FIG. 39. It is to be noted that like reference characters denote like elements to those described hereinabove, and overlapping description thereof is omitted herein to avoid redundancy.

While, in the ninth to thirteenth embodiments described above, description has been given of the arrangement means for the optical dispersion compensator units 24A, 24B, 25, 25A and 25B, in the present fourteenth embodiment, examples of a detailed construction and insertion installation means of the optical dispersion compensator units 25, 25A and 25B themselves will be described.

For example, as shown in FIG. 37, an optical amplifier 26 is additionally provided at a preceding stage or a next stage to each of optical dispersion compensator units 25A and 25B constituting an optical dispersion compensator unit 25 for compensating the optical loss by the optical dispersion compensator unit 25A or 25B.

By the way, various types of optical dispersion compensators have been proposed so far including the dispersion compensating fiber type, the transversal filter type and the optical resonator type. While dispersion compensation fibers having a dispersion value higher than −100 ps/(nm·km) are manufactured at present by contriving the shape-of the core, with such dispersion compensation fibers, the optical loss is high although a dispersion compensation amount can be adjusted readily by the length of the fiber. Thus, where the optical dispersion compensator units 25A and 25B are integrated with an optical amplifier 26 such as an EDFA as in the fourteenth embodiment, the optical loss of the dispersion compensation fiber can be compensated for.

It is to be noted that, while an optical amplifier 26 is additionally provided for each optical dispersion compensator unit 25A or 25B in FIG. 37, only one optical amplifier 26 may otherwise be provided for each group (optical dispersion compensation unit 25) of optical dispersion compensator units 25A and 25B as shown in FIG. 38(a) or 38(b).

Alternatively, a pair of optical amplifiers 26A and 26B are additionally provided at both of a preceding stage and a next stage to each group (optical dispersion compensator unit 25) of optical dispersion compensator units 25A and 25B as shown in FIG. 39.

Where only one amplifier is provided, not only a high gain sufficient to compensate for both of the transmission line loss and the optical loss at the optical dispersion compensator unit is required, but where the optical dispersion compensator unit having a high optical loss is located at a preceding stage to the optical amplifier 26, this makes a cause to degrade the NF significantly. This must be eliminated particularly where an optical dispersion compensator unit 25 is inserted in a 1R repeater in an optical amplifier multi-repeater system.

Therefore, where such a construction as shown in FIG. 39 wherein the two optical amplifiers 26A and 26B are provided on the opposite front and rear ends of the optical dispersion compensator unit 25 is employed, the NF of the entire 1R repeater can be reduced low by minimizing the NF of the optical amplifier at the preceding stage, and a sufficient gain can be assured by means of the two stages of optical amplifiers 26A and 26B.

Incorporation of such an optical dispersion compensator unit 25 as described above into the transmitter 21, each of the repeaters 22 or the receiver 23 is performed, for example, in the following manner. A space sufficient to allow insertion of an optical dispersion compensator unit 25 therein is assured in advance in each of the transmitter 21, the repeaters 22 and the receiver 23, and after installation of the system, optimum optical dispersion compensator units 25 conforming to the transmission line (optical transmission system 20) are additionally inserted into the spaces to incorporate the optical dispersion compensators-25 into the optical transmission system 20.

Meanwhile, electronic parts and optical parts in an optical transmission apparatus are generally mounted on a printed circuit board (a printed circuit board on which electronic parts and/or optical parts are mounted in this manner is called package), and such package in most cases has a structure which allows mounting and dismounting onto and from an apparatus support frame.

Thus, a dispersion compensation package having optical dispersion compensator units mounted thereon may be provided so that it may be mounted and dismounted onto and from an apparatus supporting frame. For example, a package obtained by packaging the optical dispersion compensator unit 25 shown in FIG. 39 is shown in FIG. 40. Referring to FIG. 40, an optical dispersion compensator unit 25 including a pair of front and rear optical amplifiers 26A and 26B and three optical dispersion compensator units 25A and 25B of two different types is mounted on a printed circuit board 27 to constitute a dispersion compensation package 28. It is to be noted that each of the optical dispersion compensator units 25A and 25B is constituted from a dispersion compensation fiber (optical fiber 2) wound by a predetermined length around a small bobbin located on the printed circuit board 27.

Where such a dispersion compensation package 28 as described above is employed, optical dispersion compensator units can be replaced or incorporated readily in units of a package. Consequently, the dispersion compensation amount can be varied readily.

O. Fifteenth Embodiment

Figure 41:
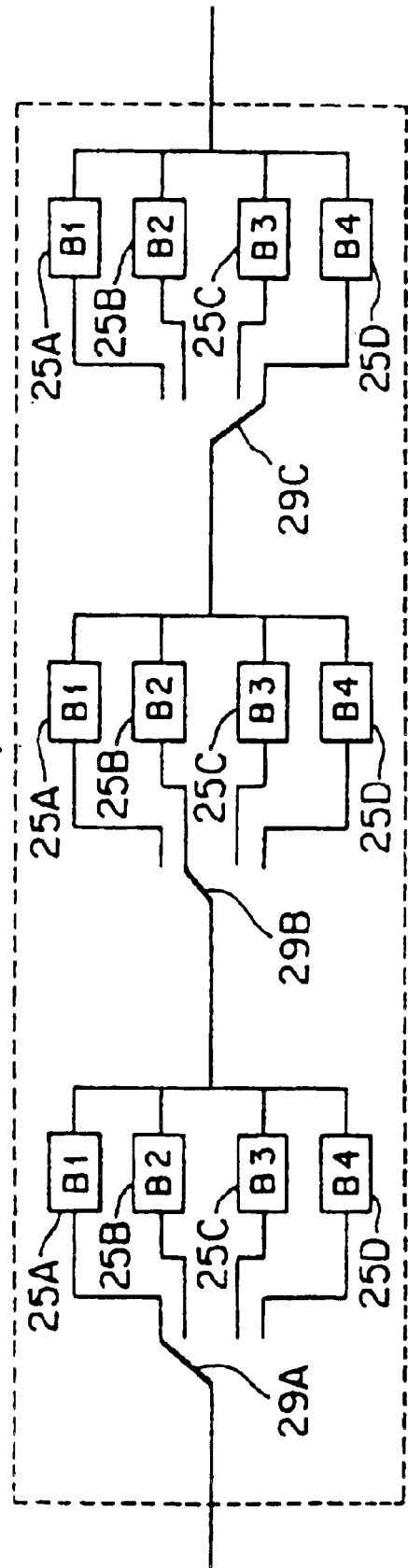
FIG. 41 is a block diagram showing an optical dispersion compensation system to which an optical dispersion compensation method of a fifteenth preferred embodiment of the present invention is applied.
Figure 42:
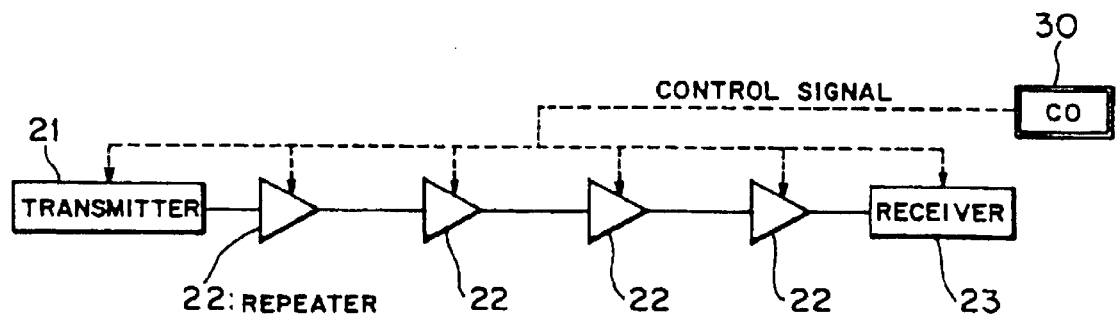
FIG. 42 is a block diagram showing an adaptation of the optical dispersion compensation system shown in FIG. 41.
Figure 43:
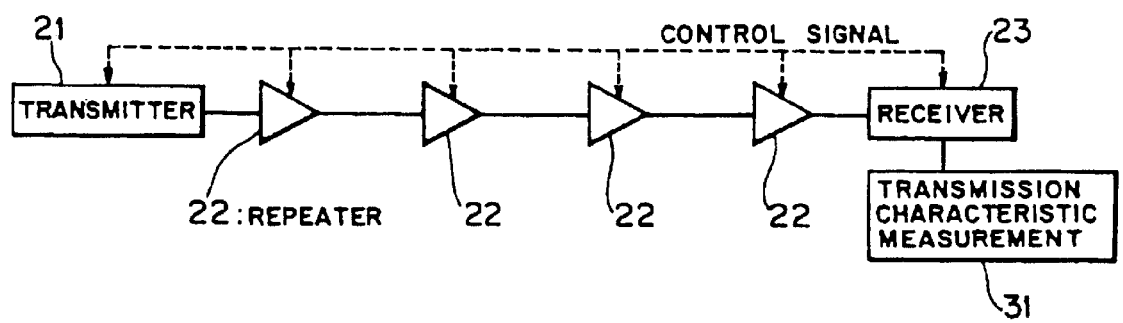
FIG. 43 is a block diagram showing another adaptation to the optical dispersion compensation system shown in FIG. 41.

Subsequently, an optical dispersion compensation method of a fifteenth preferred embodiment of the present invention will be described. FIG. 41 shows, in block diagram, an optical dispersion compensation apparatus to which the optical dispersion compensation method is applied, and FIGS. 42 and 43 show different modifications to the optical dispersion compensation apparatus. It is to be noted that like reference characters denote like elements to those described hereinabove, and overlapping description thereof is omitted herein to avoid redundancy.

In the fifteenth embodiment, such an optical dispersion compensator unit 32 is built in each of the transmitter 21, the repeaters 22 and the receiver 23 which constitute the optical transmission system 20.

Referring to FIG. 41, the optical dispersion compensator unit 32 includes three stages of optical dispersion compensator units 25A to 25D of a plurality of different kinds (four kinds having dispersion amounts B1 to B4 in the arrangement shown in FIG. 41) having different dispersion amounts having different positive and negative signs, and switches (switching means) 29A to 29C connected to the three stages of optical dispersion compensator units 25A to 25D for switching the selective combination of the optical dispersion compensator units 25A to 25D. When each of the switches 29A to 29C is operated for switching, one of the four kinds of optical dispersion compensator units 25A to 25D of the corresponding stage is selected, and consequently, by operation of the switches 29A to 29C, a suitable combination of three optical dispersion compensator units 25A to 25D can be selectively incorporated into the optical transmission system 20.

It is to be noted that each of the switches 29A to 29C may be means for wiring any of the optical dispersion compensator units 25A to 25D by means of an optical fiber (mechanical connection or mechanical switch) or means for selecting a connection route by means of an optical switch. The optical switch may be an optical waveguide switch or a spatial change-over switch.

Further, as means for changing over each of the switches 29A to 29C, means for modifying the wiring system of the optical fiber or switching the optical switch on/off simply by a personal operation from the outside or means for automatically performing such changing over operation in response to an electric or optical control signal from the outside may be applied.

Subsequently, detailed adaptations of a switching operation of the switches 29A to 29C in response to a control signal from the outside to select a suitable combination of three optical dispersion compensator units 25A to 25D will be described with reference to FIGS. 42 and 43.

In means for automatically performing a switching operation in response to a control signal, a control signal may be sent from a transmitter-receiver terminal off ice to each repeater 22, or as in the adaptation illustrated in FIG. 42, a control signal may be sent from a center off ice 30, which controls the entire system in a concentrated manner, to each of the switches 29A to 29C of the optical dispersion compensator unit 32 which are provided in each of the transmitter 21, the repeaters 22 and the receiver 23.

Meanwhile, in the adaptation illustrated in FIG. 43, the receiver 23 has a function of outputting a switching control signal to each of the switches 29A to 29C of the optical dispersion compensator unit 32 provided in each of the transmitter 21 and the repeaters 22, and includes transmission characteristic measurement means 31 for measuring transmission characteristics (error rate, waveform and so forth) of the optical transmission system 20.

Thus, the switches 29A to 29C are operated in response to control signals from the receiver 23 to successively change the selective combination of the optical dispersion compensator units 25A to 25D of the optical dispersion compensator units 32 while the transmission characteristics of the optical transmission system 20 are measured by the transmission characteristic measurement means 31 to determine a combination of optical dispersion compensator units 25A to 25D which provides optimum transmission characteristics of the optical transmission system 20, and then, the switches 29A to 29C are operated in response to control signals from the receiver 23 to change over the combination of optical dispersion compensator units 25A to 25D to the thus determined combination which provides the optimum transmission characteristics to the optical transmission system 20.

In this manner, with the optical dispersion compensation method of the fifteenth embodiment, since a plurality of kinds of optical dispersion compensator units 25A to 25D are built in advance in each of the transmitter 21, the repeaters 22 and the receiver 23 of the optical transmission system 20 in such a connected condition that the combination of optical dispersion compensator units 25A to 25D can be selectively switched by way of the switches 29A to 29C, a suitable combination of optical dispersion compensator units 25A to 25D is selected from within the optical dispersion compensator units 25A to 25D by operating the switches 29A to 29C. Particularly where the construction shown in FIG. 43 is employed, the combination of optical dispersion compensator units 25A to 25D can be automatically changed over to a combination which provides optimum transmission characteristics to the optical transmission system 20.

It is to be noted that, while, in the embodiment described above, description has been given of the case wherein an optical dispersion compensator unit 32 is built in each of the transmitter 21, the repeaters 22 and the receiver 23 which constitute the optical transmission system 20, advantages similar to those described above can be obtained where such optical dispersion compensator unit 32 is built in at least one of the transmitter 21, the repeaters 22 and the receiver 23.

The present invention is not limited to the specifically described embodiment, and variations and modifications may be made without departing from the scope of the present invention.

What is claimed is:

1. An apparatus comprising:
  a multi-stage optical amplifier to amplify a wavelength division multiplexed (WDM) optical signal including a plurality of optical signals each of which has different wavelength, the plurality of optical signals being transmitted through associated signal channels, the multi-stage optical amplifier including
a first amplifier amplifying the WDM optical signal,
a dispersion compensator compensating dispersion given to the amplified WDM optical signal and outputting a dispersion compensated WDM optical signal, and
a second amplifier amplifying the dispersion compensated WDM optical signal,
wherein channel spacing between a pair of adjacent signal channels is set to an integer multiple of a minimum channel spacing defined in terms of an optical frequency or an optical wavelength.

2. An apparatus as in claim 1, wherein the first and second amplifiers are erbium doped optical fiber amplifiers.

3. An apparatus as in claim 1, wherein the dispersion compensator is a dispersion compensation fiber.

4. An apparatus as in claim 1, wherein the first and second amplifiers have a combined gain to output the dispersion compensated WDM optical from the second amplifier at a power level sufficient to be received by an apparatus downstream of the second amplifier.

5. An apparatus comprising:
a multi-stage optical amplifier to amplify a wavelength division multiplexed (WDM) optical signal including a plurality of optical signals each of which has different wavelength, the plurality of optical signals being transmitted through associated signal channels, the multi-stage optical amplifier including
a first amplifier amplifying the WDM optical signal,
a dispersion compensator providing dispersion compensation to the amplified WDM optical signal, and
a second amplifier amplifying the WDM optical signal provided with dispersion compensation by the dispersion compensator, wherein channel spacing between a pair of adjacent signal channels is set to an integer multiple of a minimum channel spacing defined in terms of an optical frequency or an optical wavelength.

6. An apparatus as in claim 5, wherein the first and second amplifiers are erbium doped fiber amplifiers.

7. An apparatus as in claim 5, wherein the first dispersion compensator is a dispersion compensation fiber.

8. An apparatus as in claim 5, wherein the first and second amplifiers have a combined gain so that the WDM optical signal is output from the second amplifier at a power level sufficient to be received by an apparatus downstream of the second amplifier.

9. An apparatus comprising:
a multi-stage optical amplifier to amplify a wavelength division multiplexed (WDM) optical signal including a plurality of optical signals each of which has different wavelength, the plurality of optical signals being transmitted through associated signal channels, the multi-stage optical amplifier including
a dispersion compensator providing dispersion compensation to the WDM optical signal,
a first amplifier positioned upstream of the dispersion compensator, and
a second amplifier positioned downstream of the dispersion compensator, wherein
a combined gain of the first and second amplifiers is sufficient to compensate a loss in the dispersion compensator and to output the WDM optical signal from the second amplifier with an output power for transmission downstream of the second amplifier, and
channel spacing between a pair of adjacent signal channels is set to an integer multiple of a minimum channel spacing defined in terms of an optical frequency or an optical wavelength.

10. An apparatus as in claim 9, wherein the dispersion compensator is a dispersion compensation fiber.

11. An apparatus as in claim 9, wherein the first and second amplifiers are erbium doped fiber amplifiers.

12. An apparatus comprising:
a multi-stage optical amplifier to amplify a wavelength division multiplexed (WDM) optical signal including a plurality of optical signals each of which has different wavelength, the plurality of optical signals being transmitted through associated signal channels, the multi-stage optical amplifier including
a dispersion compensator providing dispersion compensation to the plurality of optical signals,
a first amplifier positioned upstream of the dispersion compensator, and
a second amplifier positioned downstream of the dispersion compensator, wherein a combined gain of the first and second amplifiers is sufficient to compensate a loss in the dispersion compensator and to output the plurality of optical signals from the second amplifier at output power for transmission downstream of the second amplifier,
wherein channel spacing between a pair of adjacent signal channels is set to an integer multiple of a minimum channel spacing defined in terms of an optical frequency or an optical wavelength.

13. An apparatus as in claim 12, wherein the dispersion compensator is a dispersion compensation fiber.

14. An apparatus as in claim 13, wherein the first and second amplifiers are erbium doped fiber amplifiers.

15. An optical transmission system comprising:
a multiplexer wavelength-division-multiplexing a plurality of optical signals, each having a different wavelength and being transmitted thorough an associated signal channel, into a multiplexed optical signal, and outputting the multiplexed optical signal to an optical fiber;
a multi-stage optical amplifier, optically coupled to the optical fiber, including
a first amplifier amplifying the multiplexed optical signal from the optical fiber,
a dispersion compensator providing dispersion compensation to the amplified multiplexed optical signal to thereby output a dispersion compensated multiplexed optical signal, and
a second amplifier amplifying the dispersion compensated multiplexed optical signal to thereby output an amplified, dispersion compensated multiplexed optical signal; and
a demultiplexer wavelength division-demultiplexing the amplified, dispersion compensated multiplexed optical signal into respective optical signals,
wherein channel spacing between a pair of adjacent signal channels is set to an integer multiple of a minimum channel spacing defined in terms of an optical frequency or an optical wavelength.

16. An optical transmission system as in claim 15, wherein a combined gain of the first and second amplifiers is sufficient to compensate a loss in the dispersion compensator and to output the amplified, dispersion compensated multiplexed optical signal from the second amplifier at an output power for transmission downstream of the multi-stage optical amplifier.

17. An optical transmission system comprising:

an optical transmitter outputting a wavelength division multiplexed (WDM) optical signal to an optical fiber, the WDM optical signal including a plurality of optical signals transmitted through associated signal channels, each of the plurality of optical signals having different wavelength;

a multi-stage optical amplifier, optically coupled to the optical fiber, including
- a first amplifier amplifying the WDM optical signal received from the optical fiber,
- a dispersion compensator providing dispersion compensation to the amplified WDM optical signal to thereby output a dispersion compensated WDM optical signal, and
- a second amplifier amplifying the dispersion compensated WDM optical signal to thereby output an amplified, dispersion compensated WDM optical signal from the multi-stage optical amplifier; and an optical receiver receiving the amplified, dispersion compensated WDM optical signal output from the multi-stage optical amplifier, wherein channel spacing between a pair of adjacent signal channels is set to an integer multiple of a minimum channel spacing defined in terms of an optical frequency or an optical wavelength.

18. An optical transmission system as in claim 17, wherein the first and second amplifiers have a combined gain so that the amplified, dispersion compensated WDM optical signal is output from the multi-stage optical amplifier at a power level sufficient to be received by the receiver.

* * * * *

UNITED STATES PATENT AND TRADEMARK OFFICE
CERTIFICATE OF CORRECTION

PATENT NO. : 6,930,824 B1
DATED : August 16, 2005
INVENTOR(S) : George Ishikawa et al.

It is certified that error appears in the above-identified patent and that said Letters Patent is hereby corrected as shown below:

<u>Title page,</u>
Item [56], References Cited, U.S. PATENT DOCUMENTS, delete "359/96.3" and insert -- 350/96.3 --.

<u>Column 44,</u>
Line 38, delete "thorough" and insert -- through --.
Line 54, delete "wavelength division" and insert -- wavelength-division --.

Signed and Sealed this

Fourth Day of April, 2006

JON W. DUDAS
*Director of the United States Patent and Trademark Office*